United States Patent [19]

Ibuka et al.

[11] Patent Number: 6,058,164
[45] Date of Patent: May 2, 2000

[54] MODE-SWITCHABLE TELEPHONE AND MODE SETTING AND SWITCHING METHODS FOR THE SAME

[75] Inventors: Toshihiro Ibuka; Masahiro Aota; Nozomu Nyui; Tadashi Abe, all of Sendai, Japan

[73] Assignee: Fujitsu Limited, Kanagawa, Japan

[21] Appl. No.: 08/550,660

[22] Filed: Oct. 31, 1995

[30] Foreign Application Priority Data

Mar. 1, 1995 [JP] Japan ..................................... 7-042197

[51] Int. Cl.[7] ...................................................... H04M 1/64
[52] U.S. Cl. ............................. 379/67.1; 379/70; 379/77; 379/82; 379/88.04
[58] Field of Search .................................. 379/67, 80, 88, 379/89, 67.1, 70, 77, 82, 88.01, 88.04, 88.19

[56] References Cited

U.S. PATENT DOCUMENTS

| | | | |
|---|---|---|---|
| 3,784,721 | 1/1974 | Kilby | 379/74 |
| 4,242,540 | 12/1980 | Franchi et al. | 379/70 |
| 4,790,002 | 12/1988 | D'Agosto, III et al. | 379/70 |
| 4,837,797 | 6/1989 | Freeny, Jr. | 379/96 |
| 4,845,772 | 7/1989 | Metroka et al. | 379/61 |
| 4,860,339 | 8/1989 | D'Agosto, III et al. | 379/67 |
| 4,975,896 | 12/1990 | D'Agosto, III et al. | 369/29 |
| 4,985,913 | 1/1991 | Shalom et al. | 379/76 |
| 5,029,198 | 7/1991 | Walpole et al. | 379/88 |
| 5,394,445 | 2/1995 | Ball et al. | 379/67 |
| 5,400,393 | 3/1995 | Knuth et al. | 379/88 |
| 5,406,618 | 4/1995 | Knuth et al. | 379/67 |
| 5,483,577 | 1/1996 | Gulick | 379/67 |
| 5,546,447 | 8/1996 | Skarbo et al. | 379/142 |
| 5,559,860 | 9/1996 | Mizikovsky | 379/58 |

FOREIGN PATENT DOCUMENTS

| | | |
|---|---|---|
| 0 330 856 | 9/1989 | European Pat. Off. . |
| 0 545 066 | 6/1993 | European Pat. Off. . |
| 5145622 | 6/1993 | Japan . |
| 6125412 | 5/1994 | Japan . |
| 2 171 275 | 8/1986 | United Kingdom . |
| 2 173 071 | 10/1986 | United Kingdom . |
| 2 174 867 | 11/1986 | United Kingdom . |
| 2 227 394 | 7/1990 | United Kingdom . |

*Primary Examiner*—Krista Zele
*Assistant Examiner*—Allan Hoosain
*Attorney, Agent, or Firm*—Helfgott & Karas, P.C.

[57] ABSTRACT

The present invention relates to a mode-switchable telephone and mode setting and switching methods for the telephone. The mode-switchable telephone has a comparing unit which compares a value of a ringer adjusting volume with a volume value for setting a second mode, and a control unit which switches a first mode to the second mode when it is determined based on the result of the comparison by the comparing unit that the value of the ringer adjusting volume is set to be equal to or less than the volume value for setting the second mode. This structure facilitates the operation of the telephone having an automatic answering/recording function and a simple pager function.

21 Claims, 44 Drawing Sheets

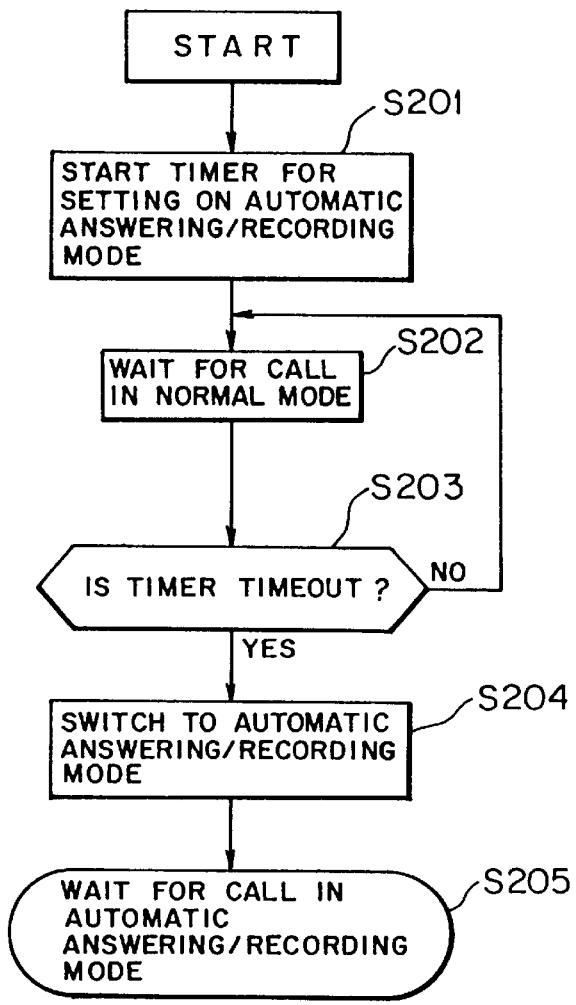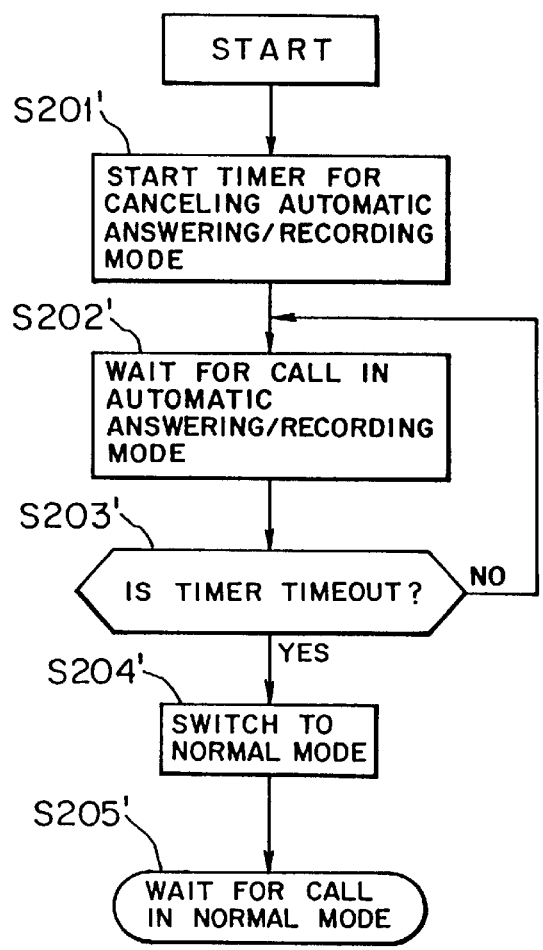

MODE-SWITCHABLE TELEPHONE AND MODE SETTING AND SWITCHING METHODS FOR THE SAME

BACKGROUND OF THE INVENTION (1) Field of the Invention

The present invention relates to a mode-switchable telephone and mode setting and switching methods for the telephone.

(2) Description of the Related Art

In recent years, telephones having an automatic answering/recording function have come into wide use in households. When a telephone subscriber cannot answer an incoming call because he or she is out or for some other reason, the automatic answering/recording function answers the incoming call automatically and informs a caller of the absence of the called subscriber and also records information (a message, for example) received from the caller.

Portable terminals such as portable telephones for use in mobile telecommunication systems are rapidly increasing recently. Particularly, among portable telephones, a simple pager function (simple pager mode) capable of displaying information received from a caller such as a caller's telephone number on a liquid crystal display or the like, and the aforesaid automatic answering/recording function (automatic answering/recording mode) are becoming popular.

What has been required of portable telephones and similar terminals having the above functions is to allow a user to set telephone operating modes such as the automatic answering/recording mode by a simpler operation.

In portable telephones and similar terminals having the automatic answering/recording function or simple pager function, the setting and cancellation of the automatic answering/recording mode is generally performed by predetermined key operations, i.e., by depressing a dedicated function key like an automatic answering/recording on/off key or by successively depressing several keys (for example, a function key and a key assigned to set the automatic answering/recording mode).

In detail, as shown in FIG. 44(a), to set the automatic answering/recording mode, a function key is depressed (step A1), and then a key assigned to set the automatic answering/recording mode is depressed (step A2), whereby the automatic answering/recording mode is set (step A3).

On the other hand, as shown in FIG. 44(b), to cancel the automatic answering/recording mode, a function key is depressed (step B1), and then a key assigned to cancel the automatic answering/recording mode is depressed (step B2), whereby the automatic answering/recording mode is canceled (step B3).

However, according to the aforesaid mode setting method, the automatic answering/recording function does not work unless the automatic answering/recording mode is set in advance by a predetermined key operation using a function key and a key assigned to set/cancel the mode as described above. Accordingly, when a user cannot answer an incoming call for some reason and the automatic answering/recording mode has not been set, it becomes impossible to receive a message.

Also, for example, when a terminal receives a call with its volume of ringing tone (hereinafter may be referred to as "ringing tone volume") set to "0" (silent alert mode), the automatic answering/recording function does not work unless the automatic answering/recording mode is set in advance. Accordingly, the user is unaware of the incoming call and fails to answer it.

SUMMARY OF THE INVENTION

In view of the foregoing problems, an object of the present invention is to provide a mode-switchable telephone having an answering mode such as an automatic answering/recording function and/or a simple pager function, which can respond to an incoming call and accumulate or record the content of the call such as a message without fail and which is quite easy to operate.

Another object of the present invention is to provide a mode setting method and a mode switching method for the mode-switchable telephone as set forth above.

To achieve the above objects, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises comparing means for comparing a value of a ringer adjusting volume of the telephone with a volume value for setting the second mode, and control means for responding to the results of the comparison by the comparing means to switch the mode of the telephone from the first mode to the second mode when it is judged that the value of the ringer adjusting volume is set to be equal to or less than the volume value for setting the second mode.

The present invention also provides a mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode setting method comprises the steps of comparing a value of a ringer adjusting volume of the telephone and a volume value for setting the second mode, and switching the mode of the telephone from the first mode to the second mode when the value of the ringer adjusting volume is equal to or less than the volume value for setting the second mode.

Moreover, the present invention provides a mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these mode. In the mode setting method, a value of a ringer adjusting volume of the telephone is compared with a volume value for setting the first mode and another volume value for setting the second mode. When the value of the ringer adjusting volume is equal to or less than the volume value for setting the second mode, the second mode is set. When the value of the ringer adjusting volume is equal to or greater than the volume value for setting the first mode, the first mode is set.

In the mode-switchable telephone of the present invention and the mode setting method of the present invention for the mode-switchable telephone, when the value of the ringer adjusting volume is equal to or less than the volume value for setting the second mode, the second mode is automatically set, and when the value of the ringer adjusting volume is equal to or greater than the volume value for setting the first mode, the first mode is automatically set. Accordingly, when a user does not want to answer an incoming call, the user turns down the ringing by adjusting the value of the ringer adjusting volume to be equal to or less than the volume value for setting the second value. With this, even when the user does not become aware of ringing caused by an incoming call, voice information from the caller-side telephone can automatically be accumulated in response to the incoming call without fail.

Moreover, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises incoming call detecting means for detecting the presence and absence of an incoming call, key operation detecting means for detecting whether a predetermined key operation is performed, and control means for setting the second mode when an incoming call is detected by the incoming call detecting means and it is detected that the predetermined key operation is performed.

Also, the present invention provides a mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, wherein the second mode is set by a predetermined key operation performed in response to an incoming call.

Accordingly, in the mode-switchable telephone of the present invention and the mode setting method of the present invention for the mode-switchable telephone, the second mode is set when an incoming call is detected and it is detected that the predetermined key operation is performed. Accordingly, it is possible to set the second mode very easily without complicated steps.

Moreover, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises comparing means for comparing the voltage of a power source for the telephone with a voltage value for setting the second mode, and control means for switching the mode of the telephone to the second mode when it is judged by the comparing means that the voltage of the power source is equal to or less than the voltage value for setting the second mode.

Accordingly, in the mode-switchable telephone of the present invention, when the voltage of the power source for the telephone is equal to or less than the voltage value for setting the second mode, the second mode is set. Therefore, the power consumption of the telephone can be decreased greatly.

Also, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises clocking means, setting means for setting a clocking value for setting the second mode, comparing means for comparing the result of the clocking by the clocking means with the clocking value for setting the second mode set by the setting means, and control means for switching the mode of the telephone to the second mode when it is judged by the comparing means that the result of the clocking by the clocking means reaches the clocking value for setting the second mode.

Moreover, the present invention provides a mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode setting method comprises the steps of providing the telephone with a clocking means, comparing the result of the clocking by the clocking means with a clocking value for setting the second mode, and switching the mode of the telephone to the second mode when the result of the clocking by the clocking means reaches the clocking value for setting the second mode.

In the mode-switchable telephone of the present invention and the mode setting method of the present invention for the mode-switchable telephone, when the result of the clocking by the clocking means reaches the clocking value for setting the second mode, the second mode is set. Accordingly, when the telephone is left unused for a prolonged period of time due to absence of the user or the like, the second mode is automatically set so that information from the caller-side telephone can be accumulated without missing. In addition, the power consumption of the telephone can be reduced greatly.

Also, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises means for inputting voice, voice identifying means for identifying the content of voice for setting and canceling the first mode or the second mode, and control means for setting and canceling the second mode and the first mode based on the result of the voice identification by the voice identifying means.

Accordingly, in the mode-switchable telephone of the present invention, the content of voice for setting and canceling the first mode or the second mode is identified by the voice identifying means, and the second mode or the first mode is set and canceled based on the result of the voice identification. Therefore, the setting and cancellation of the first mode and the second mode can be performed by voice only without performing any complicated key operation. This greatly facilitates the operation of the mode-switchable telephone.

Moreover, the present invention provides a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes. The mode-switchable telephone comprises identification information-specific mode setting means for setting identification information for each caller and for setting the first mode or the second mode for the caller, comparing means for comparing the identification information of the caller of an incoming call and the identification information set by the identification information-specific mode setting means, and control means for setting and canceling the second mode and the first mode based on the result of the comparison by the comparing means.

Accordingly, in the mode-switchable telephone of the present invention, the first mode or the second mode is set in accordance with the identification information of the caller of an incoming call. Therefore, it becomes possible to accumulate voice information for later confirmation, without performing direct talk, when the incoming call is from a person to who the user does not want to respond.

Also, the present invention provides a mode switching method for a mode-switchable telephone which has a first mode for performing an ordinary telephone talk in response to an incoming call, a second mode for sending a message to a caller-side telephone in response to an incoming call and then accumulating voice information from the caller-side telephone in a voice memory, and a third mode for sending a message to a caller-side telephone in response to an incoming call and then accumulating information, other than voice, from the caller-side telephone, and which is capable of setting these modes. In the mode switching method, when voice information is accumulated in the voice memory in the second mode and the residual storage capacity of the voice memory becomes equal to or less than a predetermined amount, the mode is switched to the third mode.

In the mode switching method for a mode-switchable telephone according to the present invention, when voice information is accumulated in the voice memory in the second mode and the residual storage capacity of the voice memory becomes equal to or less than a predetermined amount, the mode is switched to the third mode in which information, other than voice information, whose information amount is smaller than that of the voice information is accumulated. Accordingly, the storage capacity of the voice memory can be used efficiently.

Moreover, the present invention provides a mode switching method for a mode-switchable telephone which has a first mode for performing an ordinary telephone talk in response to an incoming call, and an automatic answering/recording mode which is composed of a second mode for sending a message to a caller-side telephone in response to an incoming call and then accumulating voice information from the caller-side telephone in a voice memory, and a third mode for sending a message to a caller-side telephone in response to an incoming call and then accumulating information, other than voice, from the caller-side telephone, and which is capable of setting these modes. In the mode switching method, when an automatic answering/recording mode is set, the mode is first switched to the second mode in which voice information is accumulated in the voice memory, and when the residual storage capacity of the voice memory becomes equal to or less than a predetermined amount, the mode is switched to the third mode.

In the mode switching method for a mode-switchable telephone according to the present invention, when the automatic answering/recoding mode composed of the second and the third mode is set, the mode is first switched to the second mode in which voice information is accumulated in the voice memory, and when the residual storage capacity of the voice memory becomes equal to or less than a predetermined amount, the mode is switched to the third mode. Accordingly, it becomes possible to accumulate voice mode with priority and to efficiently use the storage capacity of the voice memory.

BRIEF DESCRIPTION OF THE DRAWINGS

FIGS. 34(a) and 34(b) are flowcharts for explaining an operation to set the automatic answering/recording mode or the normal mode by using a timer in the portable telephone according to the first embodiment;

DESCRIPTION OF THE PREFERRED EMBODIMENTS (a) Aspect of the Invention

Aspects of the present invention will be described with reference to the accompanying drawings.

Figure 1:
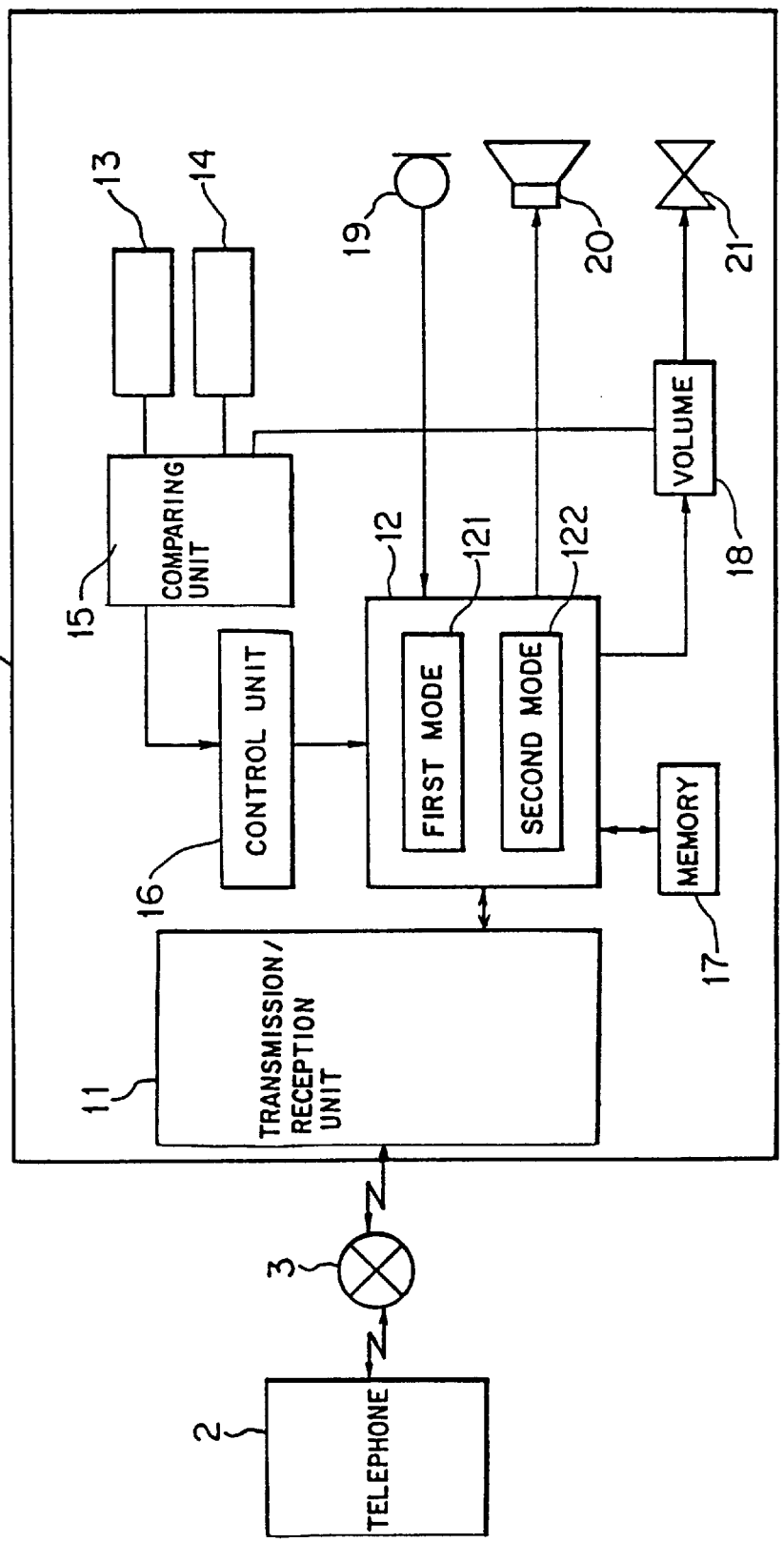
FIG. 1 is a block diagram showing a first aspect of the present invention.

FIG. 1 is a block diagram showing a first aspect of the present invention. In FIG. 1, numerals 1 and 2 denote mode-switchable telephones which communicate with each other via a network 3. The telephone 1 has a first mode 121 for performing an ordinary telephone talk in response to an incoming call received through a transmission/reception unit 11, and a second mode 122 for sending a message to a caller-side telephone 2 in response to an incoming call and then accumulating information from the caller-side telephone 2. The mode switching unit 12 can switch the mode between these modes 121 and 122.

As shown in FIG. 1, the telephone 1 is composed of comparing unit 15, control unit 16, a memory 17 for accumulating information from the caller-side telephone 2 in the second mode 122, a ringer adjusting volume 18, a microphone 19, a speaker 20, and a buzzer 21 for generating ringing.

The comparing unit 15 compares the volume value of the ringer adjusting volume 18 of the telephone 1 with a volume value 14 for setting the second mode.

The control unit 16 responds to the results of the comparison by the comparing unit 15 to switch the mode of the telephone 1 from the first mode 121 to the second mode 122 when it is judged that the value of the ringer adjusting volume 18 is set to be equal to or less than the volume value 14 for setting the second mode.

In the above-described mode-switchable telephone 1 of the present invention, by virtue of the above-described structure, when the mode is switched to the first mode 121, the user is allowed to perform normal talk, and when the mode is switched to the second mode 122, a message is sent out to the caller-side telephone 2 and then information from the caller-side telephone 2 is accumulated into the memory 17.

In the mode-switchable telephone 1 having the above-described structure, the mode is switched to the second mode 122 as follows. First, the value of a ringer adjusting volume 18 of the telephone 1 and the volume value 14 for setting the second mode are compared with each other by the comparing unit 15. As a result, when the value of the ringer adjusting volume 18 is equal to or less than the volume value 14 for setting the second mode, the mode of the telephone 1 is switched from the first mode 121 to the second mode 122 by the control unit 16.

In the case in which the comparing unit compares the value of the ringer adjusting volume 18 of the telephone 1 with a volume value 13 for setting the first mode and the volume value 14 for setting the second mode, the second mode 122 is set when the value of the ringer adjusting volume 18 is equal to or less than the volume value 14 for setting the second mode, and the first mode 121 is set when the value of the ringer adjusting volume 18 is equal to or greater than the volume value 13 for setting the first mode.

In the above-mentioned mode-switchable telephone 1 of the present invention and the mode setting method of the present invention for the mode-switchable telephone 1, when the value of the ringer adjusting volume 18 is equal to or less than the volume value 14 for setting the second mode, the second mode 122 is automatically set, and when the value of the ringer adjusting volume 18 is equal to or greater than the volume value 13 for setting the first mode, the first mode 121 is automatically set. Accordingly, when the user does not want to answer an incoming call, the user turns down the ringing by adjusting the value of the ringer adjusting volume 18 to be equal to or less than the volume value 14 for setting the second value. With this, even when the user does not become aware of ringing caused by an incoming call, voice information from the caller-side telephone can automatically be accumulated in response to the incoming call without fail.

If the volume value 14 for setting the second mode is set to a value which makes the volume of the ringing zero, the second mode 122 is set when the value of the ringer adjusting volume 18 is set to zero.

Accordingly, if the volume value 14 for setting the second mode is set to a value which makes the volume of the ringing zero, the second mode is automatically set in response to an incoming call so as to accumulate voice information from the caller-side telephone even when the user does not want to answer the incoming call and makes the volume of the ringing zero. Also, such information can securely be accumulated even when the user does not become aware of an incoming call because the user has forgotten that he or she had made the volume of the ringing zero.

In this case, the repeat number of ringing before starting the operation for accumulating information into the memory 17 in the second mode 122 may be set in accordance with the value of the ringer adjusting volume 18. With this, the repeat number of ringing before starting the accumulation of information into the memory 17 in the second mode 122 can be set in accordance with the value of the ringer adjusting volume 18.

Accordingly, it is unnecessary to separately set the repeat number of ringing before starting the information accumulating operation in advance, so that the operation of the telephone 1 is greatly facilitated.

In the present invention, when the mode of the telephone 1 is set to the second mode 122 in advance, the second mode 122 is continued regardless of the value of the ringer adjusting volume 18. On the contrary, when the mode of the telephone 1 is not set to the second mode 122 in advance, the volume value of a ringer adjusting volume 18 of the telephone 1 and the volume value 14 for setting the second mode are compared with each other by the comparing unit 15. As a result, when the value of the ringer adjusting volume 18 is equal to or less than the volume value 14 for setting the second mode, the second mode 122 is set by the control unit 16.

Accordingly, even when the user does not want to respond to an incoming call and turns down the volume of the ringing, or even when the user does not become aware of an incoming call, because the user has forgotten that he or she had turned down the volume of the ringing, it is possible to respond to the incoming call and to accumulate information from the caller.

Also, in the present invention, when the first mode 121 is set in advance, the first mode 121 is continued regardless of the value of the ringer adjusting volume 18. On the contrary, when the first mode 121 is not set in advance, the volume value of the ringer adjusting volume 18 of the telephone 1 is compared, by the comparing unit 15, with the volume value 13 for setting the first mode and the volume value 14 for setting the second mode. When the value of the ringer adjusting volume 18 is equal to or less than the volume value 14 for setting the second mode, the second mode 122 is set by the control unit 16. When the value of the ringer adjusting volume 18 is equal to or greater than the volume value 13 for setting the first mode, the first mode 121 is set by the control unit 16.

Accordingly, it is possible to securely respond to an incoming call or accumulate information from the caller-side telephone. Therefore, there is no possibility of missing information from the caller-side telephone.

In the present invention, when the second mode 122 is set, transmission is performed in a muted state.

Accordingly, the power consumed by transmission in the second mode 122 can be reduced greatly.

Figure 2:
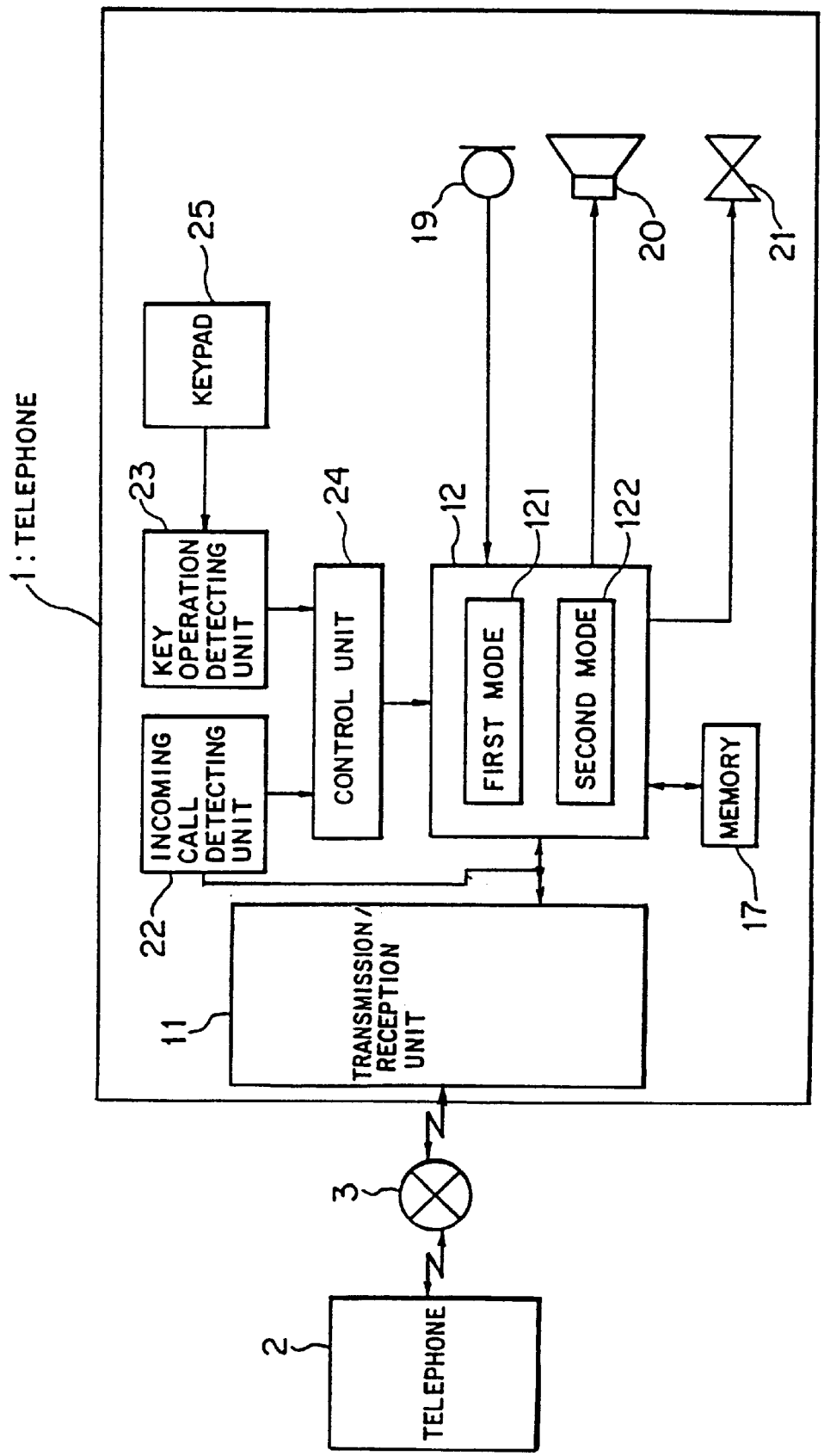
FIG. 2 is a block diagram showing a second aspect of the present invention.

FIG. 2 is a block diagram showing a second aspect of the present invention. In FIG. 2, numerals 1 and 2 denote mode-switchable telephones which communicate with each other via a network 3. The telephone 1 has a first mode 121 for performing an ordinary telephone talk in response to an incoming call received through a transmission/reception unit 11, and a second mode 122 for sending a message to a caller-side telephone 2 in response to an incoming call and then accumulating information from the caller-side telephone 2. The mode switching unit 12 can switch the mode between these modes 121 and 122.

As shown in FIG. 2, the telephone 1 is provided with incoming call detecting unit 22, key operation detecting unit 23, and control unit 24, and is also provided with a memory 17 for accumulating information from the caller-side telephone 2 in the second mode 122, a microphone 19, a speaker 20, and a buzzer 21 for generating ringing, which are the same as those described in relation to FIG. 1. Numeral 25 denotes a keypad such as a numeric keypad.

The incoming call detecting unit 22 detects the presence and absence of an incoming call. The key operation detecting unit 23 detects whether a predetermined key operation is performed using the keypad 25. The control unit 24 sets the second mode 122 when an incoming call is detected by the incoming call detecting unit 22 and it is detected by the key operation detecting unit 23 that the predetermined key operation is performed.

In the above-described mode-switchable telephone 1 of the present invention, by virtue of the above-described structure, when the mode is switched to the first mode 121, the user is allowed to perform normal talk, and when the mode is switched to the second mode 122, a message is sent out to the caller-side telephone 2 and then information from the caller-side telephone 2 is accumulated into the memory 17.

In this case, the mode is switched as follows. When a predetermined key operation is performed in response to an incoming call, the incoming call is detected by the incoming call detecting unit 22 and the predetermined key operation is detected by the key operation detecting unit 23. As a result, the second mode 122 is set by the control unit 24.

In the above-described mode-switchable telephone 1 of the present invention and the mode setting method of the present invention for the mode-switchable telephone 1, when an incoming call is detected and it is detected that a predetermined key operation is performed, the second mode 122 is set. Accordingly, the second mode can be set very easily without complicated steps.

In this case, when the second mode 122 is set by the predetermined key operation, the operation for accumulating information into the memory 17 is immediately started.

Accordingly, even when the user cannot respond to a sudden incoming call, or when the user intentionally ignores the incoming call, information from the caller-side telephone can be accumulated in a very simple manner.

The above operation may be modified such that when the second mode 122 is set in the above-described manner, the volume of the ringing is immediately decreased to zero, a waiting operation is performed for a period of time corresponding to a repeat number of ringing which is set in accordance with the value of the ringer adjusting volume 18, and the operation for accumulating information into the memory 17 is then started.

Accordingly, the period of time before starting the information accumulating operation in the second mode 122 can be set in a very simple manner.

In this case, the operation may be modified such that the second mode 122 set in the above-described manner is effective only for the detected incoming call.

Accordingly, it is possible to set the second mode 122 only for an incoming call to which the user does not want to respond, and to accumulate the information of the incoming call without performing normal talk.

In the present invention, a key operation for turning down the volume may be performed, as the above-described predetermined key operation, to switch the mode of the telephone 1 to the second mode 122. In this case, when the key operation for turning down the volume is performed once, the volume linked setting value for defining the repeat number of ringing before starting the information accumulating operation is not changed. When the key operation for turning down the volume is performed a plurality of times, the volume linked setting value for defining the repeat number of ringing before starting the information accumulating operation is changed.

Accordingly, the second mode 122 can be set in a very simple manner, and the period of time before starting the information accumulating operation can be set in a very simple manner.

Moreover, the operation may be modified such that the mode of telephone 1 is switched to the second mode 122 when the above-described predetermined key operation is continuously performed over a predetermined period of time, or when the predetermined key operation is performed plural times within a predetermined period of time.

Accordingly, in this case, the second mode 122 can be set in a very simple manner, and the second mode 122 can immediately be set to accumulate information, for example, in the case where the user does not want to respond to a sudden incoming call.

Also, the operation may be modified such that the mode of telephone 1 is switched to the second mode 122 when arbitrary different keys are simultaneously depressed as the predetermined key operation. Specifically, the second mode 122 is set when an arbitrary key and the volume key 18 are simultaneously depressed.

Accordingly, it becomes possible to easily set the second mode 122 even in a telephone in which the above-described key dedicated for setting the second mode 122 cannot be provided due to the limitation on the number of keys.

Moreover, in the present invention, when the second mode 122 is set in the above-described manner, the volume of the ringing is decreased to zero, and when the volume is turned up to adjust the ringing, the second mode 122 is canceled.

Accordingly, the setting and cancellation of the second mode can be performed in accordance with intentions of the user, i.e., the intention of ignoring an incoming call, or the intention of responding the incoming call. In addition, the operation for setting the second mode 122 becomes very easy.

In the present invention, when the second mode 122 is set in the above-described manner, transmission is performed in a muted state. Accordingly, the power consumed by transmission can be reduced greatly.

Figure 3:
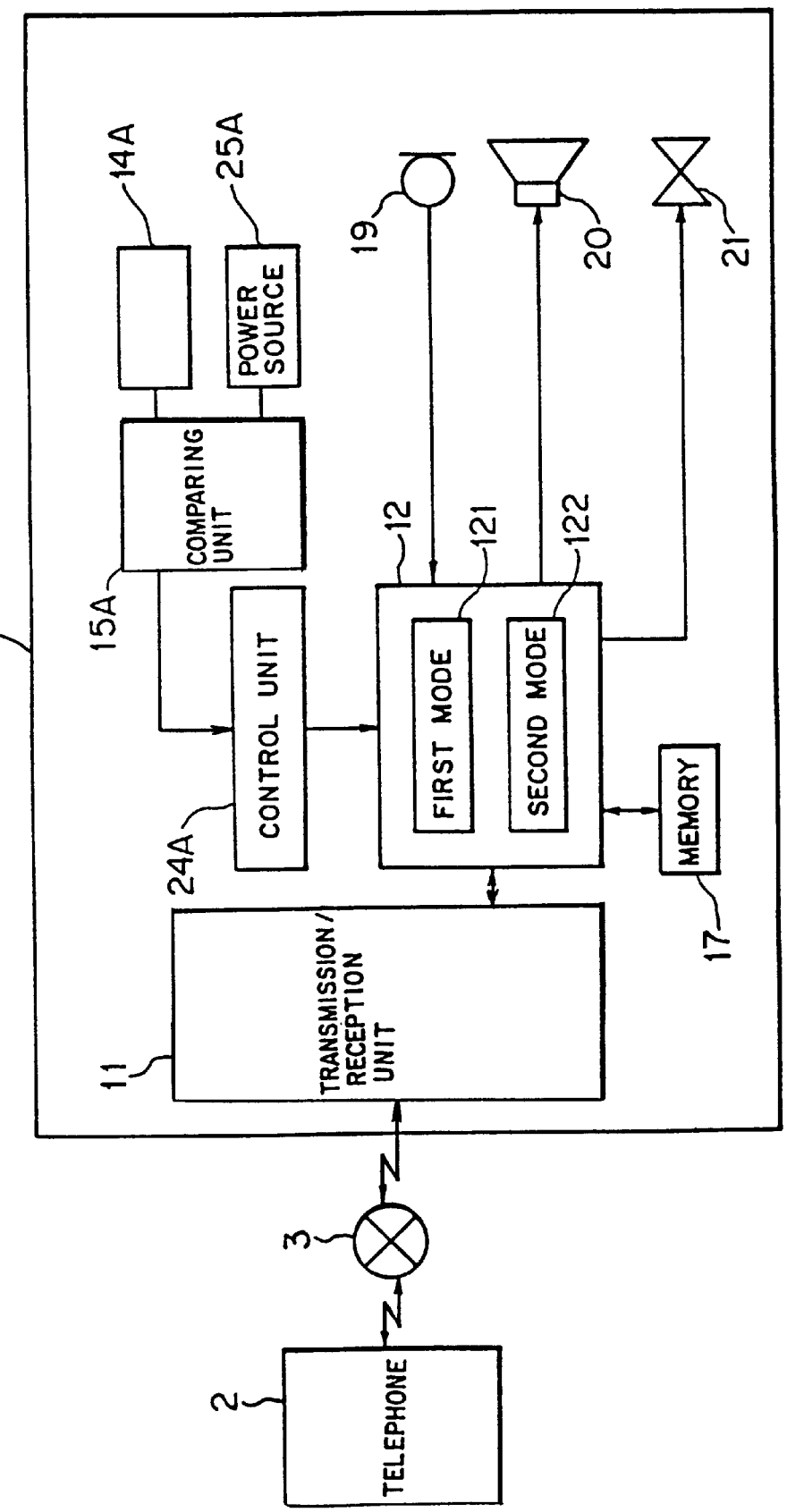
FIG. 3 is a block diagram showing a third aspect of the present invention.

FIG. 3 is a block diagram showing a third aspect of the present invention. In FIG. 3, numerals 1 and 2 denote mode-switchable telephones which communicate with each other via a network 3. The telephone 1 has a first mode 121 for performing an ordinary telephone talk in response to an incoming call received through a transmission/reception unit 11, and a second mode 122 for sending a message to a caller-side telephone 2 in response to an incoming call and then accumulating information from the caller-side telephone 2. The mode switching unit 12 can switch the mode between these modes 121 and 122.

As shown in FIG. 3, the telephone 1 is provided with comparing unit 15A, control unit 24A, and a power source 25A for the telephone 1, and is also provided with a memory 17 for accumulating information from the caller-side telephone 2 in the second mode 122, a microphone 19, a speaker 20, and a buzzer 21 for generating ringing, which are the same as those described in relation to FIG. 1.

The comparing unit 15A compares the voltage of the power source 25A for the telephone 1 with a voltage value 14A for setting the second mode. The control unit 24A switches the mode of the telephone 1 to the second mode 122 when it is judged by the comparing unit 15A that the voltage value of the power source 25A is equal to or less than the voltage value 14A for setting the second mode.

In the above-described mode-switchable telephone 1 of the present invention, by virtue of the above-described structure, when the mode is switched to the first mode 121, the user is allowed to perform normal talk, and when the mode is switched to the second mode 122, a message is sent out to the caller-side telephone 2 and then information from the caller-side telephone 2 is accumulated into the memory 17.

In this case, the mode setting is performed as follows. The voltage of the power source 25A for the telephone 1 is compared with a voltage value 14A for setting the second mode by the comparing unit 15A. As a result, the second mode is set by the control unit 24A when it is judged that the voltage value of the power source 25A is equal to or less than the voltage value 14A for setting the second mode.

In the above-described mode-switchable telephone according to the present invention, when the voltage value of the power source 25A is equal to or less than the voltage value 14A for setting the second mode, the mode of the telephone 1 is switched to the second mode 122. Accordingly, the power consumption of the telephone 1 can be reduced greatly.

Figure 4:
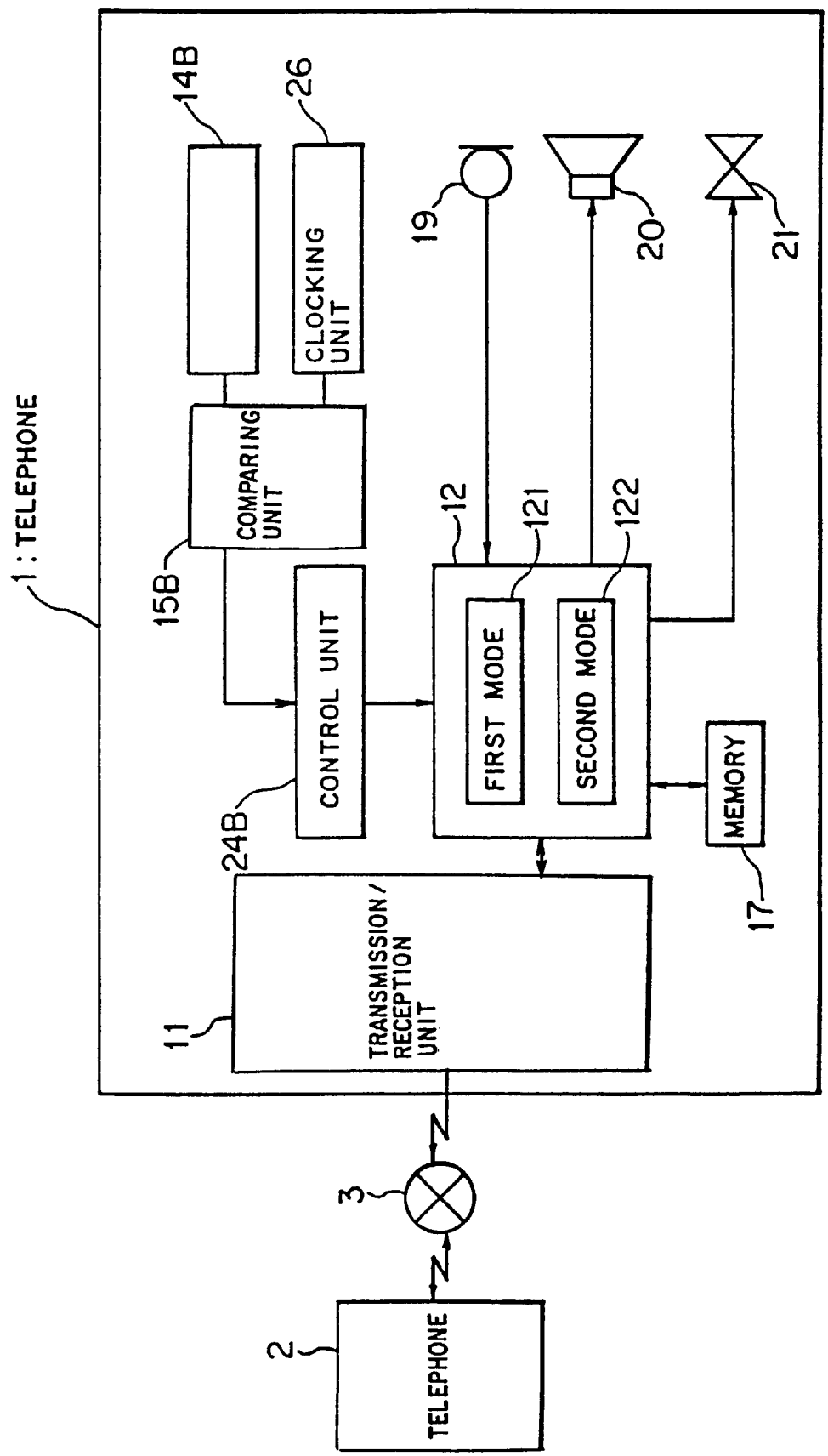
FIG. 4 is a block diagram showing a fourth aspect of the present invention.

FIG. 4 is a block diagram showing a fourth aspect of the present invention. The mode-switchable telephone 1 shown in FIG. 4 comprises clocking unit 26, comparing unit 15B, and control unit 24B in place of the power source 25A, the comparing unit 15A, and the control unit 24A, which have been described in relation to FIG. 3.

The comparing unit 15B compares the result of clocking by the clocking unit 26 with a clocking value 14B for setting the second mode. The control unit 24B switches the mode of the telephone 1 to the second mode 122 when it is judged by the comparing unit 15B that the result of clocking by the clocking unit 26 reaches the clocking value 14B for setting the second mode.

In the above-described mode-switchable telephone 1 of the present invention, by virtue of the above-described structure, the result of clocking by the clocking unit 26 and the clocking value 14B for setting the second mode are compared with each other by the comparing unit 15B. As a result, when the result of clocking by the clocking unit 26 reaches the clocking value 14B for setting the second mode, the second mode 122 is set by the control unit 24B.

Accordingly, in the mode-switchable telephone 1 of the present invention and the mode setting method of the present invention for the mode-switchable telephone 1, when the result of clocking by the clocking unit 26 reaches the clocking value 14B for setting the second mode, the second mode 122 is set. Hence, when the telephone 1 is left for a prolonged time due to absence of the user or the like, the second mode 122 is automatically set. With this operation, it becomes possible to accumulate information from the caller-side telephone without missing, and to greatly reduce the power consumption of the telephone 1.

The clocking unit 26 may be formed by a timer which operates based on the present time. In this case, when a designated time comes, the second mode 122 is set.

Since the second mode 122 can be set at a designated time, the second mode 122 can effectively be set, for example, in the case where the user knows in advance when he or she will go out. In addition, the power consumption of the telephone 1 can be reduced greatly.

When the clocking unit 26 is formed by a timer which is triggered when a predetermined period of time elapses after the end of an outgoing call or an incoming call, the second mode 122 is set when the predetermined period of time elapses after the end of an outgoing call or an incoming call.

Since the second mode 122 is automatically set when a predetermined period of time elapses after the end of an outgoing call or an incoming call, information from the caller-side telephone can be accumulated without missing, even when user leaves the telephone 1 unused for a prolonged period of time without setting the second mode 122. In addition, the power consumption of the telephone 1 can be reduced greatly.

When the clocking unit 26 is formed by a timer which is triggered when a predetermined period of time elapses after the end of an outgoing call or an incoming call, the operation may be modified such that the second mode 122 is set when a predetermined period of time elapses after the end of an outgoing call or an incoming call, and the second mode 122 is canceled when a predetermined period of time elapses after the end of an outgoing call or an incoming call in a state in which the second mode 122 has been set.

This also reduces the power consumption of the telephone 1 greatly.

Figure 5:
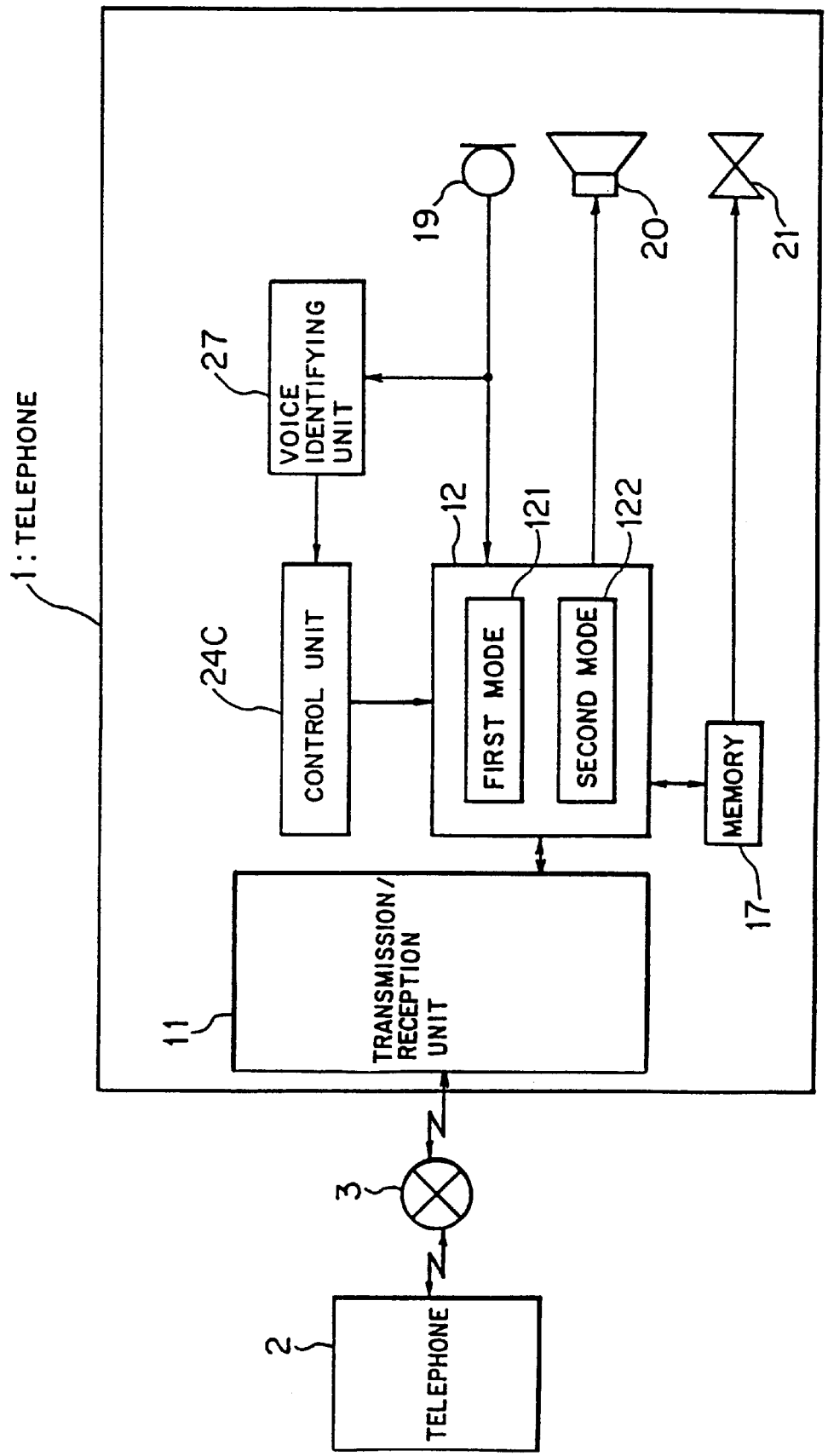
FIG. 5 is a block diagram showing a fifth aspect of the present invention.

FIG. 5 is a block diagram showing a fifth aspect of the present invention. The mode-switchable telephone 1 shown in FIG. 5 comprises voice identifying unit 27 and control unit 24C in place of the clocking unit 26, the comparing unit 15B, and the control unit 24B, which have been described in relation to FIG. 4.

The voice identifying unit 27 identifies the content of voice which is input through voice input unit (microphone) 19 to set and cancel the first mode 121 or the second mode 122. The control unit 24C sets and cancels the second mode 122 and the first mode 121 based on the results the identification by the voice identifying unit 27.

Accordingly, in the above-described mode-switchable telephone of the present invention, the second mode 122 and the first mode 121 can be set and canceled by voice only without any complicated key operation. This greatly facilitates the operation of the mode-switchable telephone 1.

Figure 6:
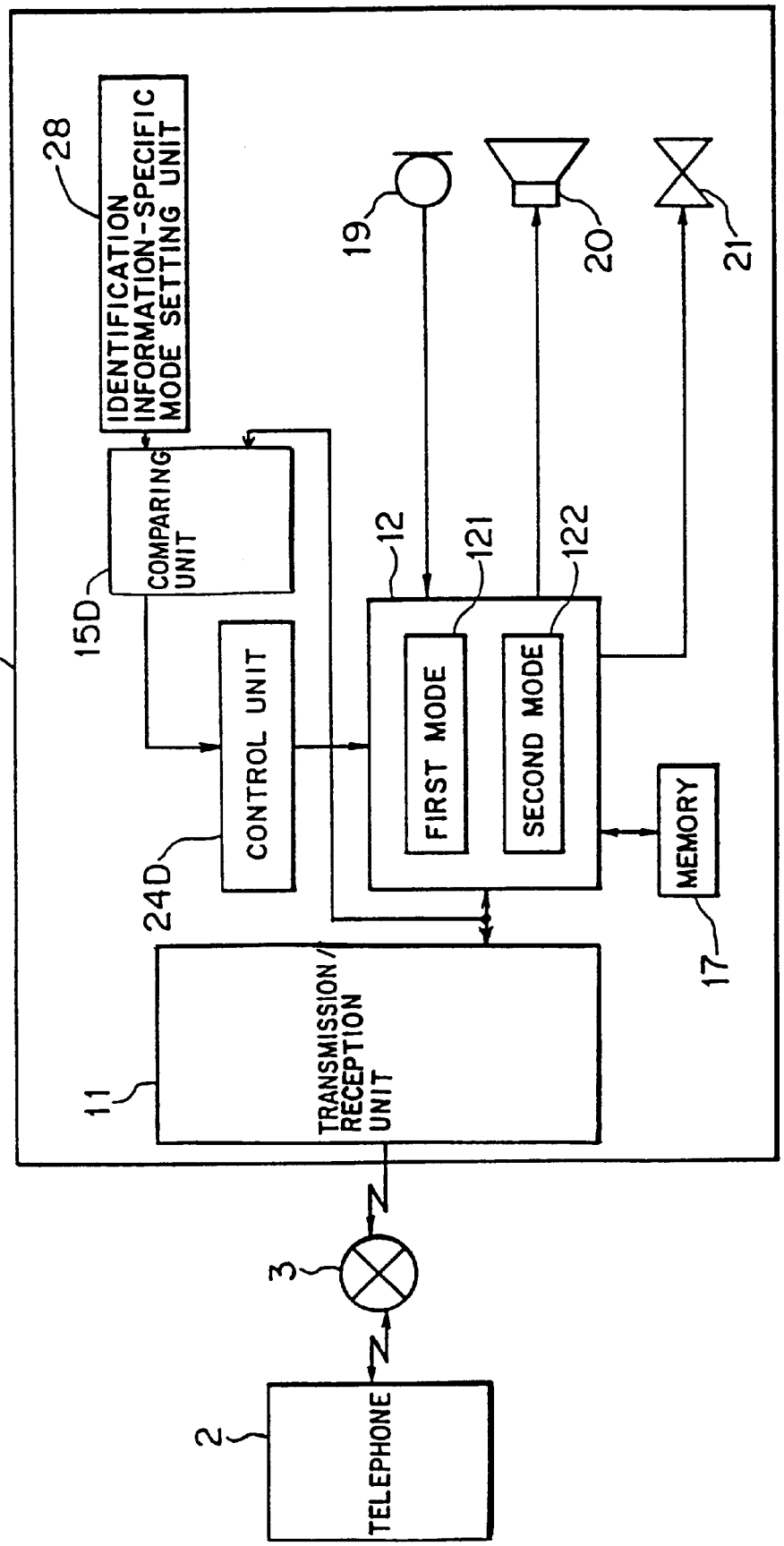
FIG. 6 is a block diagram showing a sixth aspect of the present invention.

FIG. 6 is a block diagram showing a sixth aspect of the present invention. The mode-switchable telephone 1 shown in FIG. 6 comprises identification information-specific mode setting unit 28, comparing unit 15D, and control unit 24D in place of the voice identifying unit 27 and the control unit 24C, which have been described in relation to FIG. 5.

The identification information-specific mode setting unit 28 sets identification information for each caller, and sets the first mode 121 or the second mode 122 for the caller. The comparing unit 15D compares the identification information of the caller of an incoming call and the identification information set by the identification information-specific mode setting unit 28. The control unit 24D sets and cancels the second mode 122 and the first mode 121 based on the result of the comparison by the comparing unit 15D.

In the above-described mode-switchable telephone 1, by virtue of the above-described structure, the first mode 121 or the second mode 122 corresponding to the identification information of a caller is set by the identification information-specific mode setting unit 28, and the identification information of the caller of an incoming call and the identification information set by the identification information-specific mode setting unit 28 are compared with each other by the comparing unit 15D. Based on the result of the comparison, the setting and cancellation of the second mode 122 and the first mode 121 are performed by the control unit 24D.

In the above-described mode-switchable telephone of the present invention, since the first mode 121 or the second mode 122 is set in accordance with the identification information of the caller of an incoming call, it becomes possible to accumulate voice information for later confirmation, without performing direct talk, when the incoming call is from a person to who the user does not want to respond.

Although not shown in FIG. 1 through FIG. 6, the present invention provides a mode switching method for the telephone 1 which has a first mode for performing an ordinary telephone talk in response to an incoming call, a second mode for sending a message to a caller-side telephone in response to an incoming call and then accumulating voice information from the caller-side telephone in a voice memory, and a third mode for sending a message to a caller-side telephone in response to an incoming call and then accumulating information, other than voice, from the caller-side telephone, and which is capable of setting these modes. The mode switching method switches the mode to the third mode when voice information is accumulated in the voice memory in the second mode and the residual storage capacity of the voice memory becomes equal to or less than a predetermined amount.

Accordingly, in the above-described mode switching method of the present invention for the mode-switchable telephone, when voice information is accumulated in the voice memory in the second mode and the residual storage capacity of the voice memory becomes equal to or less than a predetermined amount, the mode can be switched to the third mode in which information, other than voice information, whose information amount is smaller than that of the voice information is accumulated. Accordingly, the storage capacity of the voice memory can be efficiently used.

Moreover, the present invention provides another switching method for the mode-switchable telephone which has the first mode, and an automatic answering/recoding mode which is composed of the second mode and the third mode as described above, and which is capable of setting these modes. In the mode switching method, the operating mode is first switched to the second mode, when an automatic answering/recoding mode is set, to accumulate voice information in the voice memory, and then the mode is switched to the third mode when the residual storage capacity of the voice memory becomes equal to or less than a predetermined amount.

Accordingly, in the above-described mode switching method of the present invention for the mode-switchable telephone, it becomes possible to accumulate voice with priority and to efficiently use the storage capacity of the voice memory.

(b) First embodiment

A first embodiment of the present invention will now be described with reference to the drawings.

Figure 7:
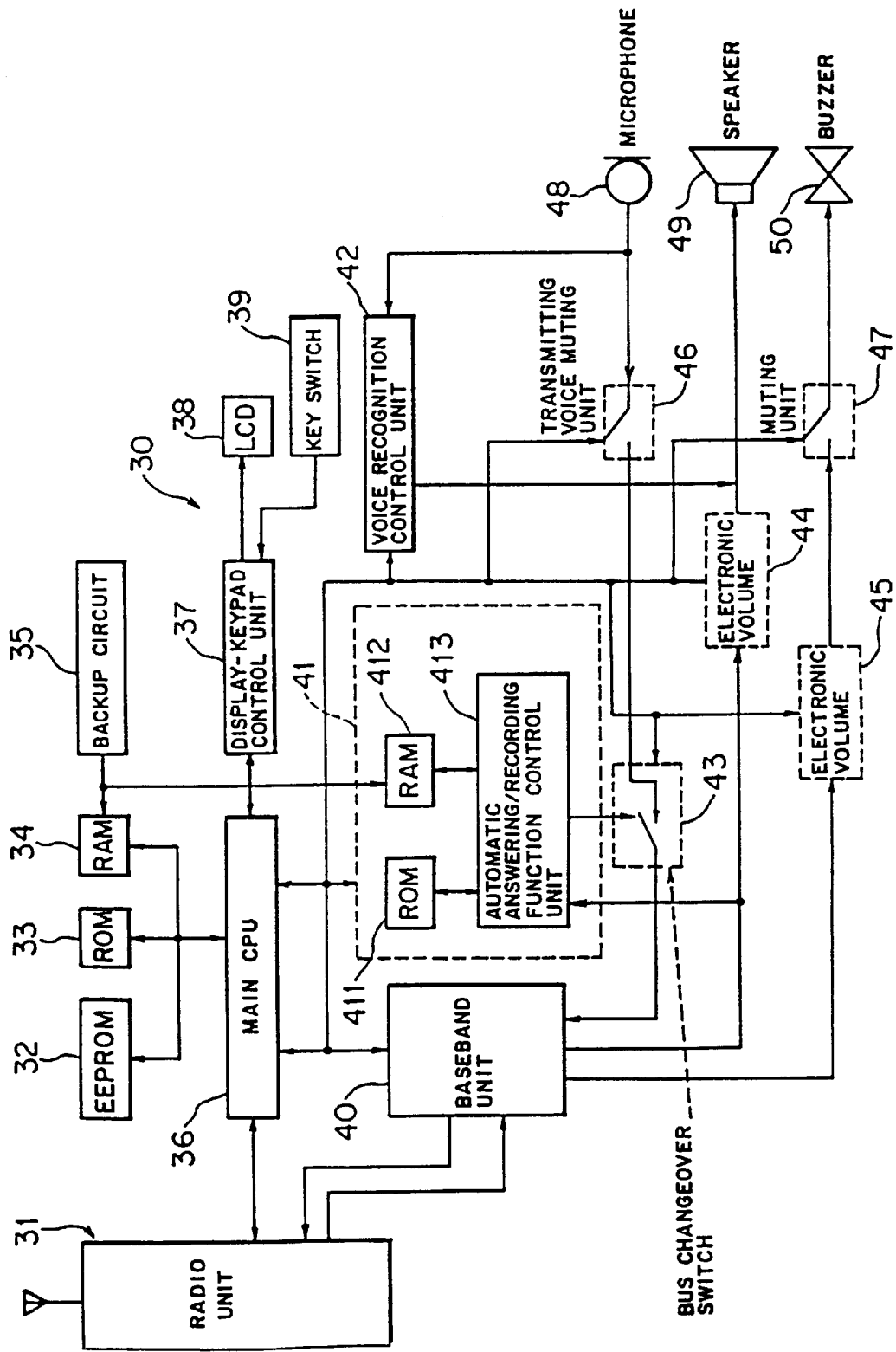
FIG. 7 is a block diagram showing the structure of a portable telephone (mode-switchable telephone) according to a first embodiment of the present invention.

FIG. 7 is a block diagram showing the structure of a portable telephone (mode-switchable telephone) according to the first embodiment of the present invention. In FIG. 7, reference numeral 30 denotes a portable telephone; 31, a radio unit which performs radio transmission and reception for communicate with another remote portable telephone by radio; 32, an electrically erasable programmable read-only memory (EEPROM); 33, a read-only memory (ROM); and 34, a random access memory (RAM), which is readable and writable.

The EEPROM 32 and the ROM 33 contain software to be executed by a main CPU 36, which will be described later. Various values used to set the automatic answering/recording mode, which will be described later, are set and stored in the RAM 34. These values include the ringing tone volume value used to set the normal mode (first mode) for conversing over telephone (a volume value for setting the first mode) and a ringing tone volume value used to set the automatic answering/recording mode (second or third mode). These values used to set the automatic answering/recording mode will be described later in detail.

Reference numeral 36 denotes a main CPU; 37, a display-keypad control unit; 38, a liquid crystal display (LCD); 39, key switches for generating a signal corresponding to an input provided by depressing a key (a numeric key or the like); and 40, a baseband unit for modulating and demodulating signals which are transmitted and received via the radio unit 31 using a baseband filter and the like.

The main CPU (hereinafter merely referred to as CPU in some case) 36 performs a comprehensive control over the portable telephone 30 in sending/receiving a call and switching the normal mode to and from the automatic answering/recording mode and has various functions, which will be described later. The display-keypad control unit (key operation detecting unit) 37 detects whether a key input from the key switch 39 represents a predetermined key operation for switching the operating mode, notifies the main CPU 36 of the result of the detection so that the CPU performs control accordingly, and performs control so as to display a telephone number dialed by the user, etc., on the liquid crystal display 38.

Reference numeral 41 denotes an automatic answering/recording mode control unit; 42, a voice recognition control unit; 43, a bus changeover switch to switch signal paths to the baseband unit 40 thereby to switch the automatic answering/recording mode to and from the normal mode; 44 and 45, electronic volumes for adjusting the volume of a speaker 49 and the volume of ringing, respectively; and 46 and 47, muting units to set the transmission volume of voice entered from a microphone 48 and the volume of ringing produced by a buzzer 50 to "0", respectively.

The automatic answering/recording mode control unit 41 is adapted, when a call is received in the automatic answering/recording mode, to send a message to a caller-side portable telephone and record (accumulate), in the form of voice information, a voice signal received from the remote party via the radio unit 31. To perform these operations, the automatic answering/recording mode control unit 41 is composed of a ROM 411 which contains software for executing the automatic answering/recording function, a RAM 412 in which a message to be sent to a caller-side portable telephone and voice received from the same are recorded (accumulated), and an automatic answering/recording function control unit 413 which reads out software from the ROM 411 and executes the automatic answering/recording function.

The voice recognition control unit 42 is adapted to identify a user's voice entered from the microphone 48, thereby allowing the user to switch the normal mode to and from the automatic answering/recording mode by uttering a voice command.

Specifically, the CPU 36 according to the present embodiment has the following functions (section):

(1) Function to detect the presence and absence of an incoming call.

(2) Function to compare a value of the electronic volume 45 for adjusting ringing of the portable telephone 30 with a volume value for setting the normal mode and a volume value for setting the automatic answering/recording mode, which volume values are previously set and stored in the RAM 34.

(3) Control function to set the automatic answering/recording mode when it is determined based on the result of the comparison by function (2) above that the ringing tone volume is set to be equal to or less than a volume value for setting the automatic answering/recording mode and to set the normal mode when it is determined based on the result of the comparison by function (2) that the ringing tone volume is set to be equal to or greater than a volume value for setting the normal mode.

(4) Control function to set the automatic answering/recording mode when an incoming call is detected by function (1) and it is detected by the display-keypad control unit 37 that a predetermined key operation for switching the operating mode is performed.

(5) Function to monitor a voltage of the power source (not shown) for the portable telephone 30 and compare this voltage value with a voltage value for setting the automatic answering/recording mode which is previously set and stored in the RAM 34.

(6) Control function to set the automatic answering/recording mode when it is detected by function (5) that the monitored voltage value of the power source is equal to or less than the voltage value for setting the automatic answering/recording mode.

(7) Timer (clocking) function.

(8) Function to compare the result of clocking by timer function (7) above with a clocking value for setting the automatic answering/recording mode which is previously set and stored in the RAM 34.

(9) Control function to set the automatic answering/recording mode when the result of clocking by timer function (7) above reaches the clocking value for setting the automatic answering/recording mode.

(10) Control function to set/cancel the automatic answering/recording mode and the normal mode by switching the bus changeover switch 43 based on the result of identification by the voice recognition control unit 42.

(11) Function to compare caller's identification information (telephone number, ID or the like) provided by an incoming call with identification information which is previously set and stored in the RAM 34.

(12) Control function to set/cancel the automatic answering/recording mode and the normal mode based on the result of comparison by function (11) above.

Operations of thus constructed portable telephone 30 according to the present embodiment will now be described in detail.

First, for example, when a ringing tone volume is changed by operating a volume control (volume key) on the portable telephone 30, the key switch 39 outputs to the display-keypad control unit 37 a signal indicating that the volume key has been depressed. The display-keypad control unit 37 displays this newly designated ringing tone volume on the liquid crystal display 38 or the like and outputs this new volume value to the main CPU 36.

Figure 8A:
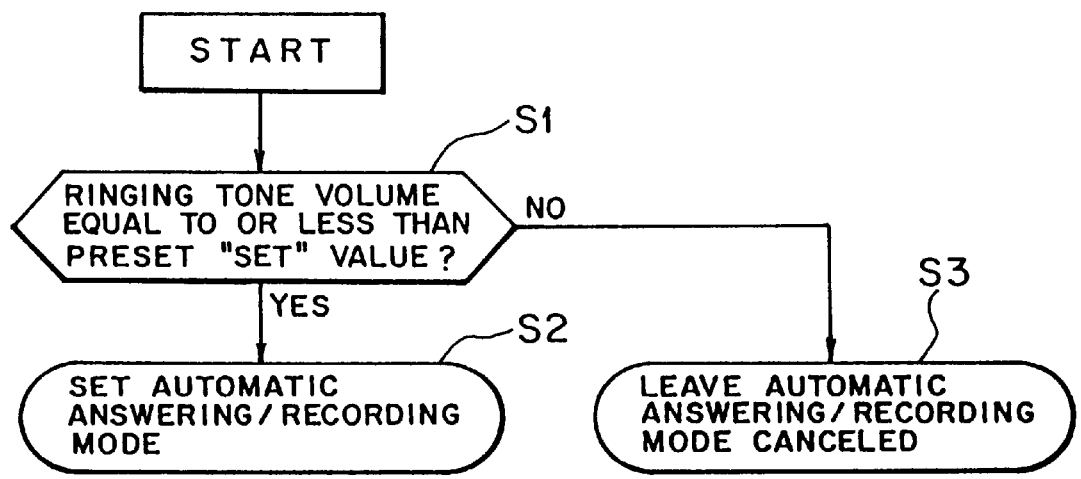
FIGS. 8(a) and 8(b) are flowcharts for explaining an operation to set a normal mode or an automatic answering/recording mode in accordance with a ringing tone volume in the portable telephone according to the first embodiment.
Figure 8B:
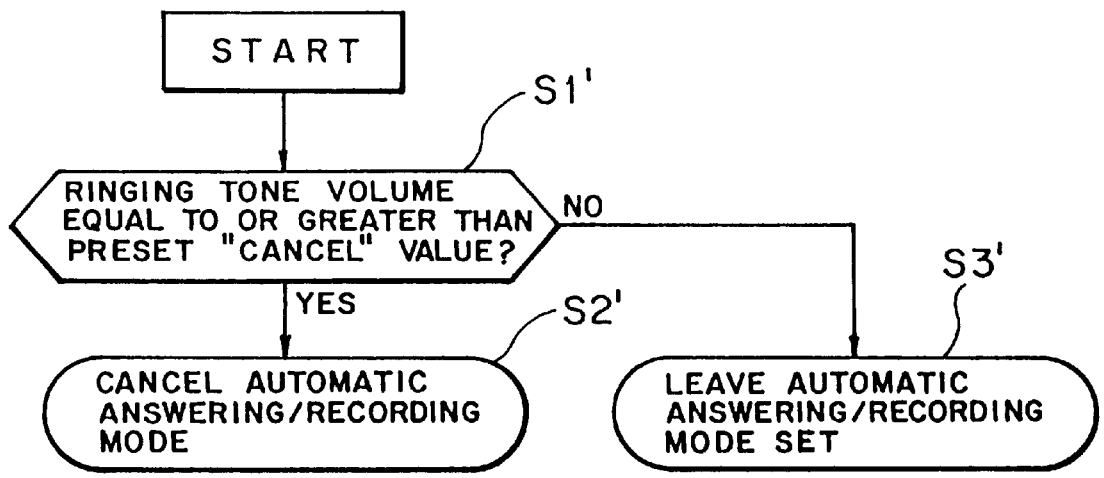

Furthermore, as shown in FIG. 8(*a*), the main CPU 36 controls the electronic volume 45 according to the new volume value to set a ringing tone volume. At the same time, the main CPU 36 reads the volume value for the automatic answering/recording mode and the volume value for the normal mode from the RAM 34 to compare them with the ringing tone volume designated by the user, thereby determining whether or not the designated ringing tone volume is equal to or less than the volume value for the automatic answering/recording mode (step S1).

If the designated ringing tone volume is equal to or less than the volume value for the automatic answering/recording mode, then the main CPU 36 activates the automatic answering/recording mode control unit 41 and switches the bus changeover switch 43 to the side of the automatic answering/recording mode control unit 41, whereby the automatic answering/recording mode is set (from YES route of step S1 to step S2). On the contrary, if the designated volume is not equal to or less than the volume value for setting the automatic answering/recording mode, then the automatic answering/recording mode remains canceled (from NO route of step S1 to step S3).

As shown in FIG. 8(*b*), when the user changes a ringing tone volume in a state in which the automatic answering/recording mode has been set as above, the main CPU 36 compares the ringing tone volume with the volume value for the automatic answering/recording mode and the volume value for the normal mode, both contained in the RAM 34 (step S1'). If the ringing tone volume is equal to or greater than the volume value for the normal mode, then the CPU 36 switches the bus changeover switch 43 to the side of the microphone 48 so as to cancel the automatic answering/recording mode (set the normal mode) (from YES route of step S1' to step S2'), thereby allowing voice entered from the microphone 48 to be transmitted to a remote party via the radio unit 31. If the ringing tone volume is not equal to or greater than the volume value for the normal mode, the automatic answering/recording mode remains set (from NO route of step S1' to step S3').

That is, for example, assuming that a volume of "0" to "10" (a volume value of the electronic volume 45) is available for ringing and that the volume value for the automatic answering/recording mode is preset to "3" and also that the volume value for the normal mode is preset to "7" which is greater than the volume value "3" for the automatic answering/recording mode, when the user sets the ringing tone volume to "3" or less, the automatic answering/recording mode is automatically set, and when the user sets the ringing tone volume to "7" or greater, the automatic answering/recording mode is canceled to enter the normal mode.

Accordingly, when the user does not want to answer an incoming call, he or she may reduce the ringing tone volume to or below the volume value for the automatic answering/recording mode. On the contrary, when the user wants to answer an incoming call, he or she may increase the ringing tone volume to or above the volume value for the normal mode. Thus, the automatic answering/recording mode or the normal mode is automatically set. Accordingly, for example, even when the user is unaware of an incoming call because of the ringing tone volume being set too low, a caller's message can be automatically recorded in the automatic answering/recording mode.

Figure 9A:
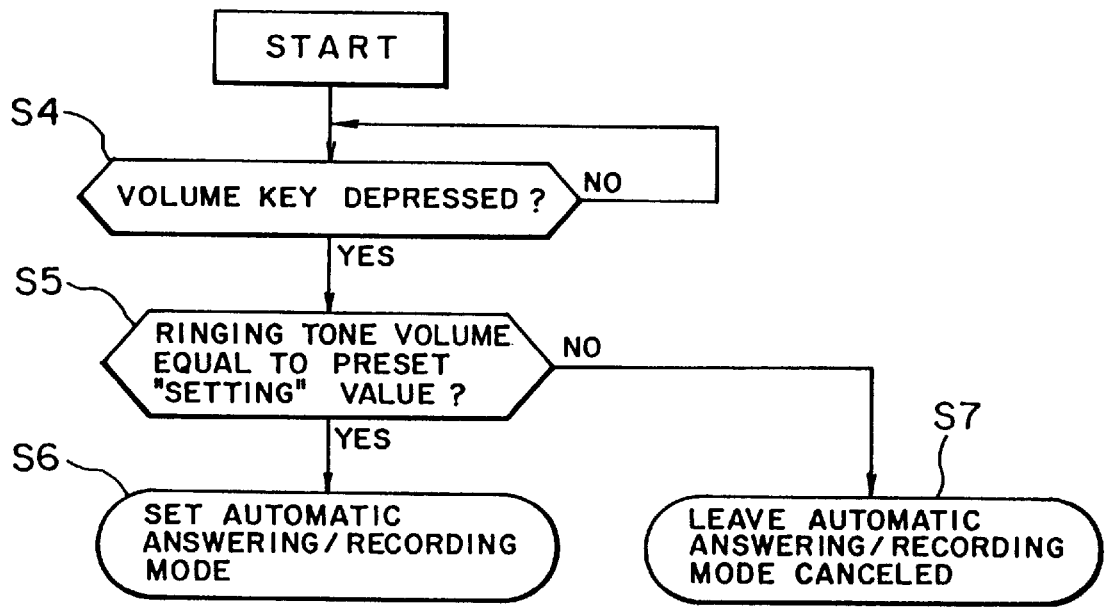
FIGS. 9(a) and 9(b) are flowcharts for explaining an operation to set the normal mode or the automatic answering/recording mode in accordance with the ringing tone volume in the portable telephone according to the first embodiment.
Figure 9B:
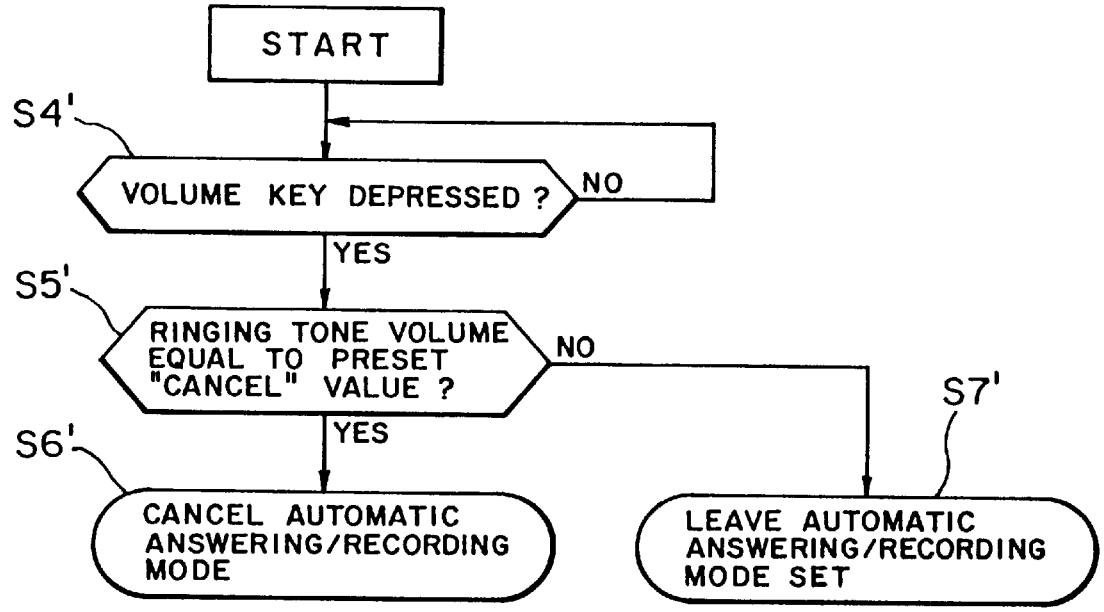

The above-mentioned volume values for the automatic answering/recording mode and the normal mode are variable, and the automatic answering/recording mode is set/canceled in response to a change in the volume values as illustrated in FIGS. 9(a) and 9(b).

In detail, as shown in FIG. 9(a), first, the main CPU 36 repeatedly determines whether or not the volume key has been depressed (NO route of step S4). When the ringing tone volume changes as a result of the volume key being depressed, the CPU 36 further determines whether or not the newly designated ringing tone volume is equal to or less than the volume value for the automatic answering/recording mode (from YES route of step S4 to step S5).

If the designated ringing tone volume is equal to or less than the volume value for the automatic answering/recording mode, then the automatic answering/recording mode is set (from YES route of step S5 to step S6). If not, the automatic answering/recording mode remains canceled (from NO route of step S5 to step S7).

On the other hand, as shown in FIG. 9(b), when the automatic answering/recording mode is already set, first, the main CPU 36 repeatedly determines whether or not the volume key has been depressed (NO route of step S4'). When the ringing tone volume changes as a result of the volume key being depressed, the CPU 36 further determines whether or not the newly designated ringing tone volume is equal to or less than the volume value for the normal mode, which is stored in the RAM 34 (from YES route of step S4' to step S5').

If the designated ringing tone volume is equal to or greater than the volume value for the normal mode, then the CPU 36 switches the bus changeover switch 43 to the side of the microphone 48, whereby the automatic answering/recording mode is canceled to enter the normal mode (from YES route of step S5' to S6'). If the designated ringing tone volume is less than the volume value for the normal mode, the automatic answering/recording mode remains set.

As has been stated above, in the portable telephone 30 according to the present embodiment, since the volume value for the normal mode is set to be greater than a preset value for the automatic answering/recording mode, the state for entering the normal mode can be clearly discriminated from the state for entering the automatic answering/recording mode, whereby the normal mode can be securely switched to and from the automatic answering/recording mode.

Also, the preset value for the normal mode and the preset value for the automatic answering/recording mode, both stored in the RAM 34, can be changed by the user in the above-described manner. The user, therefore, can freely change the set values of the ringing tone volume for setting the normal mode or the automatic answering/recording mode.

Also, in the portable telephone 30 according to the present embodiment, if the volume value for the automatic answering/recording mode is preset to "0" in the RAM 34, the user may set the ringing tone volume to "0" to mute ringing when he or she does not want to answer an incoming call, whereby the automatic answering/recording mode is automatically set. In this case, if the user sets the ringing tone volume to other than "0", the normal mode is set.

Figure 10A:
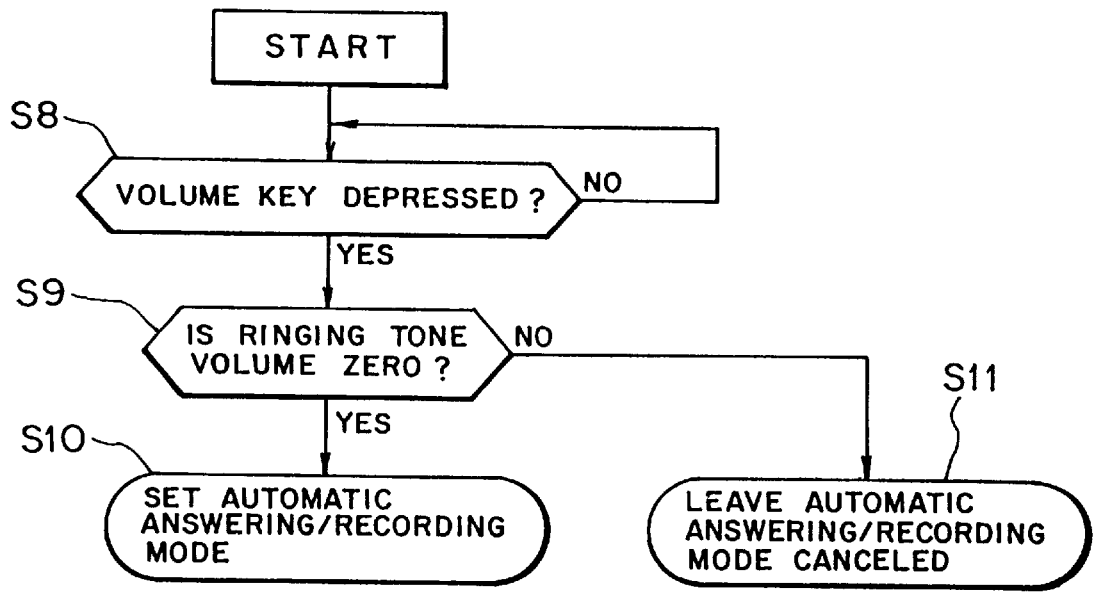
FIGS. 10(a) and 10(b) are flowcharts for explaining an operation to set the normal mode or the automatic answering/recording mode in accordance with the ringing tone volume in the portable telephone according to the first embodiment.

In detail, as shown in FIG. 10(a), first, the main CPU 36 repeatedly determines whether or not the volume key is depressed (NO route of step S8). When the volume key is depressed, the CPU 36 further determines whether or not the newly designated ringing tone volume is "0" (from YES route of step S8 to step S9).

If the designated ringing tone volume is "0", then the main CPU 36 switches the bus changeover switch 43 to the side of the automatic answering/recording mode control unit 41, whereby the automatic answering/recording mode is set (from YES route of step S9 to step S10). If the designated ringing tone volume is other than "0", then the bus changeover switch 43 remains intact, and thus the automatic answering/recording mode remains canceled (from NO route of step S9 to step S11).

Figure 10B:
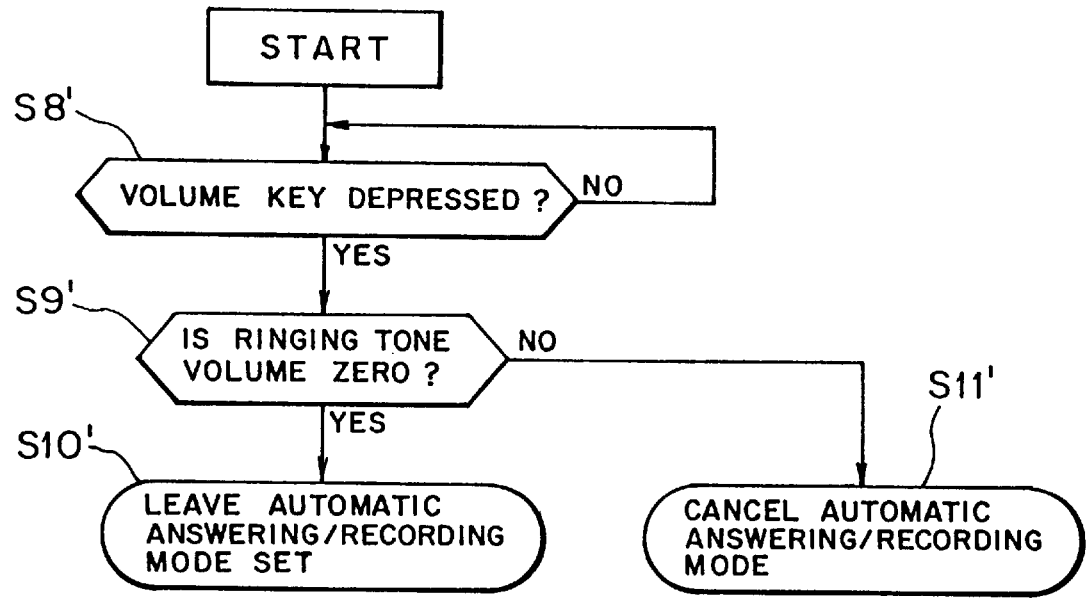

On the other hand, as shown in FIG. 10(b), even when the automatic answering/recording mode is set, the main CPU 36 repeatedly determines whether or not the volume key is depressed (NO route of step S8'). When the volume key is depressed, the CPU 36 further determines whether or not the newly designated ringing tone volume is "0" (from YES route of step S8' to step S9').

If the designated ringing tone volume remains "0", then the main CPU 36 leaves the bus changeover switch 43 intact, whereby the automatic answering/recording mode remains set (that is, the normal mode is not set) (from YES route of step S9' to step S10'). On the other hand, if the designated ringing tone volume is other than "0", then the main CPU 36 switches the bus changeover switch 43 to the side of the microphone 48, whereby the automatic answering/recording mode is canceled to enter the normal mode (from NO route of step S9' to step S11').

In the portable telephone 30, as above, by presetting the volume value for the automatic answering/recording mode so as to be equivalent to the ringing tone volume of "zero", even when the user sets the ringing tone volume to zero, because he or she does not want to answer an incoming call, the automatic answering/recording mode is automatically set on receipt of a call, whereby a caller's message or the like can be recorded (accumulated) without fail. Also, even when the user forgets setting the ringing tone volume to zero and does not become aware of an incoming call, a caller's message or the like can be recorded without fail.

When a call is received in the automatic answering/recording mode as above, the CPU 36 activates the automatic answering/recording mode control unit 41, and the automatic answering/recording function control unit 413 reads a preregistered message (for example, "I have gone out. Please leave a message after a beep.") from the RAM 412 and outputs the message to the baseband unit 40, which converts the voice message to an analog audio signal and transmits the signal to a caller-side portable telephone via the radio unit 31.

Then, the automatic answering/recording function control unit 413 converts a voice message (information) received from the caller-side portable telephone to an electric signal and accumulates the signal in the RAM 412.

The automatic answering/recording operation described above is usually executed after producing ringing a plurality of times. In the present embodiment, the repeat number of ringing to be produced can be set in accordance with the ringing tone volume.

Figure 11:
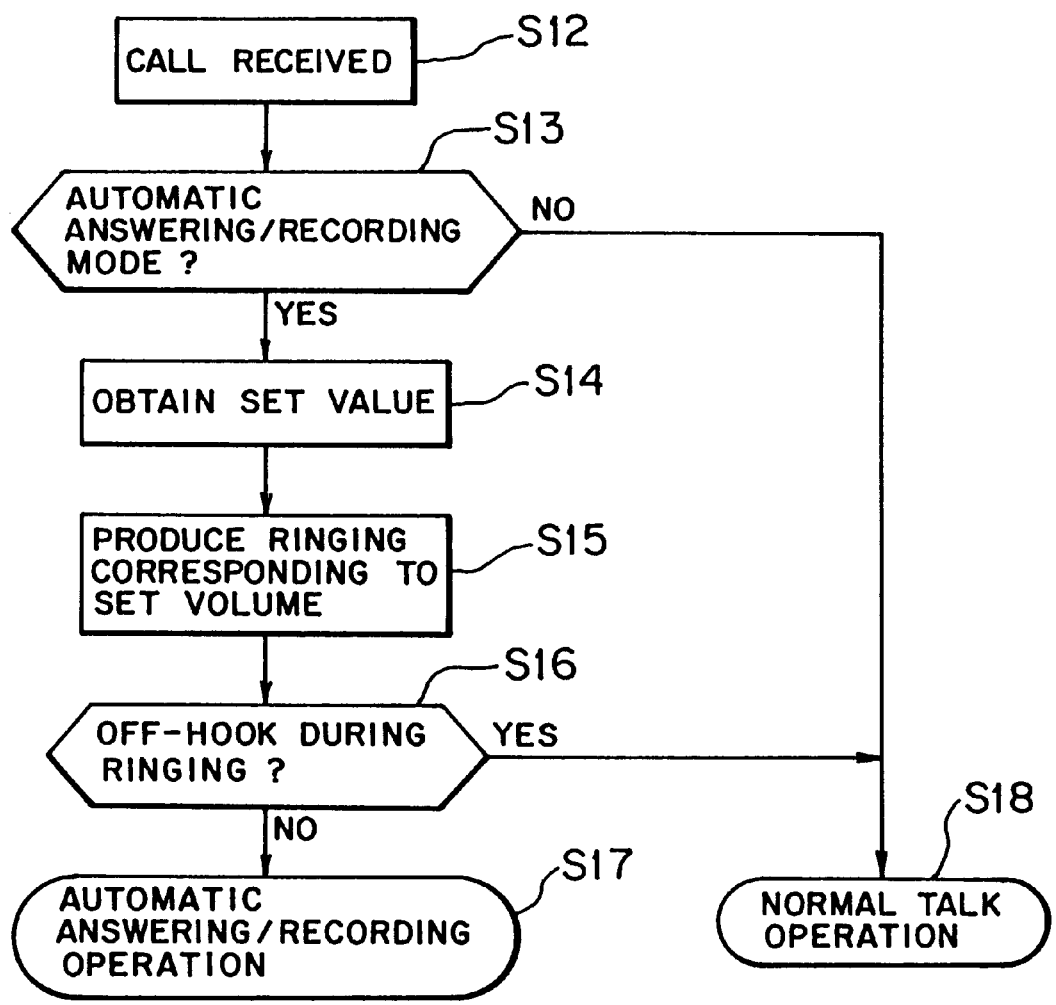
FIG. 11 is a flowchart for explaining an operation to set the repeat number of ringing, which is to be produced before an automatic answering operation is executed, in accordance with the ringing tone volume in the portable telephone according to the first embodiment.

In detail, as shown in FIG. 11, when a call is received (step S12), the main CPU 36 determines whether or not the automatic answering/recording mode has been set (step S13). If the automatic answering/recording mode has not been set, then the CPU 36 obtains the value to which the ringing tone volume is currently set (step S14).

Then, the CPU 36 produces ringing the number of which corresponds to the ringing tone volume, before an automatic answering/recording operation is executed (step S15). For example, when the ringing tone volume is set to "5", the main CPU 36 produces ringing 10 times and then activates the automatic answering/recording mode control unit 41 to execute the automatic answering/recording operation. When the ringing tone volume is set to "1", the CPU 36 produces ringing twice and then activates the automatic answering/recording mode control unit 41 to execute the automatic answering/recording operation.

The repeat number of ringing to be produced which corresponds to the ringing tone volume, as described above, is preregistered in the RAM 34 by the user.

It is possible to change the relationship between the repeat number of ringing to be produced before the automatic answering/recording operation is executed and the ringing tone volume. For example, the larger the volume, the fewer the repeat number of ringing to be produced can be. On the contrary, the larger the volume, the greater the repeat number of ringing to be produced can be.

Accordingly, the user can more freely set the repeat number of ringing to be produced before information like a message transmitted from a caller is stored in the automatic answering/recording mode.

Furthermore, during ringing being produced, the CPU 36 determines whether or not an off-hook operation is performed, for example, by depressing a talk button (step S16). If the off-hook operation is not performed, then the automatic answering/recording function control unit 413 records (accumulates) in the RAM 41 a voice message which has been received from a caller-side portable telephone via the radio unit 31.

Meanwhile, a talk operation is performed in the normal mode in either case of the following: (a) when a call is received in a state in which the automatic answering/recording mode has not been set and (b) when an off-hook operation is performed during ringing being produced (step S18).

In the portable telephone 30, as above, the user can set, in accordance with the volume designated by the electronic volume 45 used for adjusting the ringing tone volume, the repeat number of ringing to be produced before information like a voice message received from a caller is accumulated in the RAM 412 of the automatic answering/recording mode control unit 41 in the automatic answering/recording mode. Accordingly, it is not necessary for the user to preset for individual cases the repeat number of ringing to be produced before the automatic answering/recording operation is executed, whereby the portable telephone 30 becomes more easy and simple to operate.

Figure 12A:
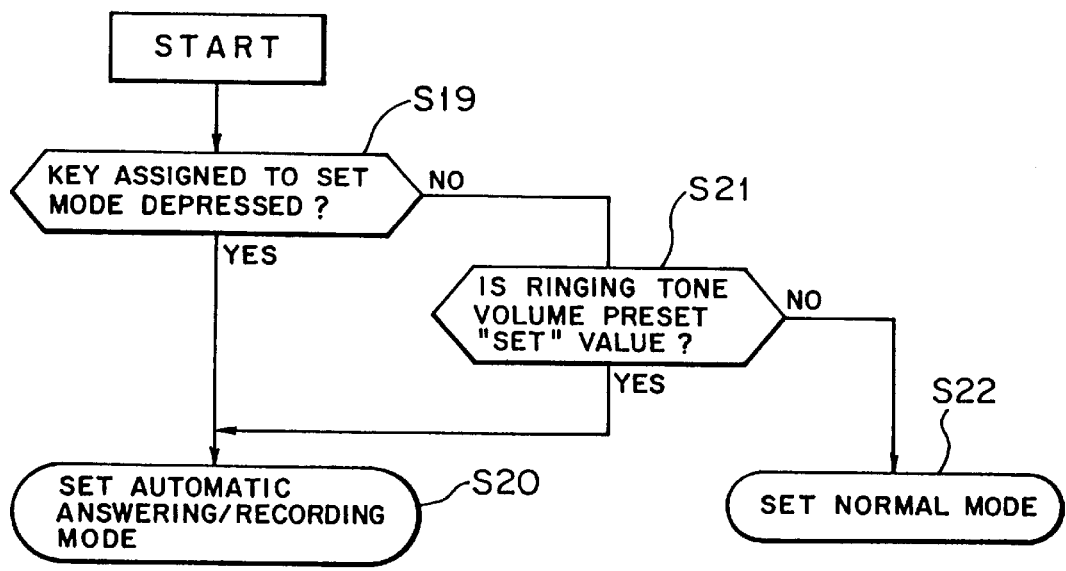
FIGS. 12(a) and 12(b) are flowcharts for explaining an operation to set the normal mode or automatic answering/recording mode in accordance with the ringing tone volume in the portable telephone according to the first embodiment, in which the automatic answering/recording mode or the normal mode has not been set in advance.
Figure 12B:
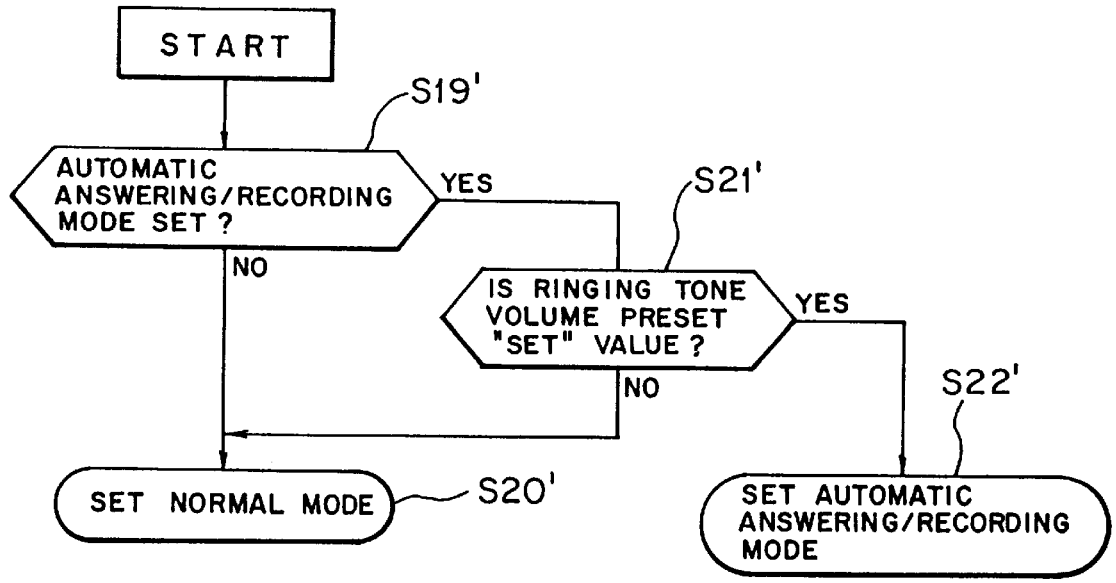

Also, in the portable telephone 30 according to the present embodiment, as shown in FIG. 12(*a*), when the automatic answering/recording mode has already been set, for example, by depressing a key assigned to set the automatic answering/recording mode, the automatic answering/recording mode remains set regardless of the ringing tone volume (from YES route of step S19 to step S20). When the automatic answering/recording mode is not set because the key assigned to set the automatic answering/recording mode is not depressed, the ringing tone volume is compared with the volume value for the automatic answering/recording mode which is stored in the RAM 34, in the same manner as described above (from NO route of step S19 to step S21).

If the ringing tone volume is equal to or less than the volume value for the automatic answering/recording mode, then the automatic answering/recording mode is set (from YES route of step S21 to step S20). If not, the normal mode is set (from NO route of step S21 to step S22).

On the other hand, as shown in FIG. 12(*b*), when the normal mode has already been set, for example, by depressing the key assigned to set the normal mode, the normal mode remains set regardless of the ringing tone volume unless the automatic answering/recording mode is set, for example, by depressing a key assigned to set the automatic answering/recording mode (from NO route of step S19' to step S20'). When the normal mode has not been set because the key assigned to set the normal mode is not depressed, for example, the ringing tone volume is compared with the volume value for the normal mode and the volume value for the automatic answering/recording mode (step S21'). If the ringing tone volume is equal to or less than the volume value for the automatic answering/recording mode, then the automatic answering/recording mode is set (from YES route of step S21' to step S22'). If the ringing tone volume is equal to or greater than the volume value for the normal mode, then the normal mode is set (from No route of step S21' to step S22').

Accordingly, when the user turns down ringing because he or she does not want to answer an incoming call or when the user forgets turning down ringing and does not become aware of an incoming call, the incoming call is automatically answered to accumulate received information without fail.

When the automatic answering/recording mode is set in the above-described manner, the CPU 36 automatically controls the muting unit 46 so as to mute a transmitting voice input from the microphone 48 (to bring a transmission level to zero). On the contrary, when the normal mode is set, the CPU 36 automatically controls the muting unit 46 to release the mute state.

Accordingly, the power consumption of the microphone 48 and the like which are not used in the automatic answering/recording mode can be cut down, whereby the power consumption of the portable telephone 30 can also be cut down to a great extent.

As has been described above, in the portable telephone 30, the normal mode or the automatic answering/recording mode is automatically set in accordance with the ringing tone volume. Telephone operations in the case where the user intentionally sets the automatic answering/recording mode will now be described in detail.

Figure 13:
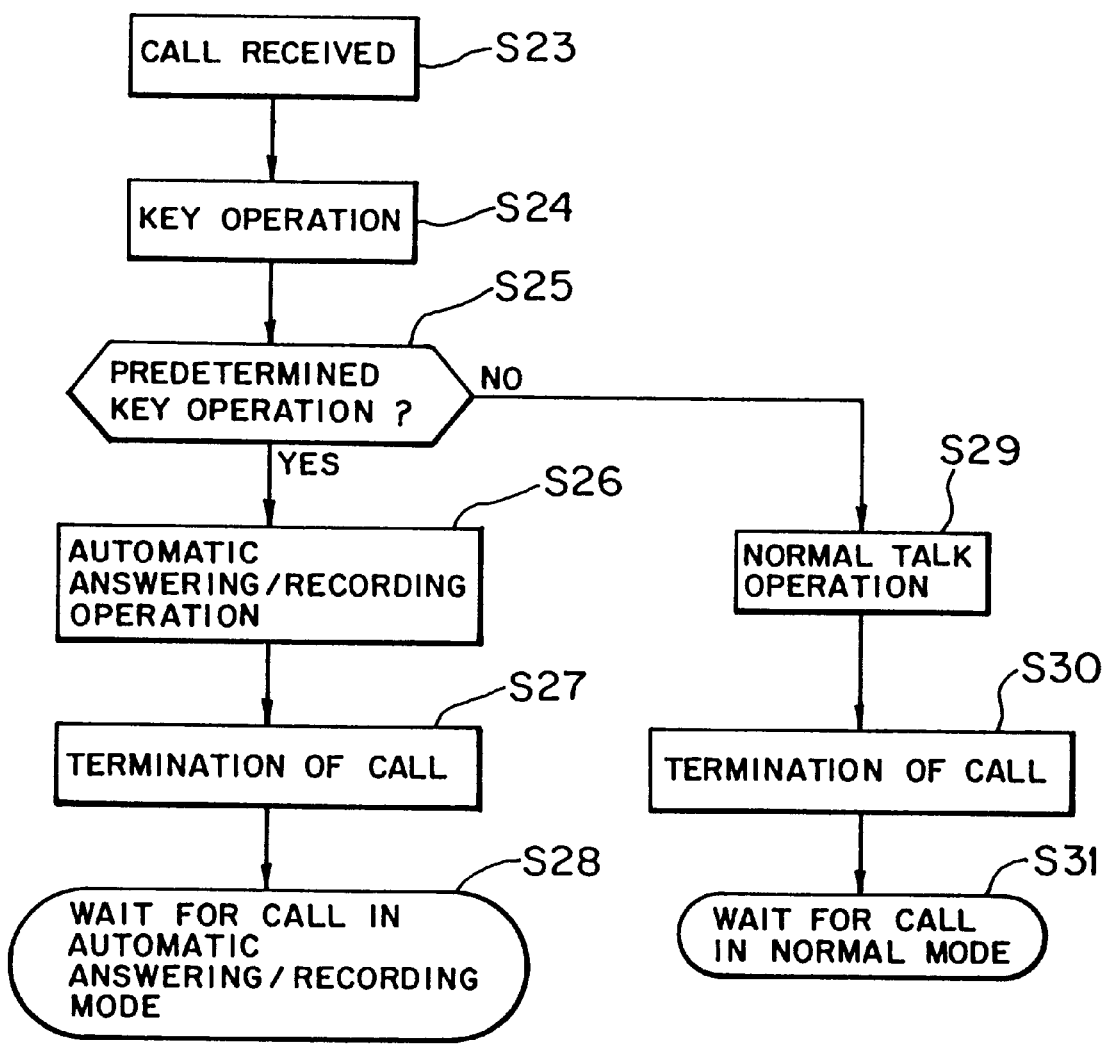
FIG. 13 is a flowchart for explaining an operation to set the automatic answering/recording mode by a predetermined key operation in the portable telephone according to the first embodiment.

As shown in FIG. 13, when a call is received in the normal mode, the CPU 36 detects the incoming call (step S23). Then, when a certain key is depressed (a predetermined key operation) on the portable telephone 30 (step S24), the display-keypad control unit 37 determines whether or not the key operation is for switching the operating mode (step S25).

If the key operation is for switching the operating mode, then the CPU 36 activates the automatic answering/recording mode control unit 41 to execute the automatic answering/recording operation (an operation to accumulate a voice message in the RAM 412) (from YES route of step S25 to step S26). When the incoming call terminates (step S27), the portable telephone 30 remains in the automatic answering/recording mode to wait for a next incoming call (step S28).

If, in step S25, the key operation is not for setting the automatic answering/recording mode, then a talk operation is executed in the normal mode for communication with a caller (from NO route of step S25 to step S29). When the call terminates (step S30), the portable telephone 30 remains in the normal mode to wait for a next incoming call (step S31).

In the portable telephone 30, as described above, when the CPU 36 detects an incoming call and the predetermined key operation for setting the automatic answering/recording mode, the automatic answering/recording mode is automatically set. Accordingly, the automatic answering/recording mode can be set by quite simple procedure.

Figure 14:
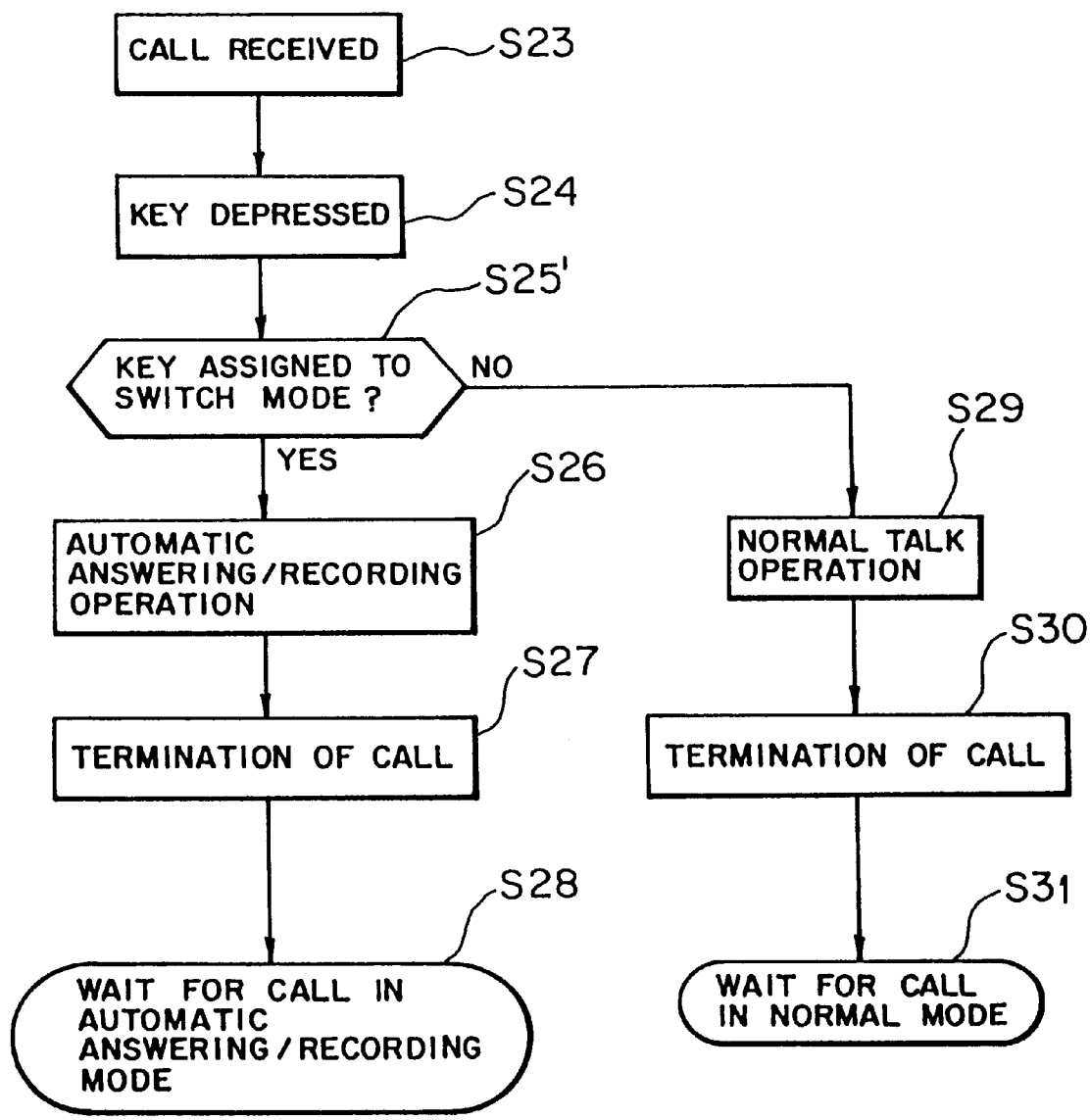
FIG. 14 is a flowchart for explaining an operation to set the automatic answering/recording mode by depressing a key assigned to set modes in the portable telephone according to the first embodiment.

The above-described predetermined key operation in the portable telephone 30 is, for example, to depress a key assigned to switch the operating mode. In this connection, as shown in step S25' in FIG. 14, the key assigned to switch the operating mode is depressed as the predetermined key operation described above, then the automatic answering/recording operation is executed. Operations in steps other than step S25' of FIG. 14 are identical to those in corresponding steps of FIG. 13.

Also, in the portable telephone 30 according to the present embodiment, it is possible for the automatic answering/recording mode control unit 41 to accumulate a voice message received from a caller-side portable telephone in the RAM 41 immediately after the predetermined key operation for switching the operating mode is executed.

Figure 15:
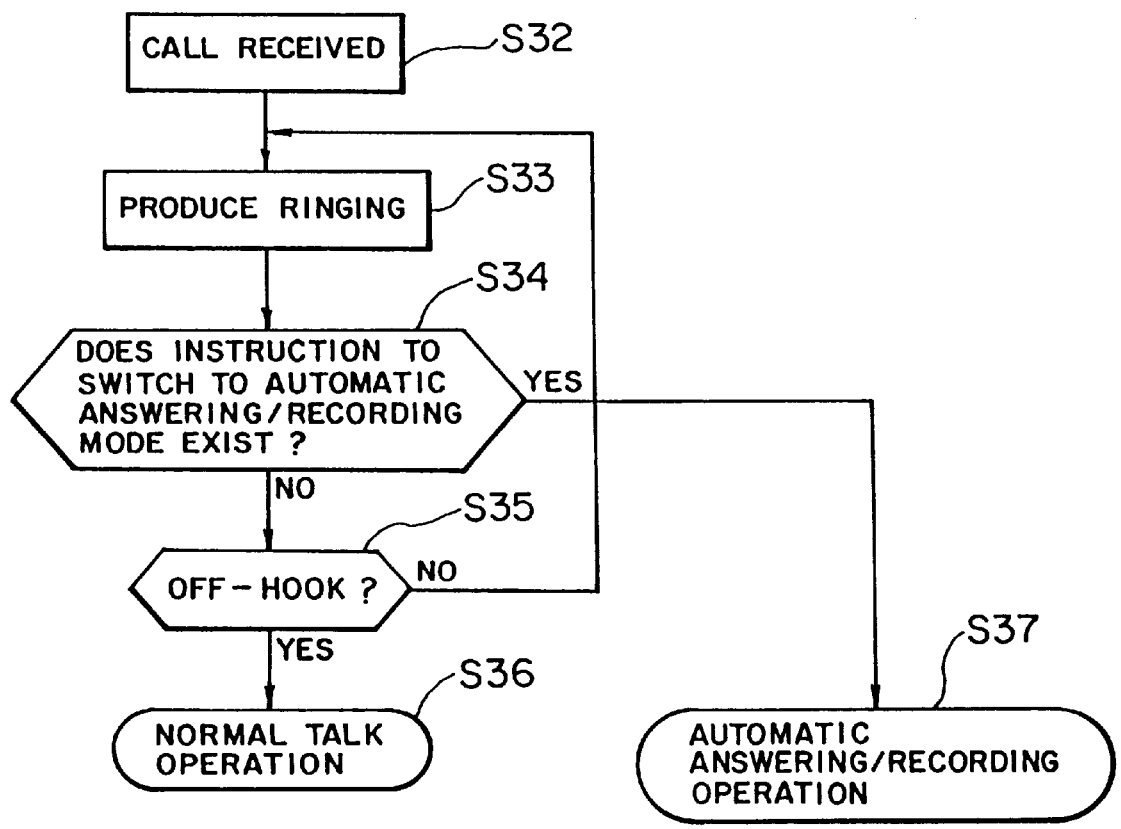
FIG. 15 is a flowchart for explaining an operation to immediately set the automatic answering/recording mode by a predetermined key operation in the portable telephone according to the first embodiment.

In detail, as shown in FIG. 15, when an incoming call received by the portable telephone 30 is detected (step S32), the CPU 36 produces ringing through the buzzer 50 (step S33). If the CPU 36 detects, in such a state, an instruction to switch to the automatic answering/recording mode, which has been issued by the predetermined key operation as described above, then the CPU 36 immediately activates the automatic answering/recording mode control unit 41 to execute the automatic answering/recording operation (an operation for accumulating a voice message) (from YES route of step S34 to step S37).

If the instruction to switch to the automatic answering/recording mode is not issued to the CPU 36, then the CPU 36 repeatedly determines whether or not an off-hook operation is performed, for example, by depressing the talk button (from NO route of step S34 to step S35 and then to NO route of step S35). At the point of time when the off-hook operation is performed, the CPU 36 controls the portable telephone 30 so as to execute a normal talk operation (from YES route of step S35 to step S36).

In the portable telephone 30, as described above, when the automatic answering/recording mode is set by a predetermined key operation, the automatic answering/recording mode control unit 41 is immediately activated to accumulate a voice message in the RAM 412. Accordingly, when the user cannot answer an abrupt incoming call for some reason or when the user intentionally does not answer an incoming call, a voice message received from a caller can be recorded by quite simple procedure.

Also, in the portable telephone 30 according to the present embodiment, when the predetermined key operation for switching the operating mode is performed, the CPU 36 controls the electronic volume 45 to set the ringing tone volume to "0". Subsequently, ringing is produced as many times as preset in the RAM 34 in accordance with the ringing tone volume before the automatic answering/recording function control unit 413 accumulates voice information in the RAM 412.

Figure 16:
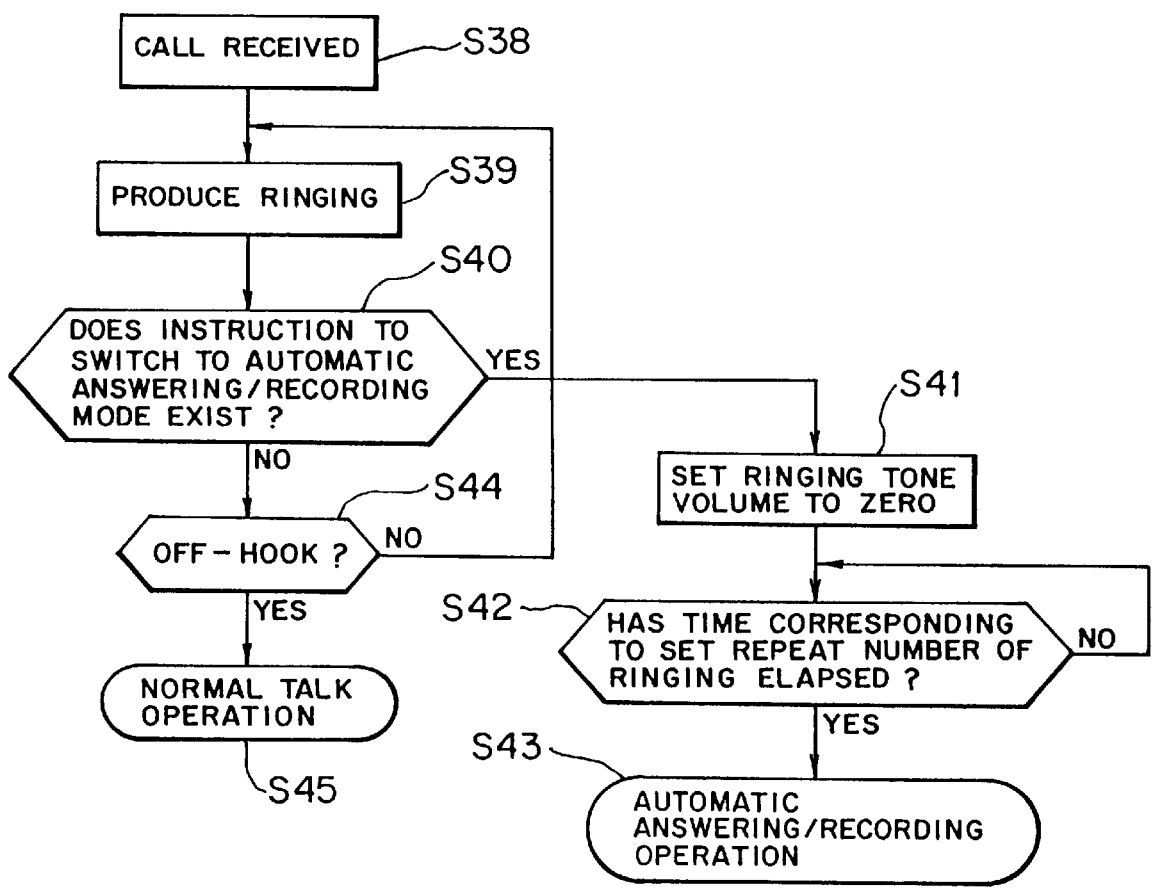
FIG. 16 is a flowchart for explaining an operation to decrease the ringing tone volume to zero, and then produce ringing in accordance with the ringing tone volume in the portable telephone according to the first embodiment.

In detail, as shown in FIG. 16, when an incoming call received by the portable telephone 30 is detected (step S38), the CPU 36 produces ringing through the buzzer 50 (step S39). If the CPU 36 detects, in this state, the predetermined key operation as described above, then the CPU 36 controls the electronic volume 45 to set the ringing tone volume to "0" (from YES route of step S40 to step S41). Then, ringing is produced as many times as preset in the RAM 34 in accordance with the ringing tone volume (NO route of step S42) before the automatic answering/recording operation (an operation for accumulating a voice message) is executed (from YES route of step S42 to step S43).

If, in step S40, a predetermined key operation for switching to the automatic answering/recording mode is not performed, then the CPU 36 repeatedly determines whether or not an off-hook operation is performed, for example, by depressing the talk button (NO route of step S44). When the off-hook operation is performed, the CPU 36 switches the bus changeover switch 43 to the side of the microphone 48 to execute a normal talk operation (from YES route of step S44 to step S45).

In the portable telephone 30, as described above, when the automatic answering/recording mode is set by the predetermined key operation, the ringing tone volume is immediately set to "0". Subsequently, ringing is produced as many times as preset in accordance with the volume value of the electronic volume 45 before voice information received from a caller is recorded. Accordingly, the period of time before starting the voice recording operation in the automatic answering/recording mode can be set by quite simple procedure.

Also, in the portable telephone 30 according to the present embodiment, if the automatic answering/recording mode has already been set when the predetermined key operation for setting the automatic answering/recording mode is performed, a received voice message can immediately be accumulated in the RAM 412 by the automatic answering/recording function control unit 413.

Figure 17:
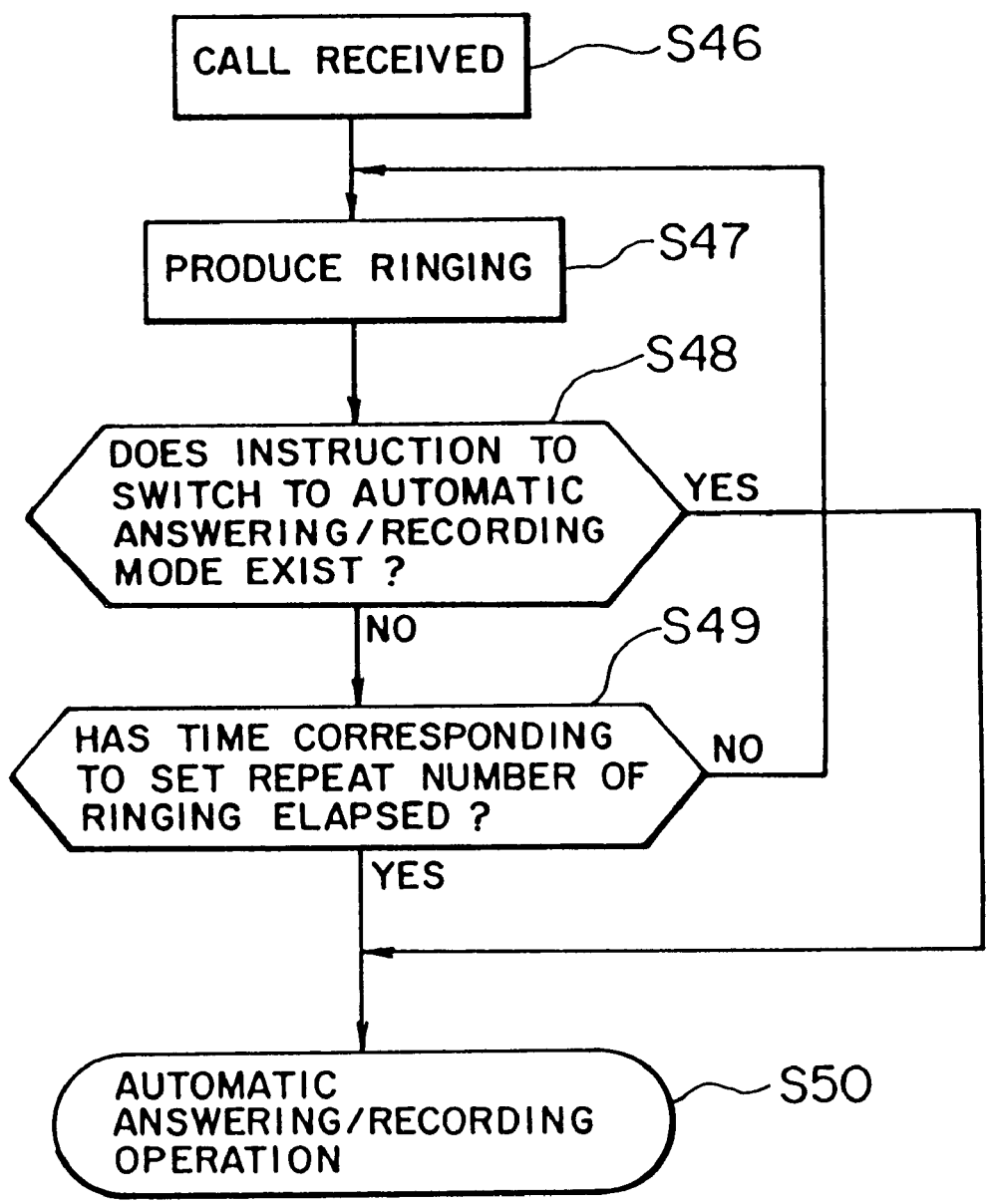
FIG. 17 is a flowchart for explaining an operation to immediately start the automatic answering/recording mode in the portable telephone according to the first embodiment, in the case where the automatic answering/recording mode has already been set at a point of time of completing a predetermined key operation.

In detail, as shown in FIG. 17, when an incoming call received by the portable telephone 30 is detected (step S46), the CPU 36 produces ringing through the buzzer 50 (step S47). If the predetermined key operation as described above is performed in such a state, and the automatic answering/recording mode has already been set, an instruction to switch to the automatic answering/recording mode is automatically issued to the CPU 36. The CPU 36 immediately controls the automatic answering/recording mode control unit 41 to accumulate a received voice message in the RAM 412 (from YES route of step S48 to step S51).

If it is determined in step S48 that the automatic answering/recording mode has not been set when the predetermined key operation is performed, then ringing is produced as many times as preset in accordance with the ringing tone volume (NO route of step S50) before the automatic answering/recording operation is executed (YES route of step S50 to step S51).

In the portable telephone 30, as described above, if the automatic answering/recording mode has already been set when the predetermined key operation is performed, the automatic answering/recording operation is immediately executed to record voice information received from a caller. Accordingly, the content of a talk from a caller can be immediately recoded even when it is an abrupt incoming call.

Also, in the portable telephone 30 according to the present embodiment, the operation may be modified such that if the automatic answering/recording mode has already been set when the predetermined key operation for switching to the automatic answering/recording mode is performed, the ringing tone volume is set to "0", and the operation for accumulating the voice of an incoming call in the RAM 412 is started immediately.

Figure 18:
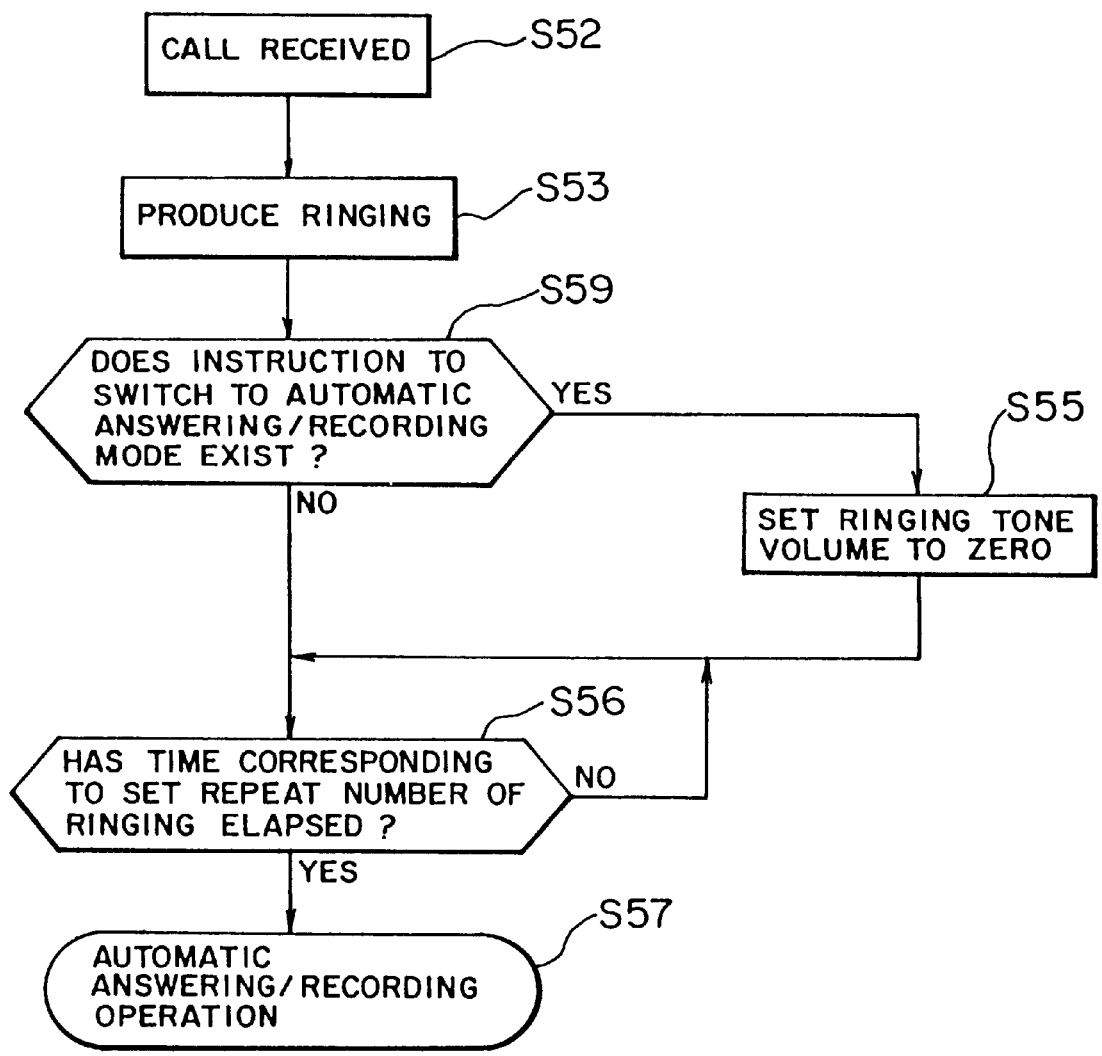
FIG. 18 is a flowchart for explaining an operation to start the automatic answering/recording mode immediately after setting the ringing tone volume to zero in the portable telephone according to the first embodiment, in the case where the automatic answering/recording mode has already been set at a point of time of completing a predetermined key operation.

In detail, as shown in FIG. 18, when an incoming call received by the portable telephone 30 is detected (step S52), the CPU 36 produces ringing through the buzzer 50 (step S53). If the predetermined key operation as described above is performed in such a state, and the automatic answering/recording mode has already been set, an instruction to switch to the automatic answering/recording mode is automatically issued to the CPU 36. The CPU 36 immediately controls the electronic volume 45 to set the ringing tone volume to "0" (from YES route of step S54 to step S55).

Subsequently, ringing is produced as many times as preset in the RAM 34 in accordance with the ringing tone volume (NO route of step S56) before the automatic answering/recording operation is executed (from YES route of step S56 to step S57).

Also, the portable telephone 30 according to the present embodiment, the automatic answering/recording mode set by the predetermined key operation for switching the operating mode can be made effective only for one incoming call. After each incoming call terminates, the normal mode is set.

Figure 19:
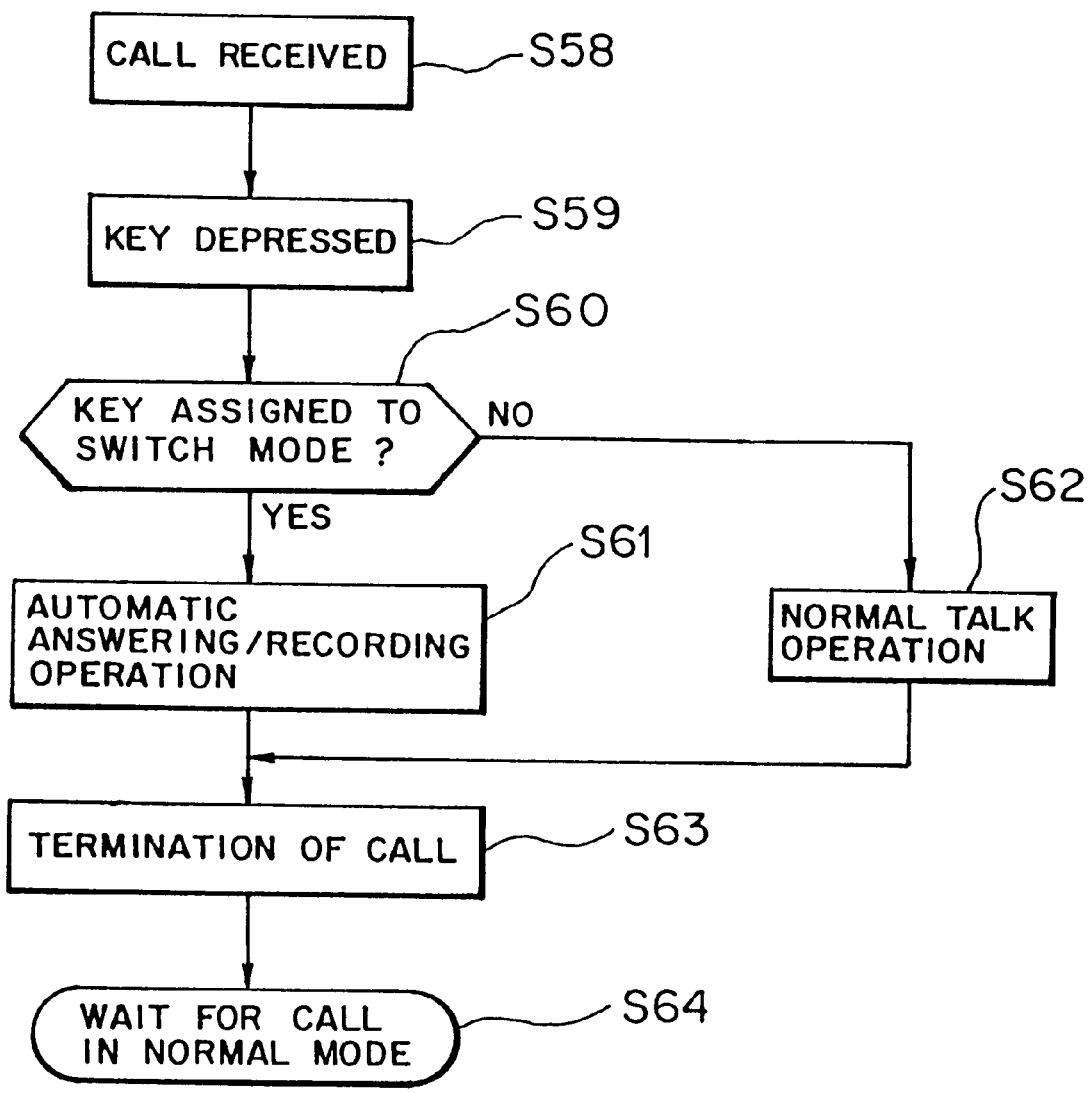
FIG. 19 is a flowchart for explaining an operation to set the automatic answering/recording mode and execute an operation for the automatic answering/recording mode only for one incoming call in the portable telephone according to the first embodiment.

In detail, as shown in FIG. 19, when the CPU 36 detects an incoming call received by the portable telephone 30 (step S58) and the display-keypad control unit 37 informs the CPU 36 that a certain key has been depressed (step S59), the CPU 36 determines whether or not the depressed key is the one assigned to switch the operating mode (step S60). If the depressed key is the one assigned to switch the operating mode, then the CPU 36 activates the automatic answering/recording mode control unit 41 to execute the automatic answering/recording operation (from YES route of step S60 to step S61). If not, a talk operation is executed in the normal mode (NO route of step S60).

In either case, when the received call terminates (step S63), the portable telephone 30 enters the normal mode (step S64).

In the portable telephone 30, as described above, the automatic answering/recording mode set by the predetermined key operation is effective only for an incoming call concerned. Accordingly, the user can set the automatic answering/recording mode only for an incoming call which he or she does not want to answer, whereby voice information such as the content of a talk can be accumulated in the RAM 412 of the automatic answering/recording mode control unit 41 without performing an ordinary talk.

Also, in the portable telephone 30 according to the present embodiment, not only is the automatic answering/recording operation executed only for one incoming call, but after executing the automatic answering/recording operation, the automatic answering/recording mode can remain set.

Figure 20:
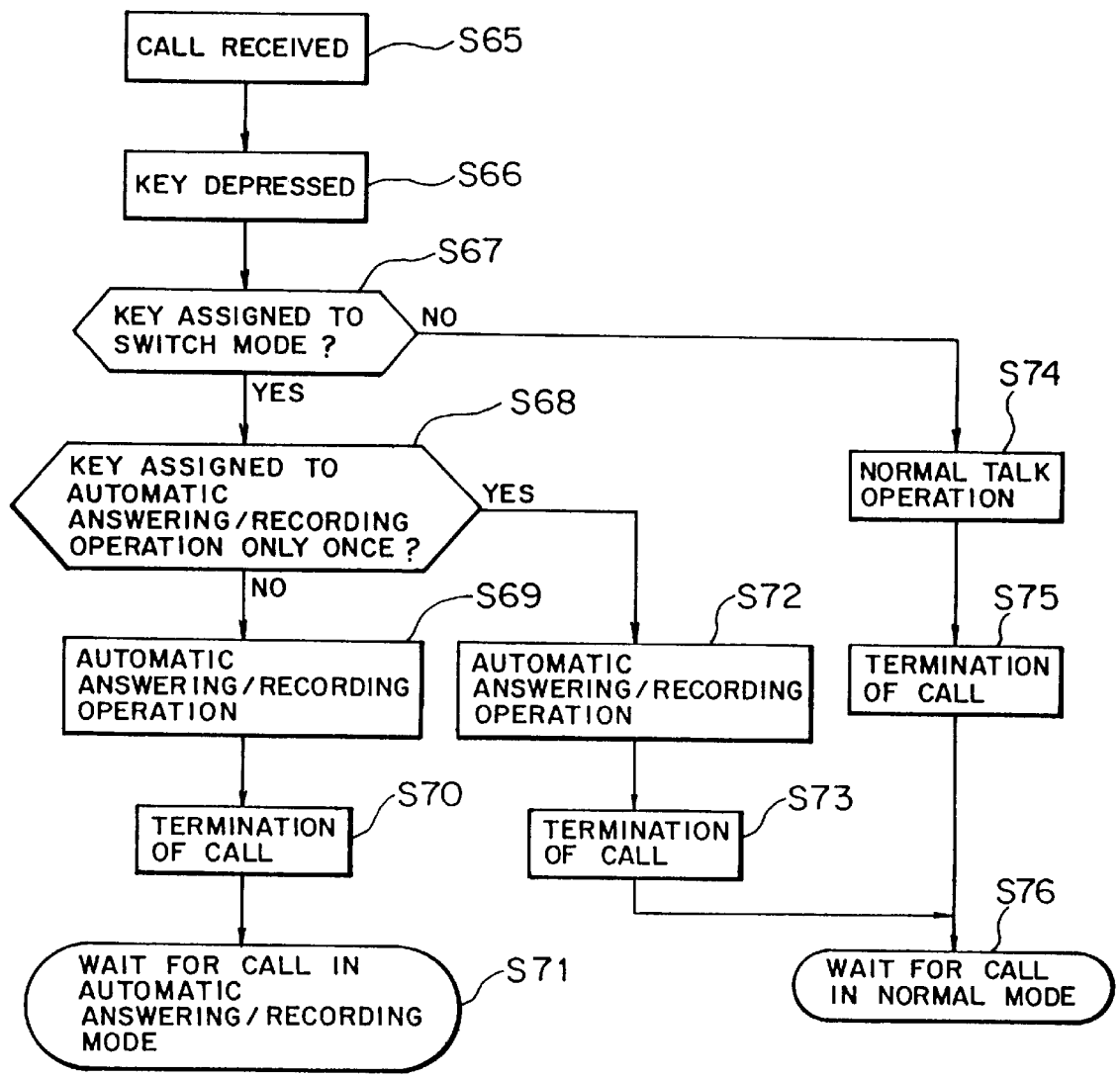
FIG. 20 is a flowchart for explaining an operation to set the automatic answering/recording mode and execute the operation for the automatic answering/recording mode a plurality of times in the portable telephone according to the first embodiment.

In detail, as shown in FIG. 20, when the CPU 36 detects an incoming call to the portable telephone 30 (step S65) and the display-keypad control unit 37 informs the CPU 36 that a certain key has been depressed (step S66), the CPU 36 determines whether or not the depressed key is the one assigned to switch the operating mode (step S67). If, in step S67, the depressed key is the one assigned to switch the operating mode, then the CPU 36 further determines whether or not the depressed key is the one assigned to execute the automatic answering/recording operation only once (step S68).

If the depressed key is not the one assigned to execute the automatic answering/recording mode only once, then the CPU 36 activates the automatic answering/recording mode control unit 41, whereby the automatic answering/recording function control unit 413 accumulates a voice message received from a caller in the RAM 412 (from NO route of step S68 to step S69).

When the received call terminates (step S70), the portable telephone 30 remains in the automatic answering/recording mode to wait for a next incoming call (step S71).

On the other hand, if the depressed key is the one assigned to execute the automatic answering/recording operation only once, then the CPU 36 activates the automatic answering/recording mode control unit 41, whereby the automatic answering/recording function control unit 413 accumulates a voice message received from a caller in the RAM 412 (from YES route of step S68 to step S72). When the received call terminates (step S73), this time, the portable telephone 30 waits for a next incoming call in the normal mode (step S76).

If it is determined in step S67 that the depressed key is not the one assigned to switch to the automatic answering/recording mode, then a talk operation is executed in the normal mode (from NO route of step S67 to step S74). When the call terminates (step S75), the portable telephone 30 remains in the normal mode to wait for a next incoming call (step S76).

In the portable telephone 30, as described above, not only is the automatic answering/recording mode set by a predetermined key operation effective only for an incoming call concerned, but after the automatic answering/recording operation is executed, the automatic answering/recording mode can remain set. Accordingly, it is not necessary for the user to re-set the automatic answering/recording mode each time voice information received from a caller is accumulated in the RAM 412 of the automatic answering/recording mode control unit 41 without an ordinary talk.

Figure 21:
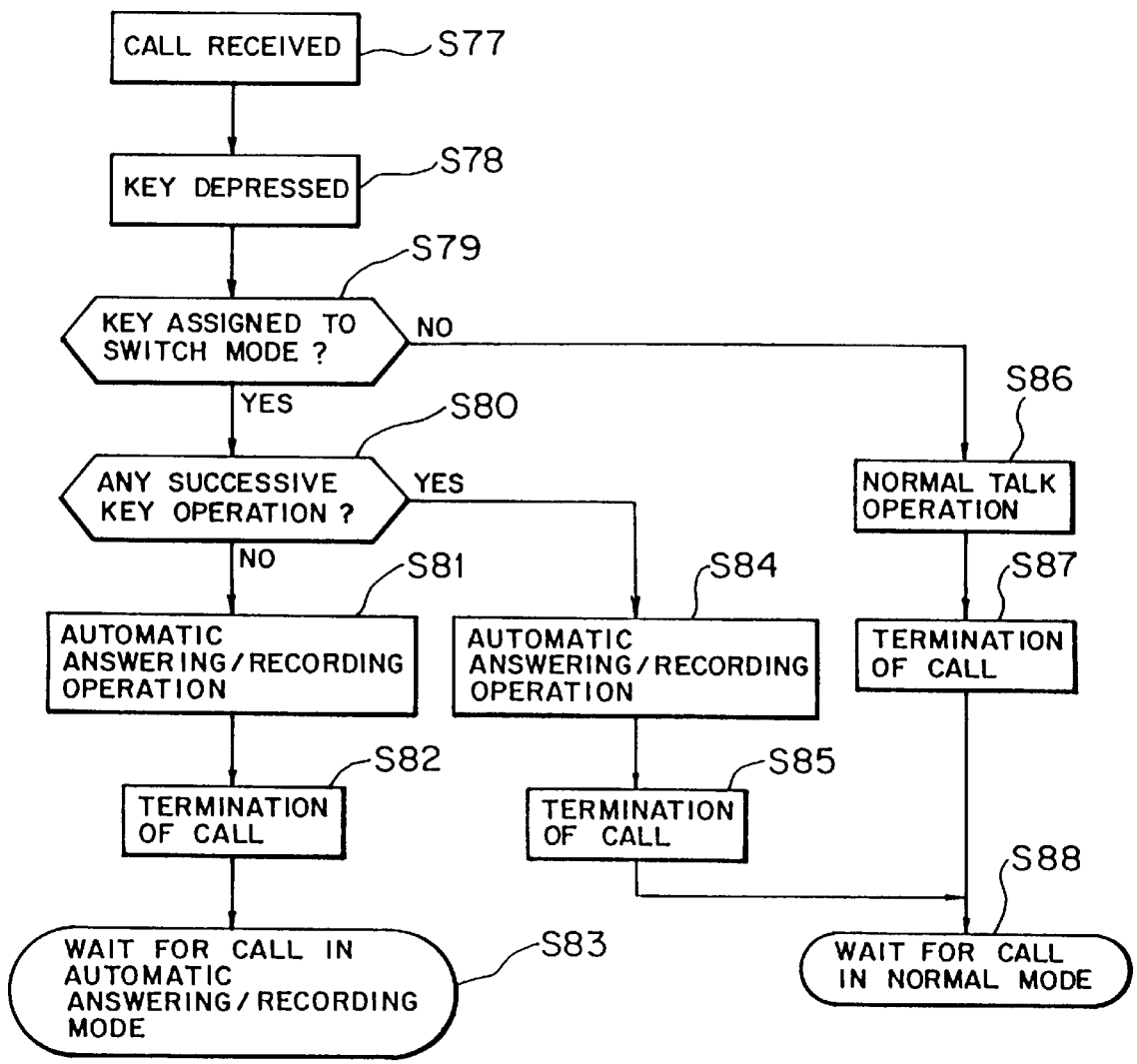
FIG. 21 is a flowchart for explaining an operation to set the automatic answering/recording mode and execute the operation for the automatic answering/recording mode a plurality of times in the portable telephone according to the first embodiment.

The above-described single time execution of the automatic answering/recording operation may be started by successively pressing a key assigned to switch the operating mode, and another arbitrary key. In this case, as shown in step S80 of FIG. 21, the CPU 36 determines whether or not an arbitrary key is depressed after the key assigned to switch the operating mode has been depressed, in contrast with step S68 of FIG. 20 where the CPU 36 determines whether or not the key assigned to execute the automatic answering/recording operation only once is depressed. Operations in steps other than step S80 of FIG. 21 are identical to those in corresponding steps of FIG. 20.

Accordingly, the automatic answering/recording operation can be performed for an incoming call by successively depressing the key assigned to switch the operating mode, and an arbitrary key which can easily be operated by the user.

Also, in the portable telephone 30 according to the present embodiment, after performing the key operation for switching the operating mode, the user may perform a key operation for setting the number of automatic answering/recording operations to be executed in the automatic answering/recording mode.

Figure 22:
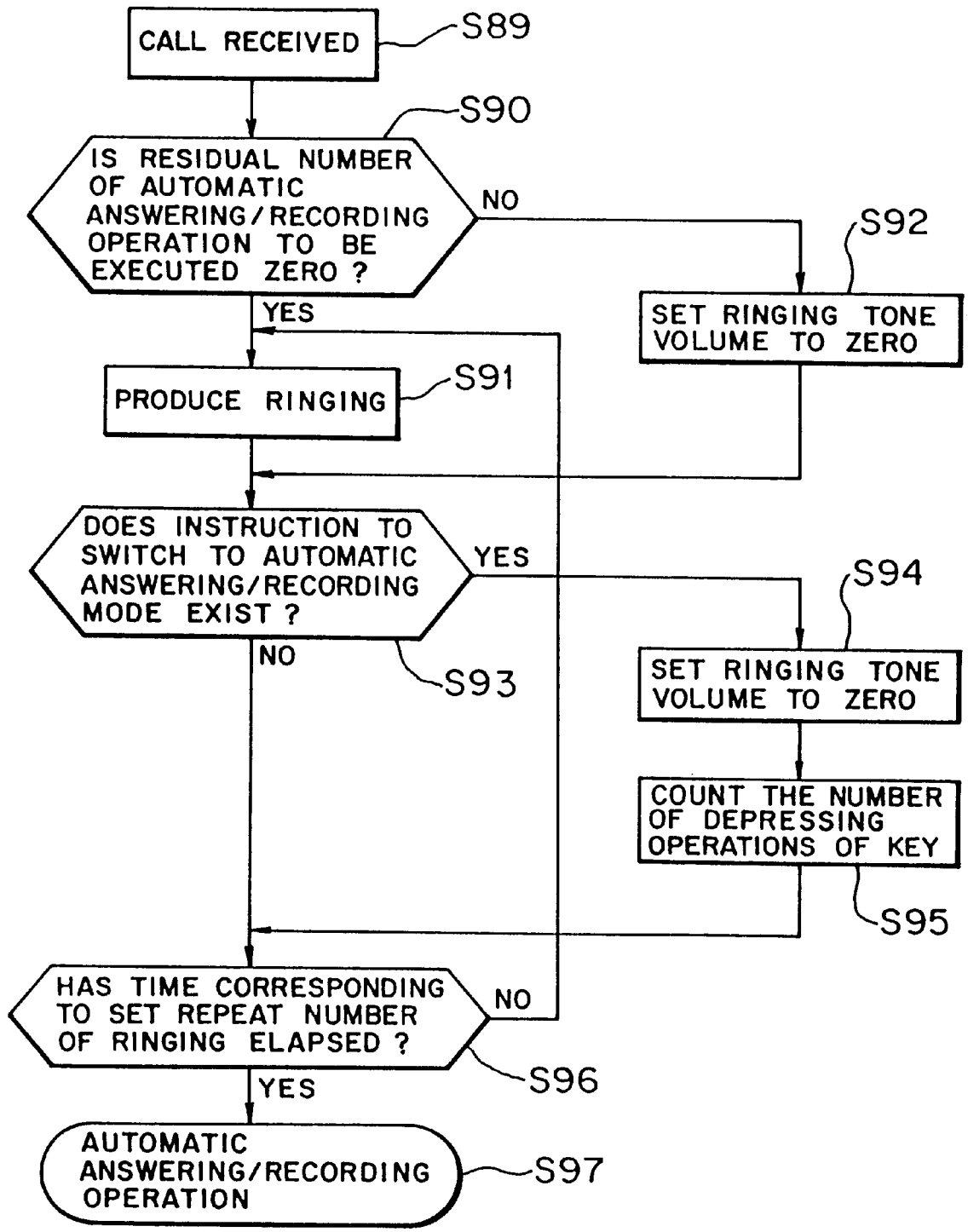
FIG. 22 is a flowchart for explaining an operation to set the number of automatic answering/recording operations to be executed in accordance with the number of depressing operations of a key and execute the operation as many times as set in the portable telephone according to the first embodiment.

Specifically, the number of automatic answering/recording operations to be executed may be set in accordance with the number of depressing operations of a certain key. As shown in FIG. 22, when an incoming call received by the portable telephone 30 is detected by the CPU 36 (step S89), the CPU 36 determines whether or not the residual number of automatic answering/recording operations to be executed is "0" (step S90). If the residual number of times "0", then the CPU 36 produces ringing through the buzzer 50 (from YES route of step S90 to step S91). If the residual number of times is not "0", then the CPU 36 controls the electronic volume 45 to set the ringing tone volume to "0" (from NO route of step S90 to step S92).

Subsequently, the CPU 36 determines whether or not an instruction to switch to the automatic answering/recording mode is issued via the key switch 39 and the display-keypad control unit 37 due to a depression of the key assigned to switch to the automatic answering/recording mode (step S93). If the instruction to switch to the automatic answering/recording mode is issued, then the CPU 36 immediately controls the electronic volume 45 to set the ringing tone volume to "0" (from YES route of step S93 to step S94).

Furthermore, the CPU 36 counts the number of depressing operations of the key assigned to switch to the automatic answering/recording mode (step S95) and then determines whether or not a period of time has elapsed which corresponds to the repeat number of ringing which has been set in accordance with the ringing tone volume (step S96). If it is determined in step S93 that the instruction to switch to the automatic answering/recording mode is not issued (i.e. the key assigned to switch to the automatic answering/recording mode is not depressed), then the CPU 36 immediately determines whether or not the period of time has been elapsed which corresponds to the repeat number of ringing which has been set in accordance with the ringing tone volume (from NO route of step S93 to step S96).

If the period of time corresponding to the repeat number of ringing has elapsed, the CPU 36 activates the automatic answering/recording mode control unit 41. Then, the automatic answering/recording mode control unit 41 causes the automatic answering/recording function control unit 413 to transmit a message telling that the user has gone out, to a caller's telephone and to record (accumulate) a voice message received from the caller in the RAM 412 (YES route of step S96 to step S97). If the period of time corresponding to the repeat number of ringing has not elapsed, the CPU 36 repeats processing starting with step S91 (NO route of step S96).

In the portable telephone 30, as described above, after performing the predetermined key operation, the user performs key operations for setting the number of automatic answering/recording operations to be executed. For example, when it is known that the user cannot answer an incoming call for a certain period of time, the user may preset the number of automatic answering/recording operations to be executed, as above, whereby voice information provided by an incoming call which might be received during the period of time can be recorded without fail. Also, the number of automatic answering/recording operations to be executed can be set in accordance with the number of depressing operations of a key as described above. This greatly facilitates the operation for setting the number of automatic answering/recording operations.

The maximum number of automatic answering/recording operations depends, for example, on the capacity of memory (RAM 412 in the present embodiment) where voice information is recorded (accumulated).

According to recent trends, portable telephones have a function called "any key answer" which allows the user to receive an incoming call, if any, by depressing any key as well as a talk key. For portable telephones having the "any key answer" function, it is necessary to distinguish a key operation for setting the automatic answering/recording mode from that for setting the normal mode.

In the portable telephone 30 according to the present embodiment, the user may depress (operate) the volume down key, which is used for turning down the ringing tone volume, whereby the automatic answering/recording mode can be set without activating the "any key answer" function.

Figure 23:
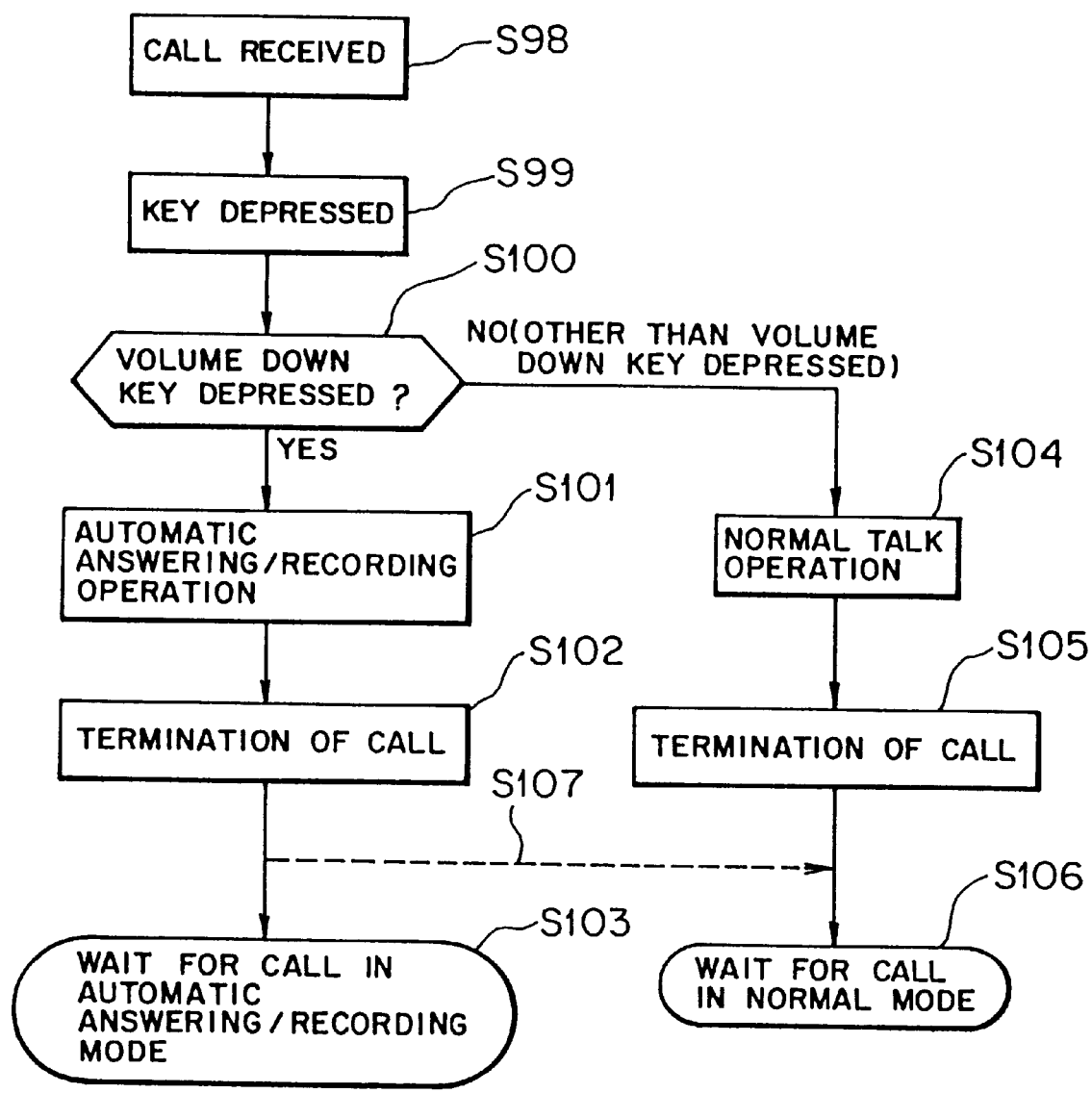
FIG. 23 is a flowchart for explaining an operation to set the automatic answering/recording mode by depressing a volume key thereby to execute the operation for the automatic answering/recording mode in the portable telephone according to the first embodiment.

In detail, as shown in FIG. 23, when an incoming call received by the portable telephone 30 is detected by the CPU 36 (step S98) and it is determined that any key is depressed (step S99), the CPU 36 determines whether or not the depressed key is the volume down key (step S100).

If the volume down key is depressed, then the CPU 36 activates the automatic answering/recording mode control unit 41 to execute the automatic answering/recording operation (from YES route of step S100 to step S101). When the received call terminates (step S102), the portable telephone 30 remains in the automatic answering/recording mode to wait for a next incoming call (step S103).

If the depressed key is other than the volume down key, then a talk operation is executed in the normal mode (from NO route of step S100 to step S104). When the call terminates (step S105), the portable telephone 30 remains in the normal mode to wait for a next incoming call (step S106).

After the automatic answering/recording operation terminates in step S102, the portable telephone 30 can enter the normal mode and wait for a next incoming call (step S107); in other words, the automatic answering/recording operation can be executed only for one incoming call, as described before (step 107).

In the portable telephone 30, as described above, the user can set the automatic answering/recording mode simply by depressing the volume down key. Therefore, the automatic answering/recording mode can be set by a very simple operation.

Also, in the portable telephone 30 according to the present embodiment, the operation may be modified such that when the volume down key is depressed once, the preset repeat number of ringing (a ringing tone volume linked preset value) to be produced before starting the automatic answering/recording operation for recording (accumulating) a voice message received from a caller remains unchanged, and when the volume down key is pressed a plurality of times, the preset repeat number of ringing is changed.

Figure 24:
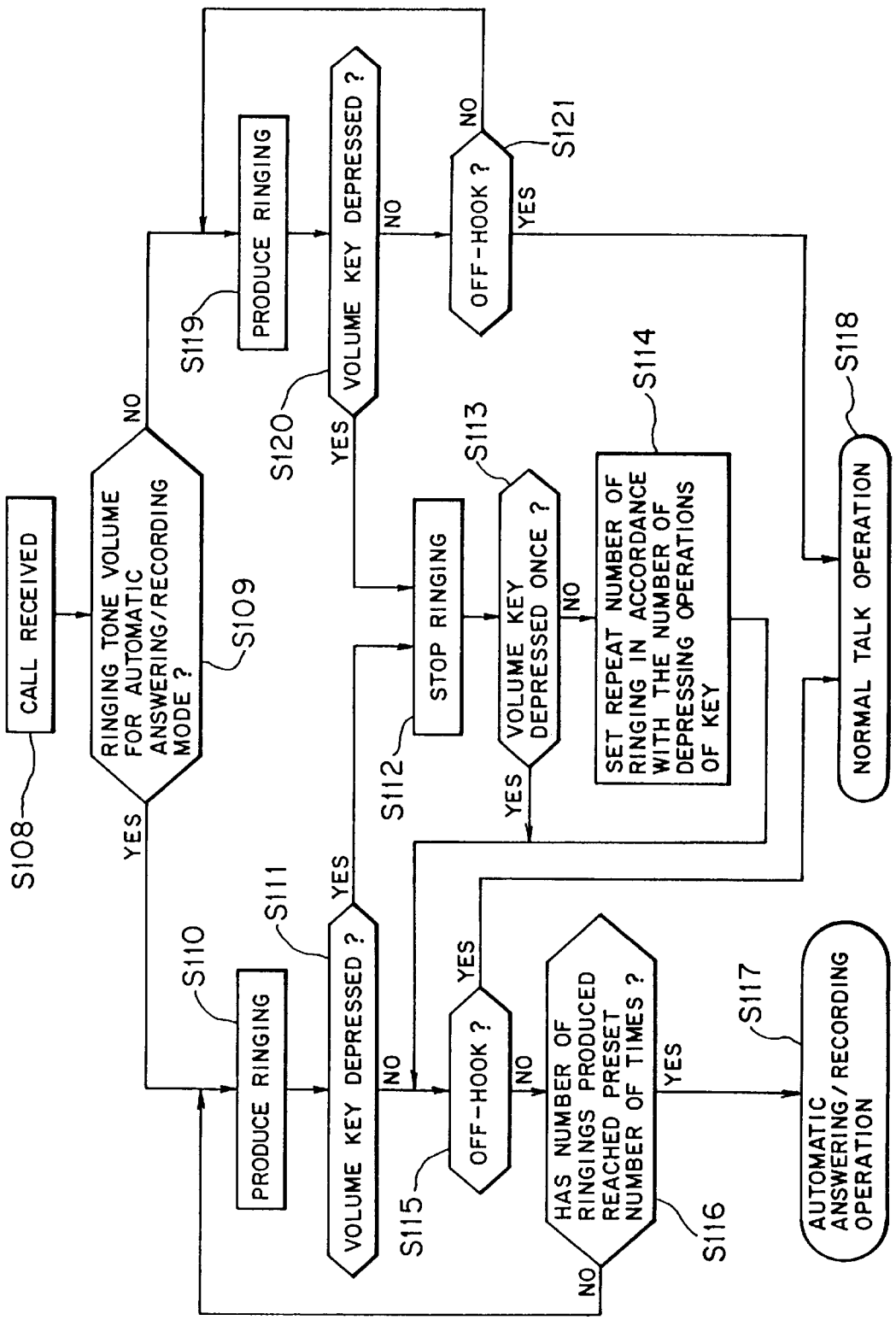
FIG. 24 is a flowchart for explaining an operation to set the repeat number of ringing in accordance with the number of depressing operation of a volume key in the portable telephone according to the first embodiment.

In detail, as shown in FIG. 24, when an incoming call received by the portable telephone 30 is detected (step S108), the CPU 36 determines whether or not the ringing tone volume is equal to or less than the volume value for the automatic answering/recording mode and whether or not the ringing tone volume is equal to or greater than the volume value for the normal mode (step S109). If the ringing tone volume is equal to or less than the volume value for the automatic answering/recording mode, then the CPU 36 produces ringing (YES route of step S109 to step S110) and then determines whether or not the volume down key is depressed (step S111).

When the CPU 36 detects via the key switch 39 and the display-keypad control unit 37 that the volume down key has been depressed, the CPU 36 controls the electronic volume 45 to mute ringing (to set the ringing tone volume to "0") (step S112) and determines whether or not the volume down key has been depressed once (step S113).

If the volume down key is depressed only once, then the CPU 36 determines whether or not an off-hook operation is performed, for example, by depressing the talk key, without changing the preset repeat number of ringing to be produced (from YES route of step S113 to step S115). If the volume down key is depressed a plurality of times, then the CPU 36 sets (determines) the repeat number of ringing in accordance to the number of depressing operations of the volume down key (from NO route of step S113 to step S114) and then determines whether or not the off-hook operation is performed, for example, by depressing the talk key (step S115).

If the CPU 36 detects that the off-hook operation is performed, then the CPU 36 switches the bus changeover switch 43 to the side of the microphone 48 to set the normal mode thereby to execute a normal talk operation (from YES route of step S115 to step S118). If the off-hook operation is not performed, then the CPU 36 determines whether or not the repeat number of ringing produced has reached the preset number of times (from NO route of step S115 to step S116). If the preset number of times is reached, then the CPU 36 activates the automatic answering/recording mode control unit 41 to execute the automatic answering/recording operation (from YES route of step S116 to step S114).

If the repeat number of ringing produced has not reached a preset number of times, then the CPU 36 repeats processing starting with step S110 (NO route of step S116).

On the other hand, if it is determined in step S109 that the ringing tone volume is equal to or greater than the volume value for the normal mode, then the CPU 36 causes ringing to be produced (step S119) and then determines whether or not the volume down key is depressed (step S120).

If the CPU 36 detects that the volume down key has been depressed, then the CPU 36 conducts processing in and after step S112 (YES route of step S120). If the volume down key is not depressed, then the CPU 36 determines whether or not the off-hook operation is performed, for example, by depressing the talk key (from NO route of step S120 to step S121).

If the CPU 36 detects an off-hook operation, then a talk operation is executed in the normal mode (from YES route of step S121 to step S118). If the off-hook operation is not performed, the automatic answering/recording operation is executed or the CPU 36 repeats processing starting with step S119 (NO route of step S121).

In the portable telephone 30, as described above, when the volume down key is depressed once, the repeat number of ringing to be produced before voice information received from a caller is accumulated in the RAM 412 of the automatic answering/recording mode control unit 41 remains unchanged, and when the volume down key is depressed twice or more, the repeat number of ringing to be produced is changed. Accordingly, the user can set the period of time before starting the operation for recording voice information received from a caller in quite simple manner.

Also, in the portable telephone 30 according to the present embodiment, when a call is received, the user may depress a termination-of-call key to set the automatic answering/recording mode and execute the operation for automatic answering/recording mode without activating the "any key answer" function.

Figure 25:
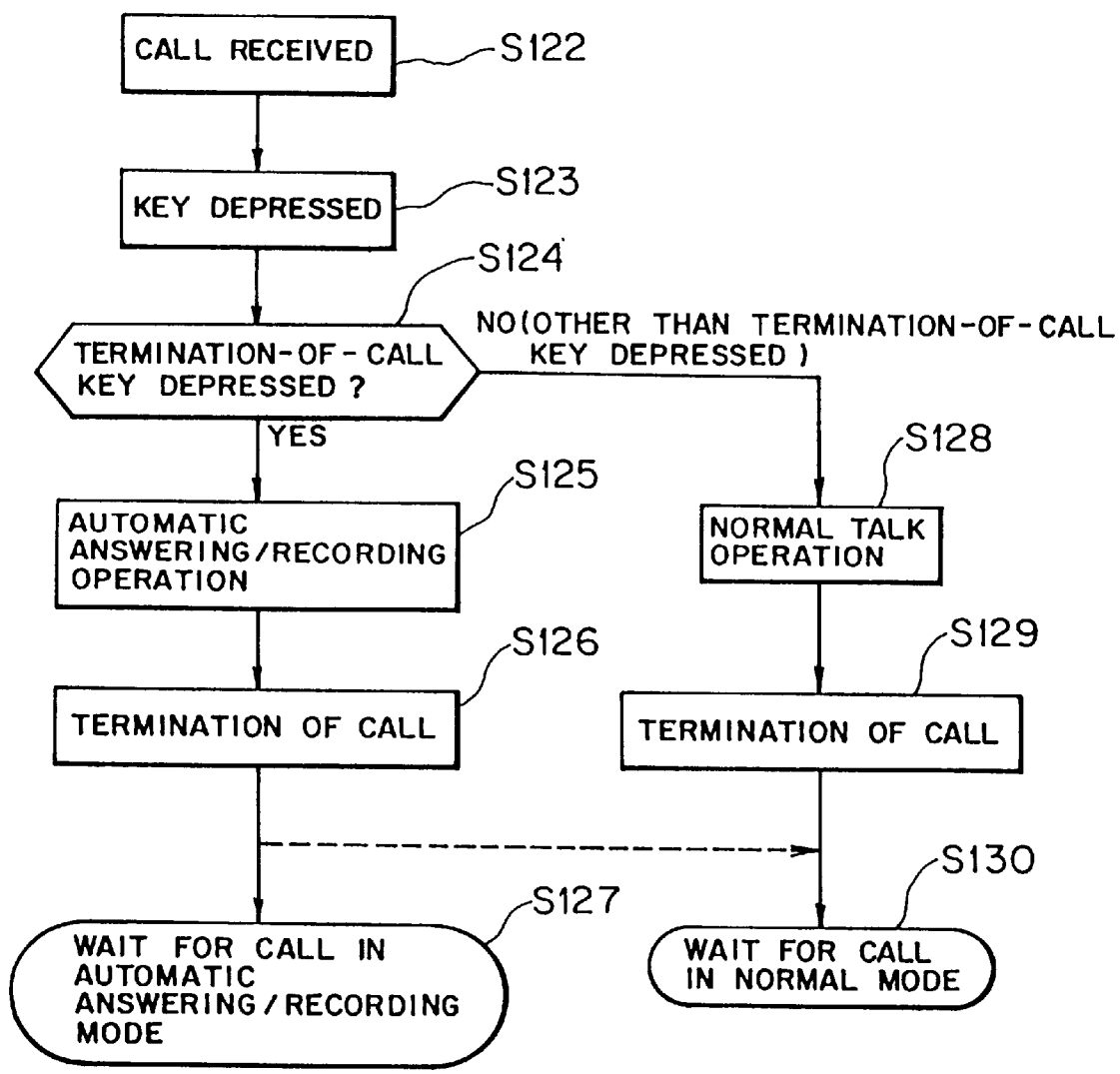
FIG. 25 is a flowchart for explaining an operation to set the automatic answering/recording mode by depressing a termination-of-call key thereby to execute the operation for the automatic answering/recording mode in the portable telephone according to the first embodiment.

In detail, as shown in FIG. 25, when an incoming call received by the portable telephone 30 (step S122) is detected by the CPU 36 and it is determined that any key is depressed (S123), the CPU 36 determines whether or not the depressed key is a termination-of-call key (step S124). If the depressed key is the termination-of-call key, then the CPU 36 activates the automatic answering/recording mode control unit 41 to execute the automatic answering/recording operation (from YES route of step S124 to step S125).

When the received call terminates and thus the automatic answering/recording operation terminates (step S126), the portable telephone 30 remains in the automatic answering/recording mode to wait for a next incoming call (step S127).

If the depressed key is other than the termination-of-call key, then the CPU 36 activates the "any key answer" function to execute a talk operation in the normal mode (from NO route of step S124 to step S128). When the call terminates (step S129), the portable telephone 30 remains in the normal mode to wait for a next incoming call (step S130).

After the automatic answering/recording operation terminates in step S126, the portable telephone 30 can enter the normal mode and wait for a next incoming call (from step S126 to step S130); in other words, the automatic answering/recording operation can be executed only for one incoming call, as described before.

In the portable telephone 30, as described above, the user can set the automatic answering/recording mode and execute the automatic answering/recording operation by depressing the termination-of-call key as the predetermined key operation. Accordingly, the automatic answering/recording mode can be set and the operation therefor can be performed in a very simple manner. Therefore, when the user does not want to answer an incoming call, he or she can immediately set the automatic answering/recording mode, whereby voice information received from a caller can be accumulated in the RAM 412 of the automatic answering/recording mode control unit 41.

Also, in the portable telephone 30 according to the present embodiment, when a call is received, the user may depress a key dedicated to setting the automatic answering/recording mode (function key), if provided, to set the automatic answering/recording mode without activating the "any key answer" function.

Figure 26:
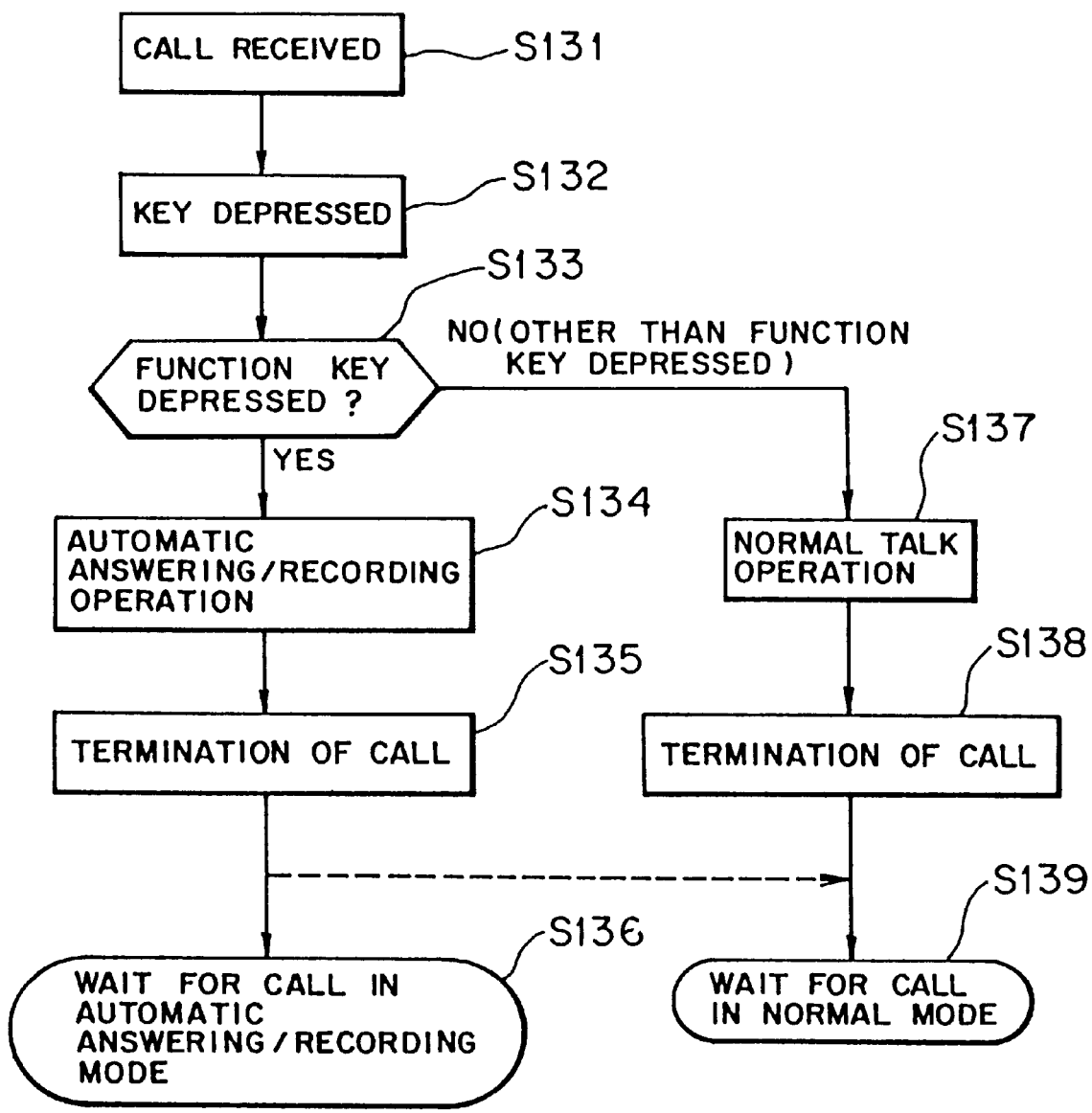
FIG. 26 is a flowchart for explaining an operation to set the automatic answering/recording mode by depressing a function key assigned to set the automatic answering/recording mode thereby to execute the operation for the automatic answering/recording mode in the portable telephone according to the first embodiment.

In detail, as shown in FIG. 26, when an incoming call received by the portable telephone 30 is detected by the CPU 36 (step S131) and it is determined that any key is depressed (step S132), the CPU 36 determines whether or not the depressed key is a function key assigned to set the automatic answering/recording mode (step S133). If the depressed key is the function key, then the CPU 36 activates the automatic answering/recording mode control unit 41 to execute the automatic answering/recording operation (from YES route of step S133 to step S134).

When the received call terminates and thus the automatic answering/recording operation terminates (step S135), the portable telephone 30 remains in the automatic answering/recording mode to wait for a next incoming call (step S136).

If, in step S133, the depressed key is other than the function key, then the CPU 36 activates the "any key answer" function to execute a talk operation in the normal mode (from NO route of step S133 to step S137). When the call terminates (step S138), the portable telephone 30 remains in the normal mode to wait for a next incoming call (step S139).

After the automatic answering/recording operation terminates in step S135, the portable telephone 30 can enter the normal mode and wait for a next incoming call (from step S135 to step S139); in other words, the automatic answering/recording operation can be executed only for one incoming call, as described before.

In the portable telephone 30, as described above, the user can set the automatic answering/recording mode and execute the automatic answering/recording operation by depressing the function key assigned to set the automatic answering/recording mode as the predetermined key operation. Accordingly, the automatic answering/recording mode can be set and the operation therefor can be performed in a very simple manner. Therefore, when the user does not want to answer an abrupt incoming call, he or she can immediately set the automatic answering/recording mode, whereby voice information received from a caller can be accumulated in the RAM 412 of the automatic answering/recording mode control unit 41.

Also, in the portable telephone 30 according to the present embodiment, when a call is received, the user may hold a certain key depressed (operated) for a certain period of time (a predetermined time) or longer to set the automatic answering/recording mode without activating the "any key answer" function.

Figure 27:
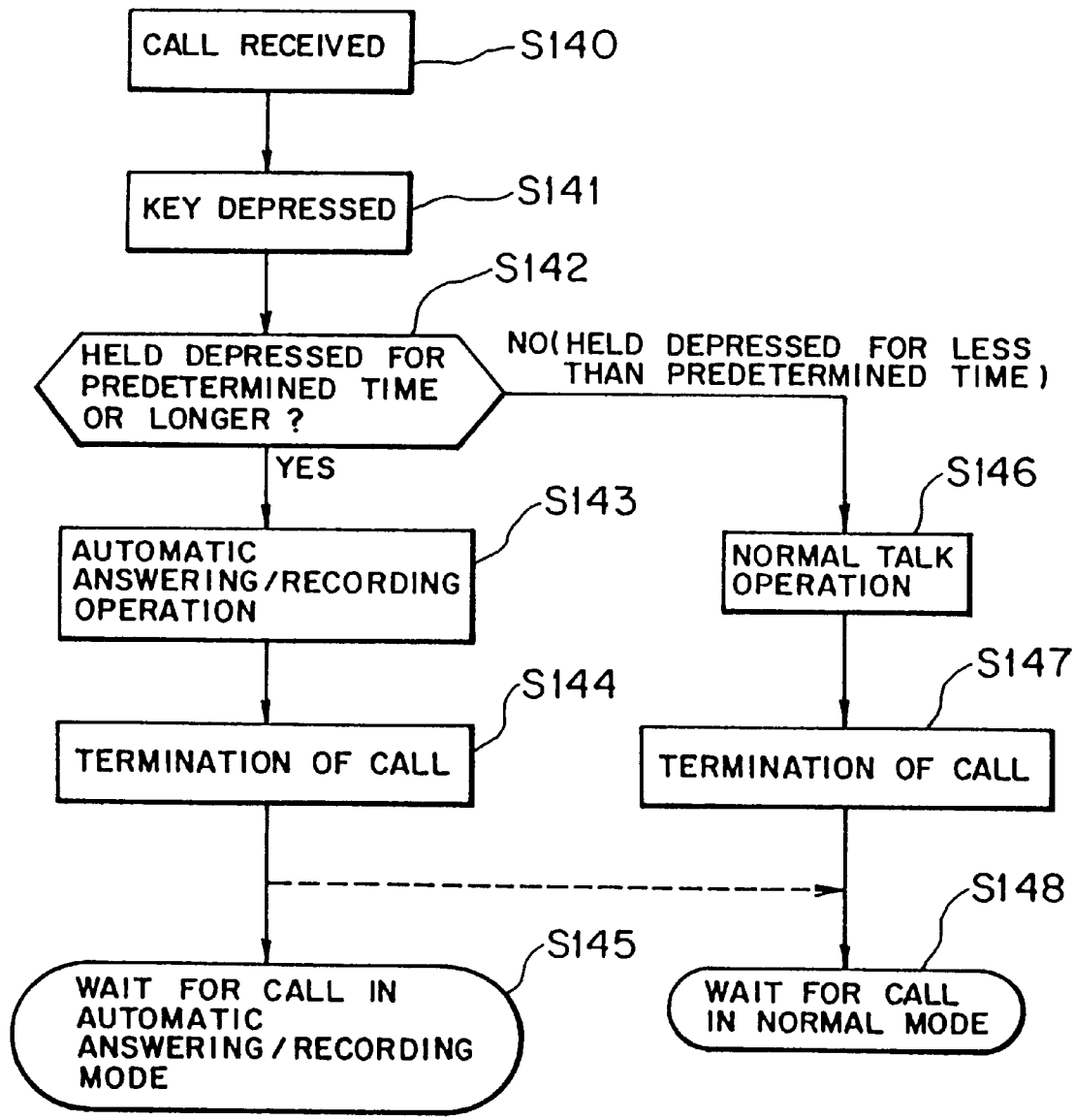
FIG. 27 is a flowchart for explaining an operation to set the automatic answering/recording mode in accordance with the period of time, in which a certain key is depressed, thereby to execute the operation for the automatic answering/recording mode in the portable telephone according to the first embodiment.

In detail, as shown in FIG. 27, when an incoming call received by the portable telephone 30 is detected by the CPU 36 (step S140) and it is determined that any key is depressed (step S141), the CPU 36 determines whether or not the key is held depressed for a predetermined time or longer (step S142). If the key is held depressed for the predetermined time or longer, then the CPU 36 activates the automatic answering/recording mode control unit 41 to execute the automatic answering/recording operation (from YES route of step S142 to step S143).

When the received call terminates and thus the automatic answering/recording operation terminates (step S144), the portable telephone 30 remains in the automatic answering/recording mode to wait for a next incoming call (step S145).

If it is determined in step S142 that the key is held depressed for less than the predetermined time, then the CPU 36 activates the "any key answer" function to execute a talk operation in the normal mode (from NO route of step S142 to step S146). When the call terminates (step S147), the portable telephone 30 remains in the normal mode to wait for a next incoming call (step S148).

After the automatic answering/recording operation terminates in step S144, the portable telephone 30 can enter the normal mode and wait for a next incoming call (from step S144 to step S148); in other words, the automatic answering/recording operation can be executed only for one incoming call, as described before.

In the portable telephone 30, as described above, the user can set the automatic answering/recording mode and execute the automatic answering/recording operation by holding a certain key depressed for the predetermined time or longer. Accordingly, the automatic answering/recording mode can be set in a very simple manner. Therefore, when the user does not want to answer an abrupt incoming call, he or she can immediately set the automatic answering/recording mode and perform the operation therefor, whereby voice information received from a caller can be recorded.

Also, in the portable telephone 30 according to the present embodiment, when a call is received, the user may depress (operate) a certain key twice consecutively within a certain period of time (a predetermined time) to set the automatic answering/recording mode without activating the "any key answer" function.

Figure 28:
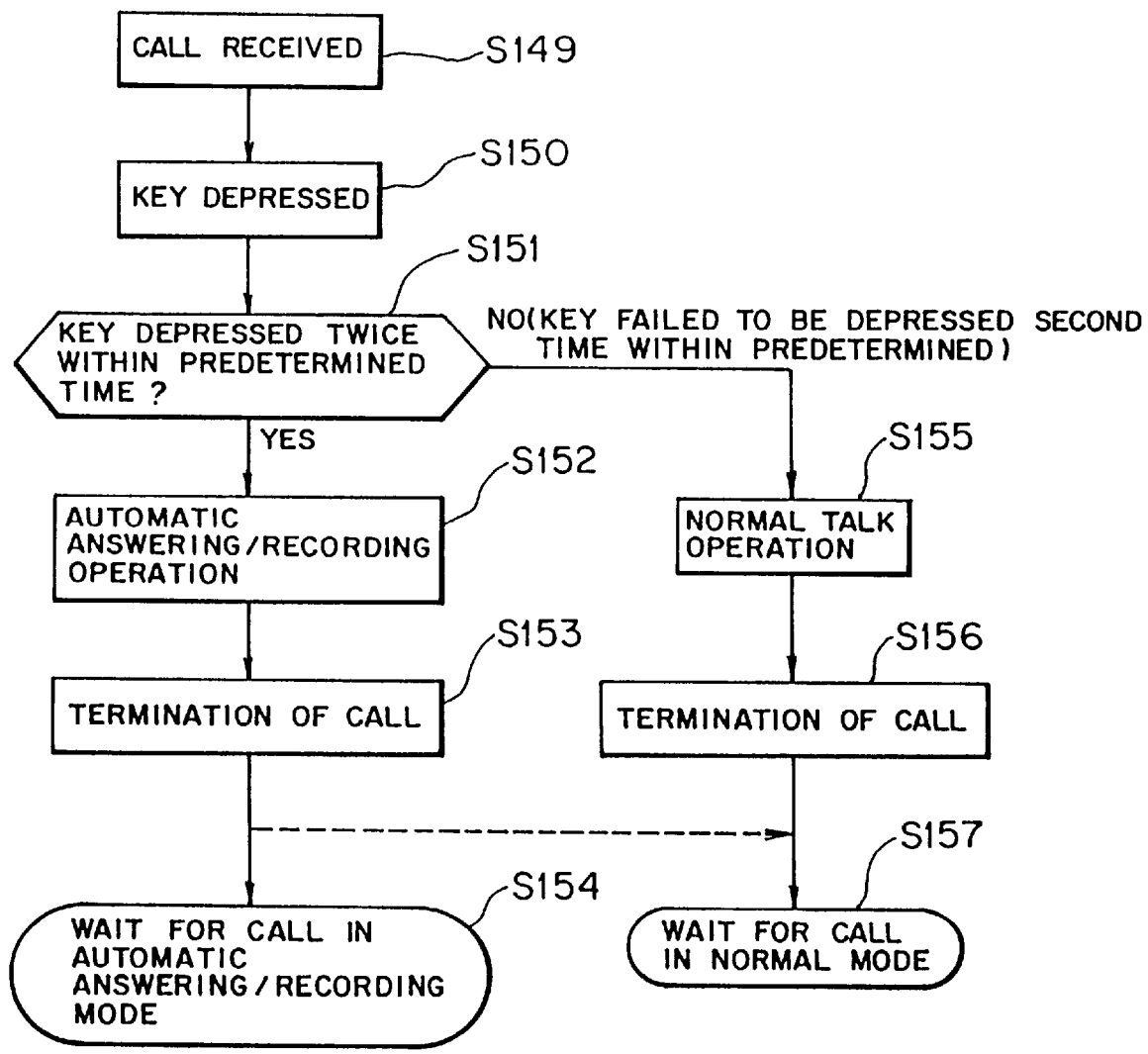
FIG. 28 is a flowchart for explaining an operation to set the automatic answering/recording mode in response to a predetermined number of operations of a key thereby to execute the operation for the automatic answering/recording mode in the portable telephone according to the first embodiment.

In detail, as shown in FIG. 28, when an incoming call received by the portable telephone 30 is detected by the CPU 36 (step S149) and it is determined that any key is depressed (step S150), the CPU 36 determines whether or not the key is depressed twice or more consecutively within a predetermined time (step S151). If the key is depressed twice or more consecutively, then the CPU 36 activates the automatic answering/recording mode control unit 41 to execute the automatic answering/recording operation (from YES route of step S151 to step S152).

When the received call terminates and thus the automatic answering/recording operation terminates (step S153), the portable telephone 30 remains in the automatic answering/recording mode to wait for a next incoming call (step S154).

If it is determined that the key is not depressed twice or more within the predetermined time, then the CPU 36 activates the "any key answer" function in response to the first depress of the key to execute a talk operation in the normal mode (from NO route of step S151 to step S155). When the call terminates (step S156), the portable telephone 30 remains in the normal mode to wait for a next incoming call (step S157).

After the automatic answering/recording operation terminates in step S153, the portable telephone 30 can enter the normal mode and wait for a next incoming call (from step S153 to step S157); in other words, the automatic answering/recording operation can be executed only for one incoming call, as described before.

In the portable telephone 30, as described above, the user can set the automatic answering/recording mode and execute the automatic answering/recording operation by depressing a certain key a plurality of times within the predetermined time. Accordingly, the automatic answering/recording mode can be set in a very simple manner. Therefore, when the user does not want to answer an incoming call, he or she can immediately set the automatic answering/recording mode and perform the operation therefor, whereby voice information received from a caller can be recorded.

Also, in the portable telephone 30 according to the present embodiment, when a call is received, the user may depress (operate) two or more keys together to set the automatic answering/recording mode without activating the "any key answer" function.

Figure 29:
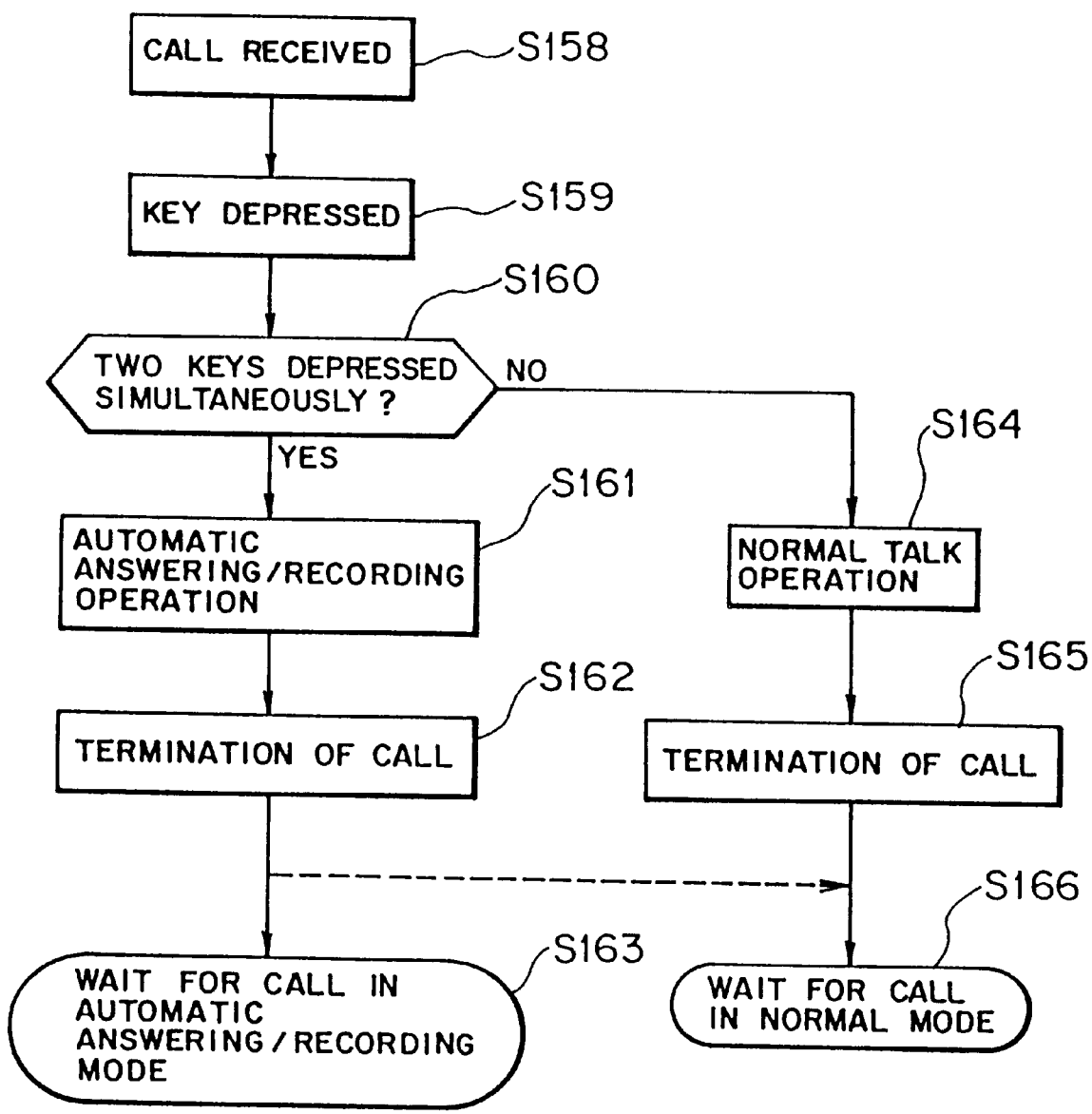
FIG. 29 is a flowchart for explaining an operation to set the automatic answering/recording mode in response to a simultaneous depression of two or more different keys thereby to execute the operation for the automatic answering/recording mode in the portable telephone according to the first embodiment.

In detail, as shown in FIG. 29, when an incoming call received by the portable telephone 30 is detected by the CPU 36 (step S158) and it is determined that any key is depressed (step S159), the CPU 36 determines whether or not two or more different keys are depressed (step S160). If, in step S160, two or more keys are depressed together, then the CPU 36 activates the automatic answering/recording mode control unit 41 to execute the automatic answering/recording operation (from YES route of step S160 to step S161).

When the received call terminates and thus the automatic answering/recording operation terminates (step S162), the portable telephone 30 remains in the automatic answering/recording mode to wait for a next incoming call (step S163).

If it is determined in step S160 that two or more keys are not depressed together, then the CPU 36 activates the "any key answer" function to execute a talk operation in the normal mode (from NO route of step S160 to step S164). When the call terminates (step S165), the portable telephone 30 remains in the normal mode to wait for a next incoming call (step S166).

After the automatic answering/recording operation terminates in step S162, the portable telephone 30 can enter the normal mode and wait for a next incoming call (from step S162 to step S166); in other words, the automatic answering/recording operation can be executed only for one incoming call, as described before.

Specifically, by depressing an arbitrary key and a volume key for adjusting the ringing tone volume simultaneously, the user may set the automatic answering/recording mode or the normal mode.

Figure 30:
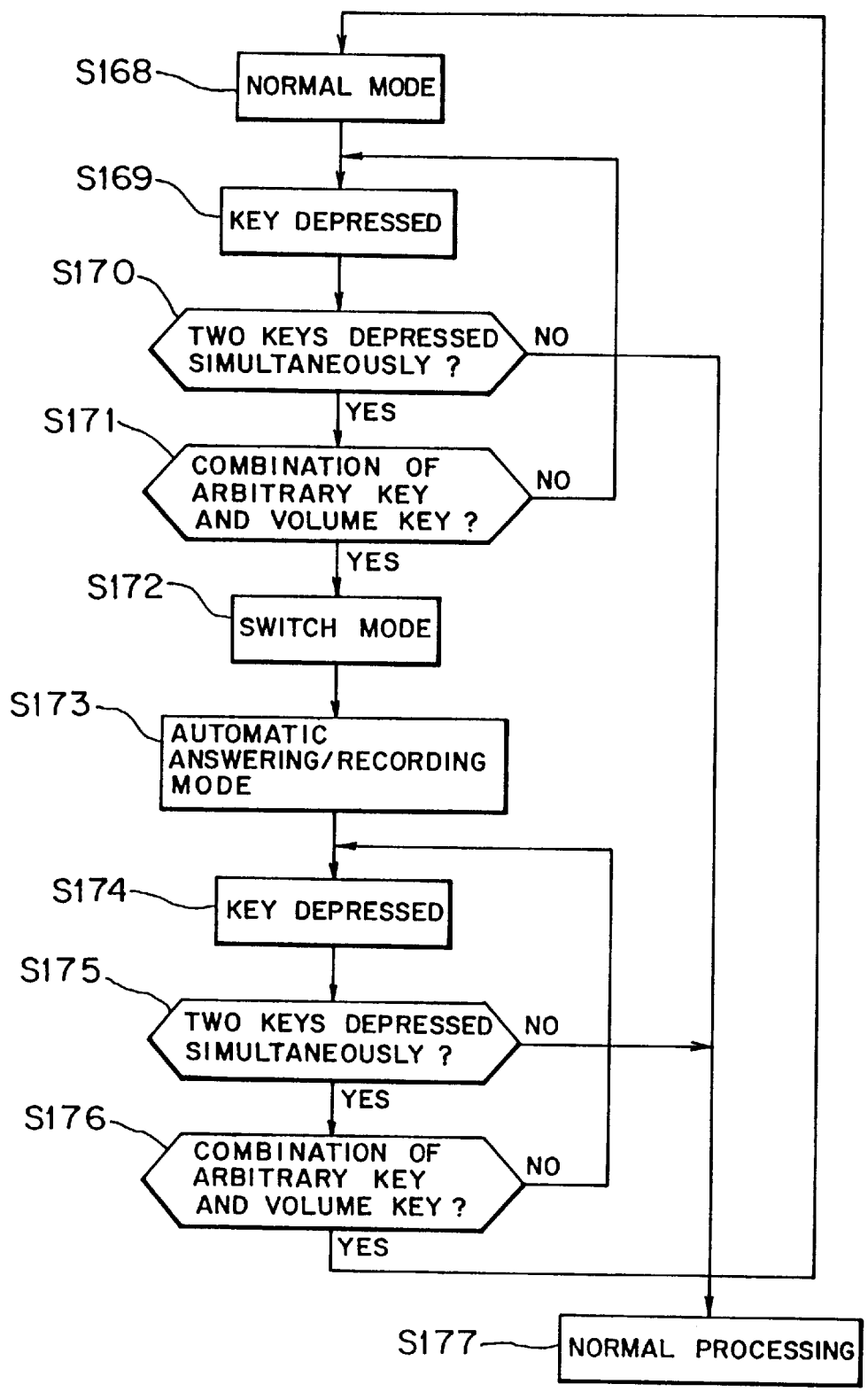
FIG. 30 is a flowchart of telephone operations to set the automatic answering/recording mode in response to a simultaneous depression of a certain key and the volume key thereby to execute the operation for the automatic answering/recording mode in the portable telephone according to the first embodiment.

In detail, as shown in FIG. 30, in the portable telephone 30 which is in the normal mode (step S168), when the CPU 36 detects via the key switch 39 and the display-keypad control unit 37 that a certain key has been depressed (step S169), the CPU 36 determines whether or not two or more different keys have been depressed simultaneously (step S170).

If is judged in step S170 that two or more different keys are depressed simultaneously, then the CPU 36 further determines whether or not at least an arbitrary key and the volume key have been depressed simultaneously (from YES route of the step S170 to step S171). If an arbitrary key and the volume key are depressed simultaneously, then the CPU 36 switches the bus changeover switch 43 to the side of the automatic answering/recording mode control unit 41 thereby to switch the normal mode to the automatic answering/recording mode (step S172 and step S173).

In thus set automatic answering/recording mode, when the CPU 36 further detects that a certain key has been depressed (step S174), the CPU 36 determines whether or not two or more different keys have been depressed together (step S175). If two or more different keys are depressed together, then the CPU 36 further determines whether or not these keys depressed together are at least an arbitrary key and the volume key (from YES route of step S175 to step S176).

If an arbitrary key and the volume key are depressed together, then the CPU 36 switches the bus changeover switch 43 to the side of the microphone 48 to switch the automatic answering/recording mode to the normal mode (from YES route of step S176 to step S168).

On the other hand, if it is determined in step S170 or step S175 that a certain key is depressed, but two or more different keys are not depressed together, then the CPU 36 activates the "any key answer" function for a normal talk.

Also, if it is determined in step S171 or step S176 that two or more different keys are depressed, but they are not a combination of an arbitrary key and the volume key, then the CPU 36 remains idle until a certain key is depressed again (NO route of step S171 or S176).

In the portable telephone 30, as described above, the user may depress different keys, for example, an arbitrary key and the volume key together to set the automatic answering/recording mode. Accordingly, even for a telephone such as a portable telephone which is limited in the number of keys arranged thereon and thus cannot accommodate a function key assigned to set the automatic answering/recording mode, the user can set the automatic answering/recording mode by quite simple procedure.

Also, in the portable telephone 30 according to the present embodiment, when the automatic answering/recording mode is set as described above, the ringing tone volume can be automatically set to "0" on receipt of an incoming call.

Figure 31:
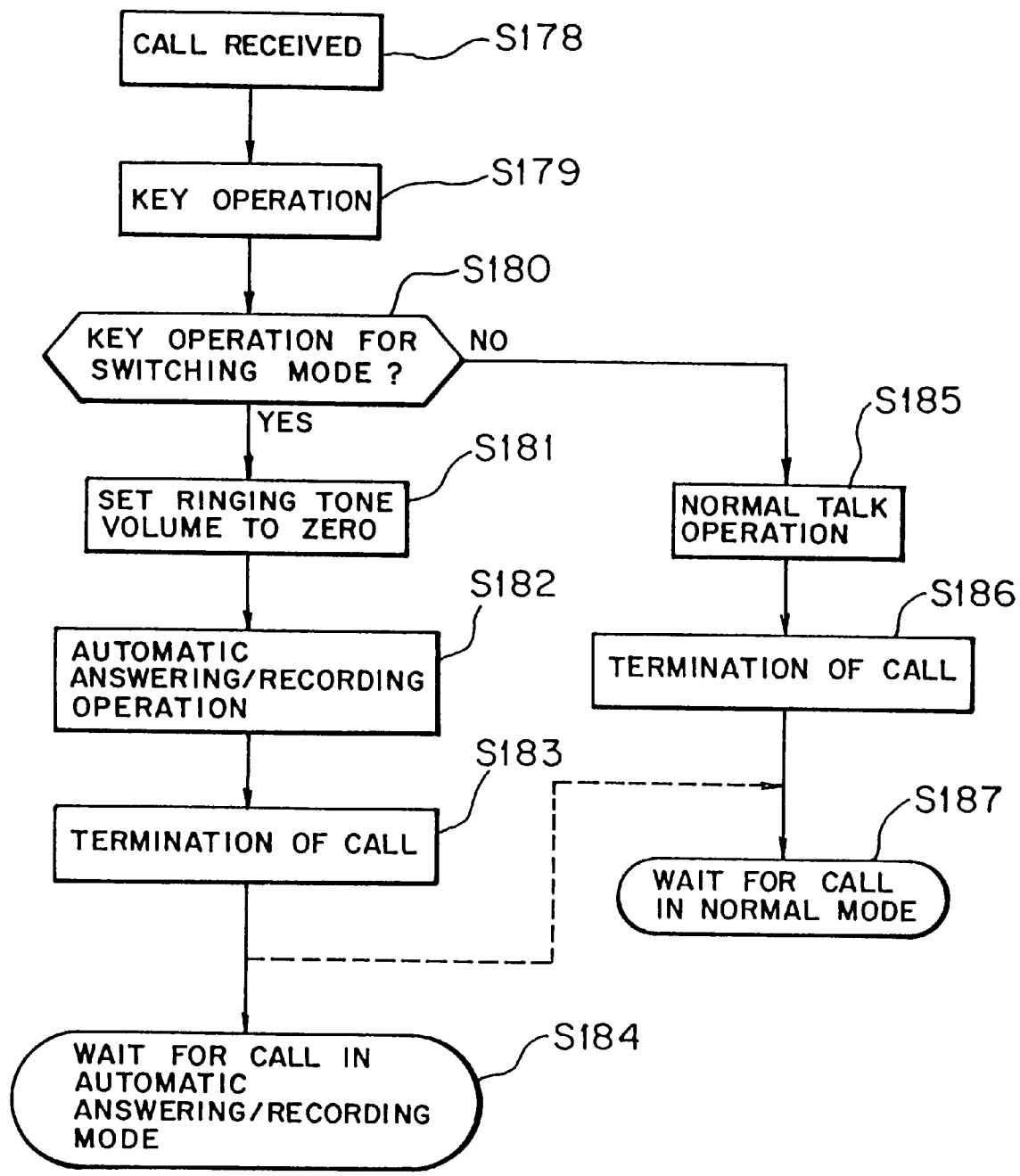
FIG. 31 is a flowchart for explaining an operation to set the ringing tone volume to zero when the automatic answering/recording mode is set in the portable telephone according to the first embodiment.

In detail, as shown in FIG. 31, when an incoming call received by the portable telephone 30 is detected by the CPU 36 (step S178) and it is determined that any key operation is performed (step S179), the CPU 36 determines whether or not the key operation is for switching the operating mode to set the automatic answering/recording mode (step S180). If the key operation is for setting the automatic answering/recording mode, then the CPU 36 sets the electronic volume 45 to volume "0" so as to set the ringing tone volume to "0" (from YES route of step S180 to step S181) and then activates the automatic answering/recording mode control unit 41 to execute the automatic answering/recording operation (step S182).

When the received call terminates and thus the automatic answering/recording operation terminates (step S183), the portable telephone 30 remains in the automatic answering/recording mode to wait for a next incoming call (step S184).

On the other hand, if, in step S180, an operation performed on the portable telephone 30 is not a key operation for setting the automatic answering/recording mode, then the CPU 36 activates the "any key answer" function for a normal talk in the normal mode (from NO route of step S180 to step S185). When the call terminates (step S186), the portable telephone 30 remains in the normal mode to wait for a next incoming call (step S187).

Also, in this case, after the automatic answering/recording operation terminates in step S183, the portable telephone 30 can enter the normal mode and wait for a next incoming call in the mode (from step S183 to step S187); in other words, the automatic answering/recording operation can be executed only for one incoming call, as described before.

Also, in the portable telephone 30 according to the present embodiment, the user can cancel the automatic answering/recording mode, which has been set as described above, by increasing the ringing tone volume.

Figure 32:
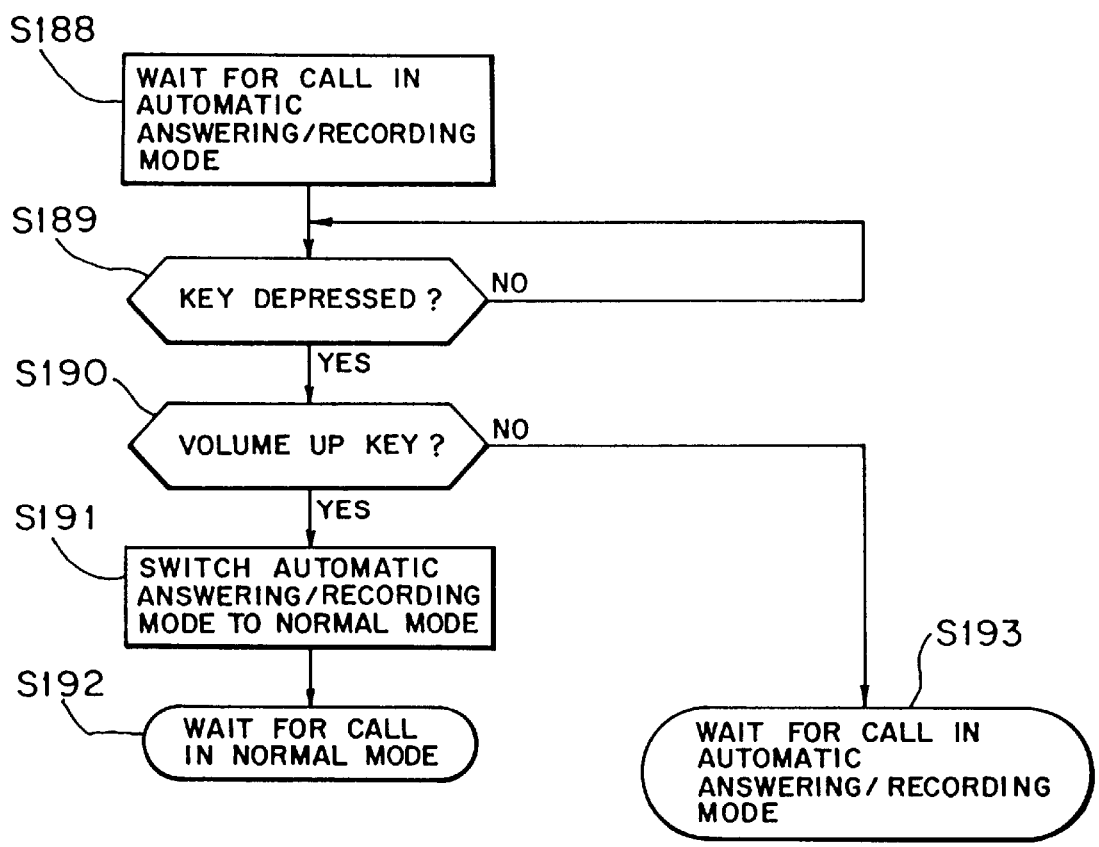
FIG. 32 is a flowchart for explaining an operation to cancel the automatic answering/recording mode in response to an operation of a volume up key in the portable telephone according to the first embodiment.

In detail, as shown in FIG. 32, while the portable telephone 30 is waiting for an incoming call in the automatic answering/recording mode (step S188), the CPU 36 repeatedly determines whether or not a certain key operation is performed (a key is depressed) (NO route of step S189). If a certain key is depressed, then the CPU 36 further determines whether or not the depressed key is the volume up key used for increasing the ringing tone volume (YES route of step S189 to step S190).

If the volume up key is depressed, then the CPU 36 switches the bus changeover switch 43 to the side of the microphone 48 to switch the automatic answering/recording mode to the normal mode (step S191). Thus, the portable telephone 30 enters the normal mode and waits for an incoming call in the mode (step S192).

If it is determined in step S190 that a key operation has been performed, but the key operation is not the depressing of the volume up key, then the CPU 36 leaves the automatic answering/recording mode set. Thus, the portable telephone 30 remains in the automatic answering/recording mode and waits for an incoming call in the mode (from NO route of step S190 to step S193).

In the portable telephone 30, as described above, for example, when the user sets the automatic answering/recording mode because he or she does not want to answer an incoming call, the ringing tone volume is automatically set to zero. On the other hand, when the user increases the ringing tone volume to answer an incoming call, the automatic answering/recording mode is automatically canceled. Accordingly, the automatic answering/recording mode can be automatically set/canceled in accordance with the user's intention, thereby making it more easy and simple to set the automatic answering/recording mode.

Also, in this case, the CPU 36 can mute a voice transmission from the portable telephone 30 by controlling the transmitting voice muting unit 46 (see FIG. 7).

Also, in the portable telephone 30 according to the present embodiment, the CPU 36 compares the voltage value of the power source (not shown) of the portable telephone 30 with a voltage value for the automatic answering/recording mode which is contained in the RAM 34 (a voltage value for setting the automatic answering/recording mode), whereby during the portable telephone 30 waiting for an incoming call in the normal mode, when the voltage value of the power source of the portable telephone 30 becomes equal to or less than the voltage value for the automatic answering/recording mode, the normal mode can be switched to the automatic answering/recording mode.

Figure 33:
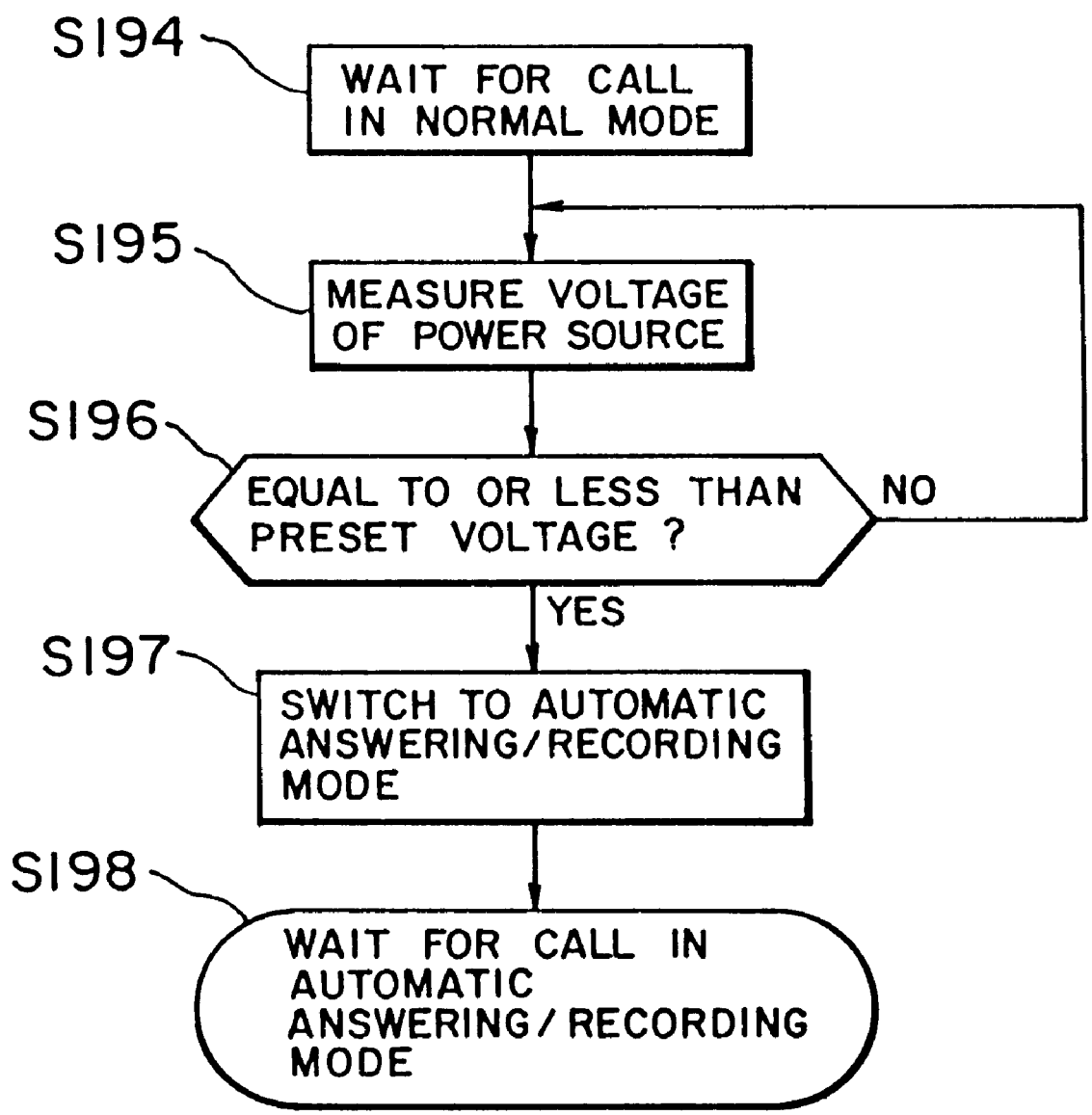
FIG. 33 is a flowchart for explaining an operation to set the automatic answering/recording mode in accordance with a voltage value of a power source in the portable telephone according to the first embodiment.

In detail, as shown in FIG. 33, while the portable telephone 30 is waiting for an incoming call in the normal mode (step S194), the CPU 36 measures the voltage value of the power source of the portable telephone 30 (step S195) and checks to see whether or not the voltage value of the power source of the portable telephone 30 is equal to or less than the voltage value for setting the automatic answering/recording mode which is contained in the RAM 34 (step S196).

If the CPU 36 detects that the voltage of the power source of the portable telephone 30 drops to or below the preset predetermined voltage value which is stored in the memory, then the CPU 36 switches the bus changeover switch 43 to the side of the automatic answering/recording mode control unit 41 to set the automatic answering/recording mode (from YES route of step S196 to step S197). Thus, the portable telephone 30 enters the automatic answering/recording mode and waits for an incoming call in the mode (step S198).

If it is determined in step S196 that the voltage value of the power source of the portable telephone 30 is not equal to or less than a preset voltage value, then the CPU 36 continues measuring a voltage value of the power source of the portable telephone 30 (NO route of step S196).

In the portable telephone 30, as described above, when the voltage value of the power source of the portable telephone 30 drops to or below the preset value for the automatic answering/recording mode, the CPU 36 automatically sets the automatic answering/recording mode, whereby power consumption of the portable telephone 30 can be cut down to a great extent.

Also, in the portable telephone 30 according to the present embodiment, the automatic answering/recording mode can be switched to and from the normal mode by using a timer.

When the automatic answering/recording mode is set, as shown in FIG. 34(a), the CPU 36 starts a timer for setting (turning on) the automatic answering/recording mode (step S201) and determines, while the portable telephone 30 is waiting for an incoming call in the normal mode (step S202), whether or not the timer has reached its timeout (step S203).

If the CPU 36 detects that the timer has reached the timeout, then the CPU 36 switches the bus changeover switch 43 to the side of the automatic answering/recording mode control unit 41 to set the automatic answering/recording mode (step S204). Thus, the portable telephone 30 enters the automatic answering/recording mode and waits for an incoming call in the mode (step S205).

On the other hand, when the automatic answering/recording mode is canceled and the normal mode is set, as shown in FIG. 34(b), the CPU 36 starts a timer for canceling (turning off) the automatic answering/recording mode (step S201') and determines, while the portable telephone 30 is waiting for an incoming call in the automatic answering/recording mode (step S202'), whether or not the timer has reached timeout (step S203').

If the CPU 36 detects that the timer has reached the timeout, then the CPU 36 switches the bus changeover switch 43 to the side of the microphone 48 to cancel the automatic answering/recording mode (step S204'). Thus, the portable telephone 30 enters the normal mode and waits for an incoming call in the mode (step S205').

In the portable telephone 30, as described above, when the result of clocking by a timer reaches the preset value for the automatic answering/recording mode, the automatic answering/recording mode is set. Accordingly, even when the portable telephone 30 is left unused for a long period of time because of the user's being out or for some other reason, the automatic answering/recording mode is automatically set. Hence, even when the user forgets to set the automatic answering/recording mode in advance, the portable telephone 30 can accumulate/record voice information such as the content of a talk from a caller without fail, and also the power consumption of the portable telephone 30 can be cut down to a great extent.

Also, in the portable telephone 30 according to the present embodiment, a timer which ticks away the time (a timer which operates based on the present time) may be used for the above-mentioned timers, whereby the automatic answering/recording mode can be automatically set/canceled at a previously set time. The user can designate such time by entering it from the numerical keypad on the portable telephone 30, and the CPU 36 writes thus entered time to the RAM 34 via the key switches 39 and the display-keypad control unit 37.

Figure 35:
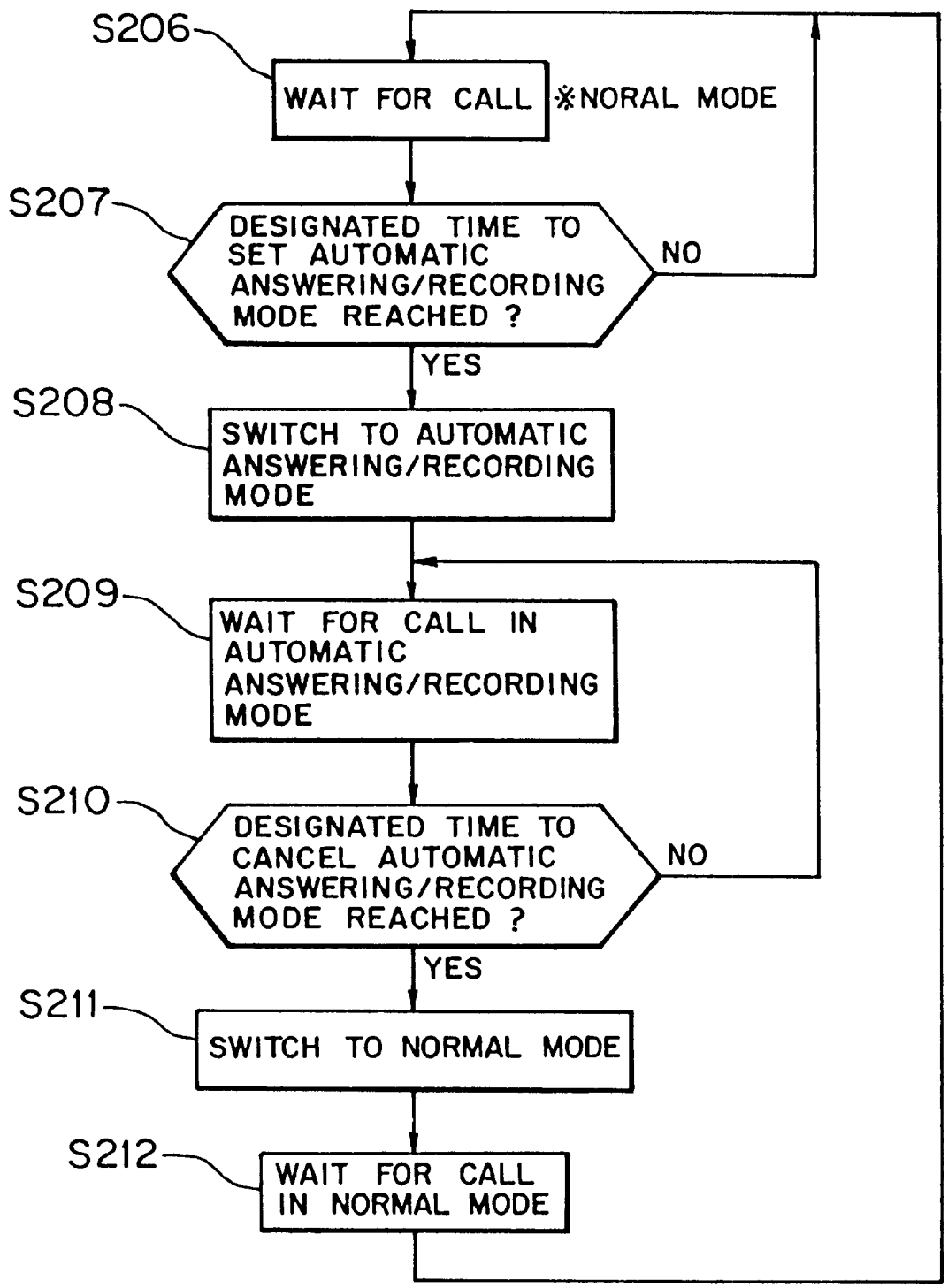
FIG. 35 is a flowchart for explaining an operation to set the automatic answering/recording mode or the normal mode at a designated time by using a timer in the portable telephone according to the first embodiment.

In detail, as shown in FIG. 35, while the portable telephone 30 is waiting for an incoming call in the normal mode (step S206), the CPU 36 reads a previously designated time for setting the automatic answering/recording mode from the RAM 34 and compares the designated time with time which the timer in the CPU 36 is ticking away (step S207). If the CPU 36 determines that the designated time is reached, then the CPU 36 switches the bus changeover switch 43 to the side of the automatic answering/recording mode control unit 41 to set the automatic answering/recording mode (step S208). Thus, the portable telephone 30 enters the automatic answering/recording mode and waits for an incoming call in the mode (step S209). If the designated time is not reached, then the automatic answering/recording mode is not set (NO route of step S207).

After the automatic answering/recording mode is thus set, the CPU 36 reads a previously designated time for canceling the automatic answering/recording mode from the RAM 34 and compares the designated time with time which the timer in the CPU 36 is ticking away (step S210). If the CPU 36 determines that the designated time is reached, then the CPU 36 switches the bus changeover switch 43 to the side of the microphone 48 to cancel the automatic answering/recording mode to set the normal mode (step S211). Thus, the portable telephone 30 enters the normal mode and waits for an incoming call in the mode (step S212). Until it is determined in step S210 based on the timer in the CPU 36 that the designated time has been reached, the automatic answering/recording mode is not canceled. Subsequently, the above-mentioned processing is repeated.

In the portable telephone 30, as described above, since the user can set the automatic answering/recording mode at a time designated by the user, he or she can effectively set the automatic answering/recording mode, particularly in the case where the time when he or she will be out is known in advance. Also, in this case, the power consumption of the portable telephone 30 can be cut down to a great extent.

Also, in the portable telephone 30 according to the present embodiment, a timer in the CPU 36 may be used which is started (triggered) when an outgoing/incoming call at the portable telephone 30 terminates and which clocks for a predetermined period of time. In this case, the automatic answering/recording mode can be automatically set/canceled when a predetermined time elapses after an outgoing/incoming call has terminated at the portable telephone 30.

Figure 36:
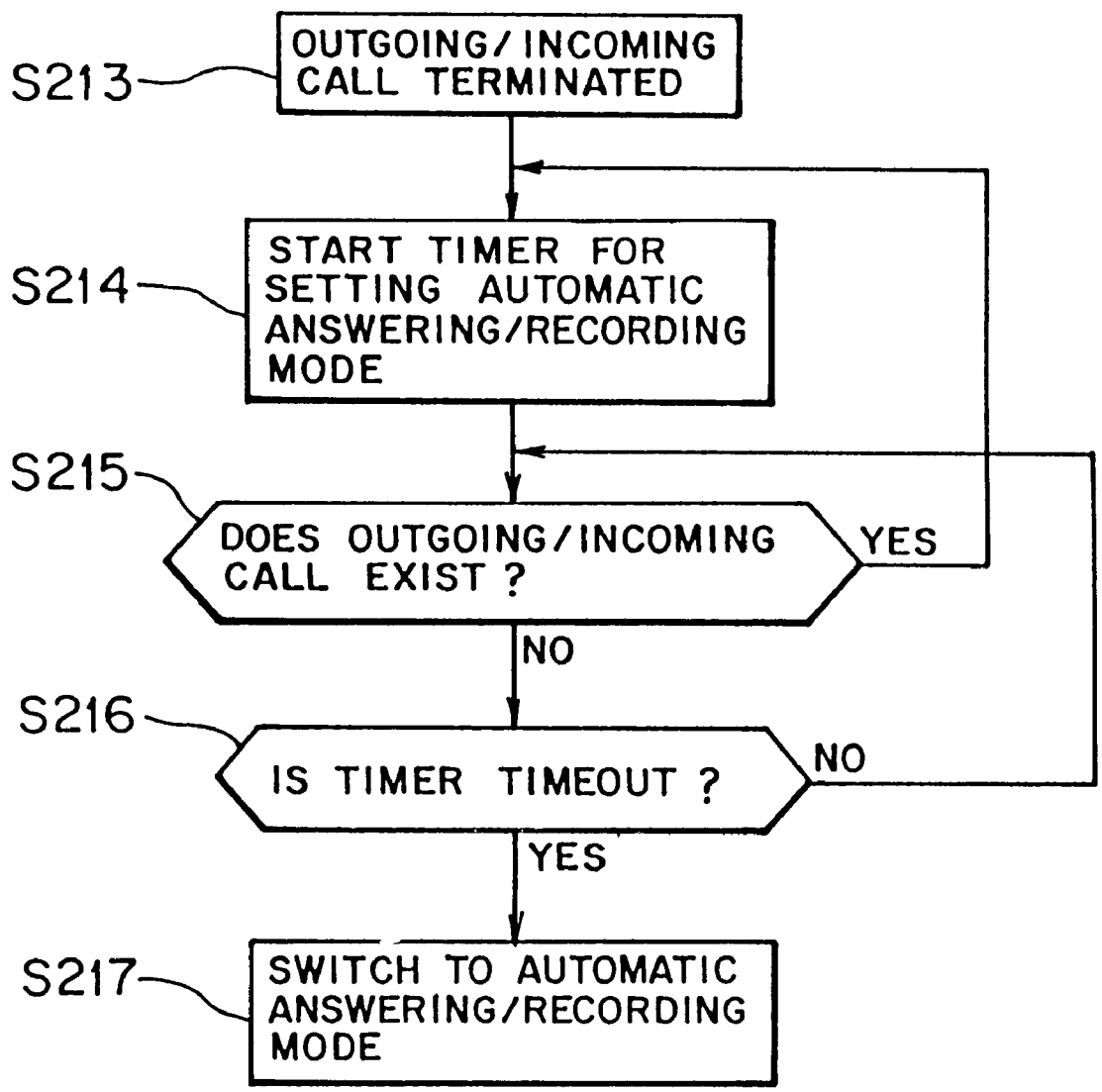
FIG. 36 is a flowchart for explaining an operation to set the automatic answering/recording mode in accordance with the presence and absence of an outgoing/incoming call in the portable telephone according to the first embodiment.

In detail, in the case where the automatic answering/recording mode is set, as shown in FIG. 36, when an outgoing/incoming call terminates at the portable telephone 30 (step S213), the CPU 36 starts its internal timer for setting the automatic answering/recording mode (step S214) and determines whether or not an outgoing/incoming call exists at the portable telephone 30 (step S215).

If an outgoing/incoming call exists, the CPU 36 resets and restarts the timer above (YES route of step S215). If no outgoing/incoming call exists, the CPU 36 determines whether or not the timer has reached the timeout (from NO route of step S215 to step S216). If the timer has reached the timeout, the CPU 36 switches the bus changeover switch to the side of the automatic answering/recording mode control unit 41 to set the automatic answering/recording mode (step S217).

If it is determined in step S216 that the timer has not reached the timeout, then the CPU 36 determines in step S215 whether or not an outgoing/incoming call exists (NO route of step S216).

In the portable telephone 30, as described above, when a predetermined time elapses after the termination of an outgoing/incoming call, the automatic answering/recording mode is automatically set. Accordingly, even when the user forgets to set the automatic answering/recording mode in advance, and consequently when the portable telephone 30 has been left unused for a long period of time, voice information such as the content of a talk from a caller can be accumulated/recorded without fail, and also the power consumption of the portable telephone 30 can be cut down to a great extent.

Figure 37:
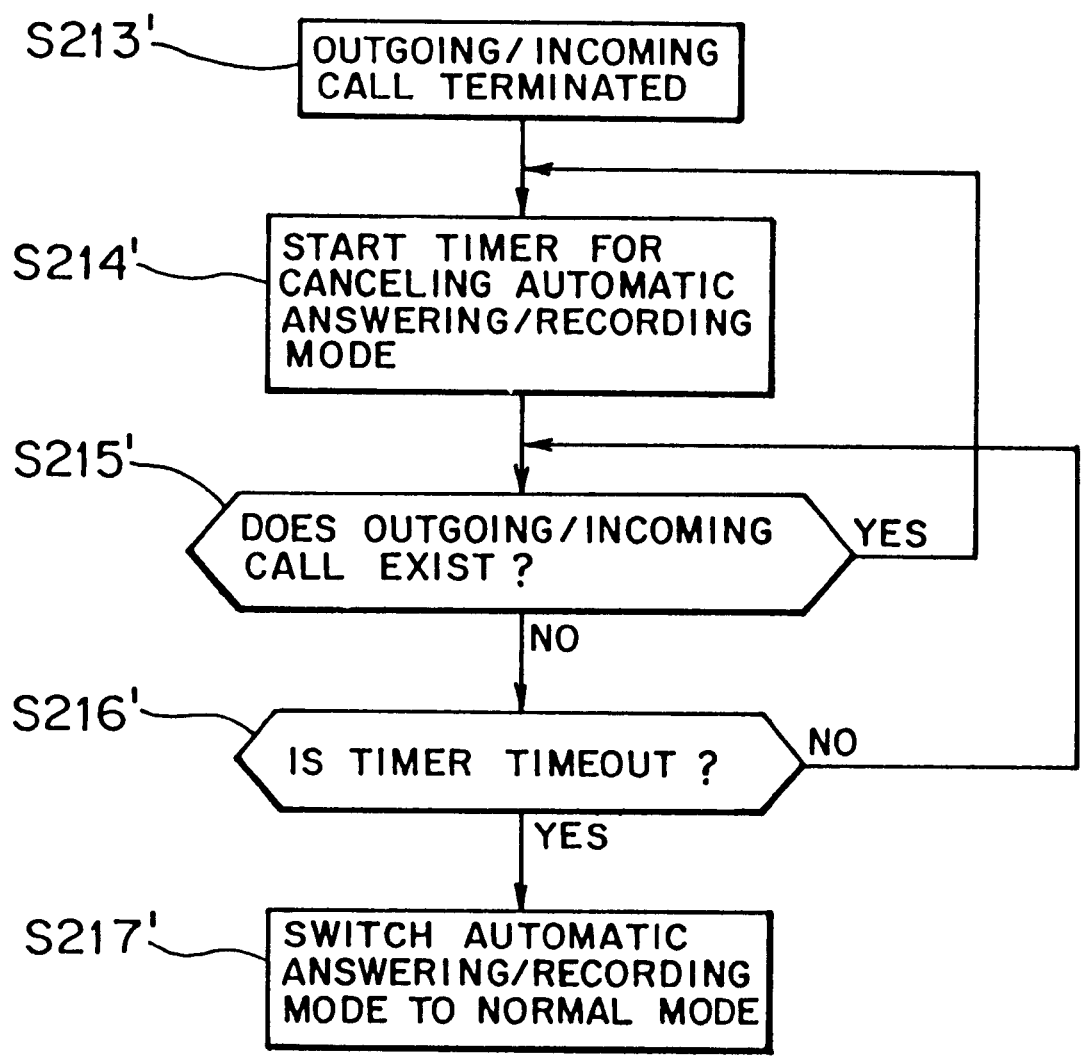
FIG. 37 is a flowchart for explaining an operation to cancel the automatic answering/recording mode in accordance with the presence and absence of an outgoing/incoming call in the portable telephone according to the first embodiment.

In the case where the automatic answering/recording mode is to be canceled, as shown in FIG. 37, when an outgoing/incoming call terminates at the portable telephone 30 (step S213'), the CPU 36 starts its internal timer for canceling the automatic answering/recording mode (step S214') and determines whether or not an outgoing/incoming call exists at the portable telephone 30 (step S215').

If an outgoing/incoming call exists, the CPU 36 resets and restarts the timer above (YES route of step S215'). If no outgoing/incoming call exists, the CPU 36 determines whether or not the timer has reached the timeout (from NO route of step S215' to step S216'). If the timer has reached the timeout, the CPU 36 switches the bus changeover switch to the side of the microphone 48 to cancel the automatic answering/recording mode thereby to set the normal mode (step S217').

If it is determined in step S216' that the timer has not reached the timeout, the CPU 36 determines in step S215' whether or not an outgoing/incoming call exists (NO route of step S216').

Also, in the portable telephone 30 according to the present embodiment, the user's voice entered through a microphone can be identified by the voice recognition control unit 42. Accordingly, the automatic answering/recording mode can be set/canceled by the user's voice.

Figure 38:
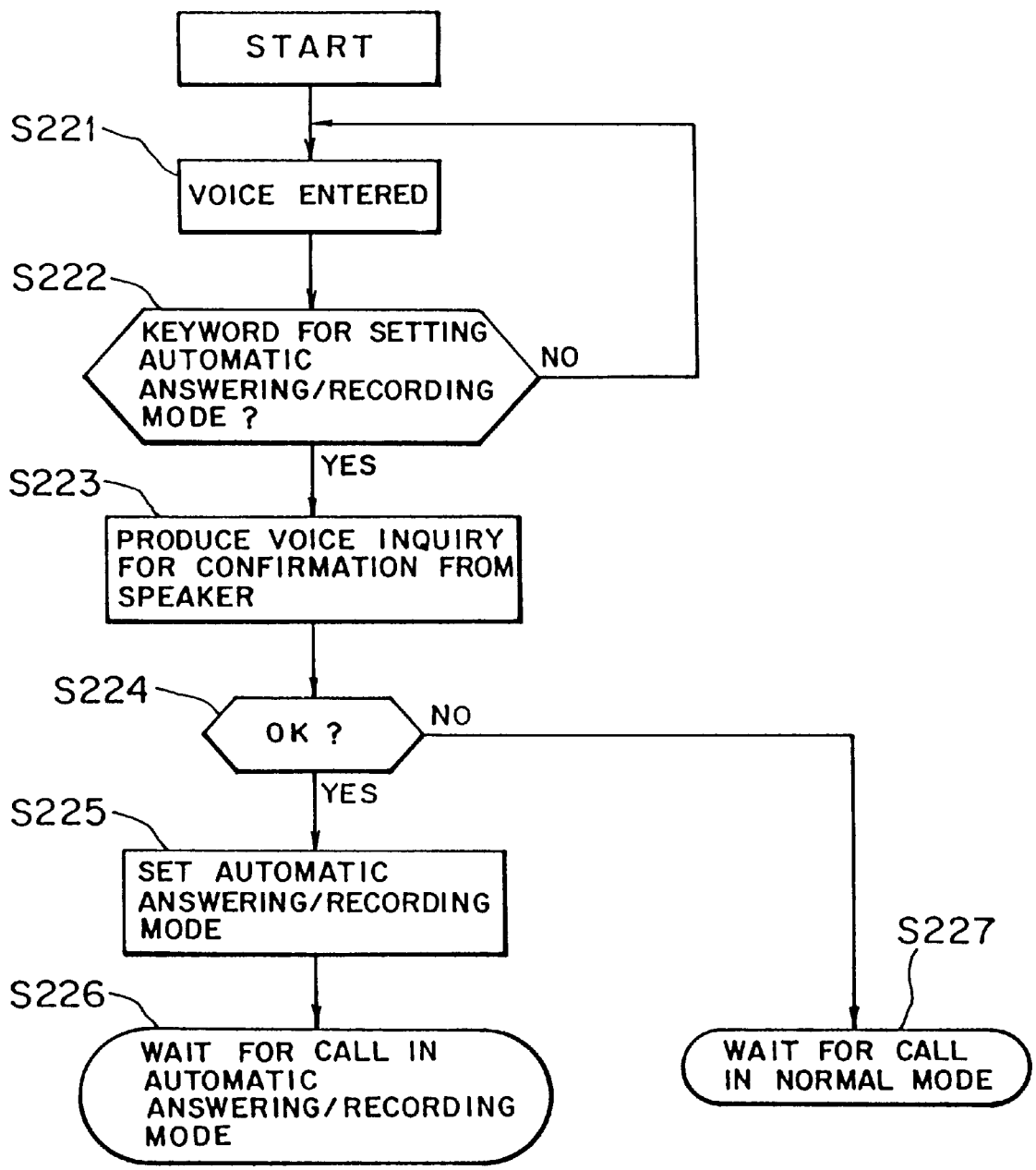
FIG. 38 is a flowchart for explaining an operation to set the automatic answering/recording mode by a user's voice in the portable telephone according to the first embodiment.

In the case where the automatic answering/recording mode is set, as shown in FIG. 38, when the user enters voice through the microphone 48 (step S221), thus entered voice signal enters the voice recognition control unit 42, which determines whether or not the content of the entered voice is a keyword for setting the automatic answering/recording mode (step S222).

If the content of the entered voice is not a keyword for setting the automatic answering/recording mode, then processing starting with step S221 is repeated to identify the content of entered voice (NO route of step S222). If the content of the entered voice is a keyword for setting the automatic answering/recording mode, then the voice recognition control unit 42 notifies the CPU 36 of the result of the identification. Then, the CPU 36 produces from the speaker 49 a voice inquiry for confirming whether or not the user permits the setting of the automatic answering/recording mode (step S223).

If the user enters voice or performs a key operation for permitting the CPU 36 to set the automatic answering/recording mode, then the CPU 36 switches the bus changeover switch 43 to the side of the automatic answering/recording mode control unit 41 to set the automatic answering/recording mode (from YES route of step S224 to step S225). Thus, the portable telephone 30 enters the automatic answering/recording mode and waits for an incoming call in the mode (step S226).

If the user does not permit the CPU 36 to set the automatic answering/recording mode, then the CPU 36 does not set the automatic answering/recording mode. Thus, the portable telephone 30 remains in the normal mode and waits for an incoming call in the mode (from NO route of step S224 to step S227).

Figure 39:
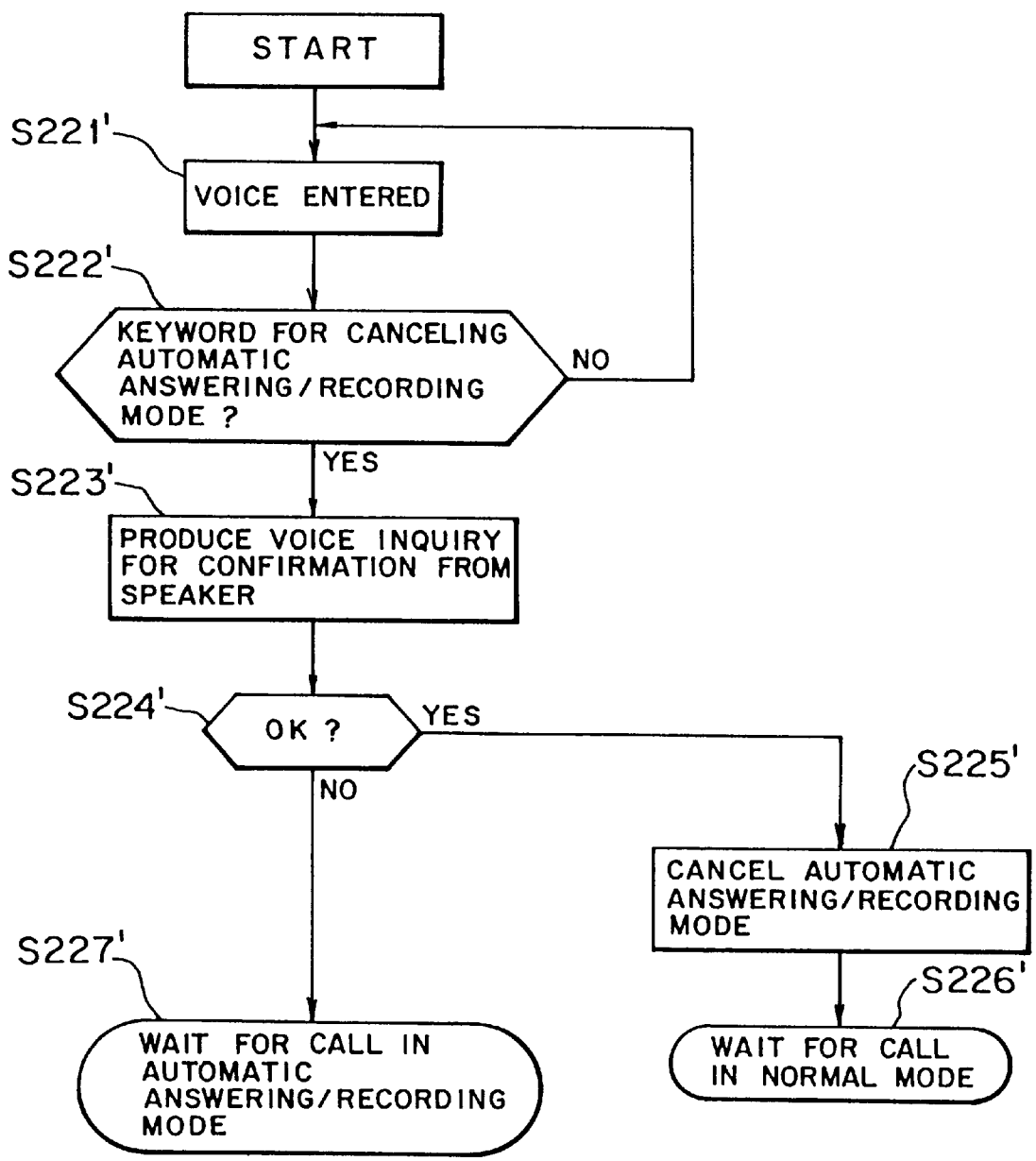
FIG. 39 is a flowchart for explaining an operation to cancel the automatic answering/recording mode by a user's voice in the portable telephone according to the first embodiment.

On the other hand, in the case where the automatic answering/recording mode is to be canceled, as shown in FIG. 39, when the user enters voice through the microphone 48 (step S221'), thus entered voice signal enters the voice recognition control unit 42, which determines whether or not the content of the entered voice is the keyword for setting the automatic answering/recording mode (step S222').

If the content of the entered voice is not the keyword for canceling the automatic answering/recording mode, then processing starting with step S221' is repeated to identify the content of entered voice (NO route of step S222'). If the content of the entered voice is the keyword for canceling the automatic answering/recording mode, then the voice recognition control unit 42 notifies the CPU 36 of the result of the identification. Then, the CPU 36 produces from the speaker 49 a voice for confirming whether or not the user permits the cancellation of the automatic answering/recording mode (step S223').

If, in step S224', the user enters voice or performs the key operation for permitting the CPU 36 to cancel the automatic answering/recording mode, then the CPU 36 switches the bus changeover switch 43 to the side of the microphone 48 to cancel the automatic answering/recording mode thereby to set the normal mode (from YES route of step S224' to step S225'). Thus, the portable telephone 30 enters the normal mode and waits for an incoming call in the mode (step S226').

If the user does not permit the CPU 36 to cancel the automatic answering/recording mode, then the CPU 36 does not cancel the automatic answering/recording mode. Thus, the portable telephone 30 remains in the automatic answering/recording mode and waits for an incoming call in the mode (from NO route of step S224' to step S227').

In the portable telephone 30, as described above, the user can set/cancel the automatic answering/recording mode and the normal mode only by voice without performing complicated key operations, whereby the portable telephone 30 becomes more easy and simple to operate.

Also, in the portable telephone 30 according to the present embodiment, when a call is received, the automatic answering/recording mode can be set or canceled in accordance with caller's identification information such as a telephone number or ID code. Identification information about remote parties for each of which the normal mode or the automatic answering/recording mode is registered in advance in the RAM 34 by the user through the CPU 36.

Figure 40:
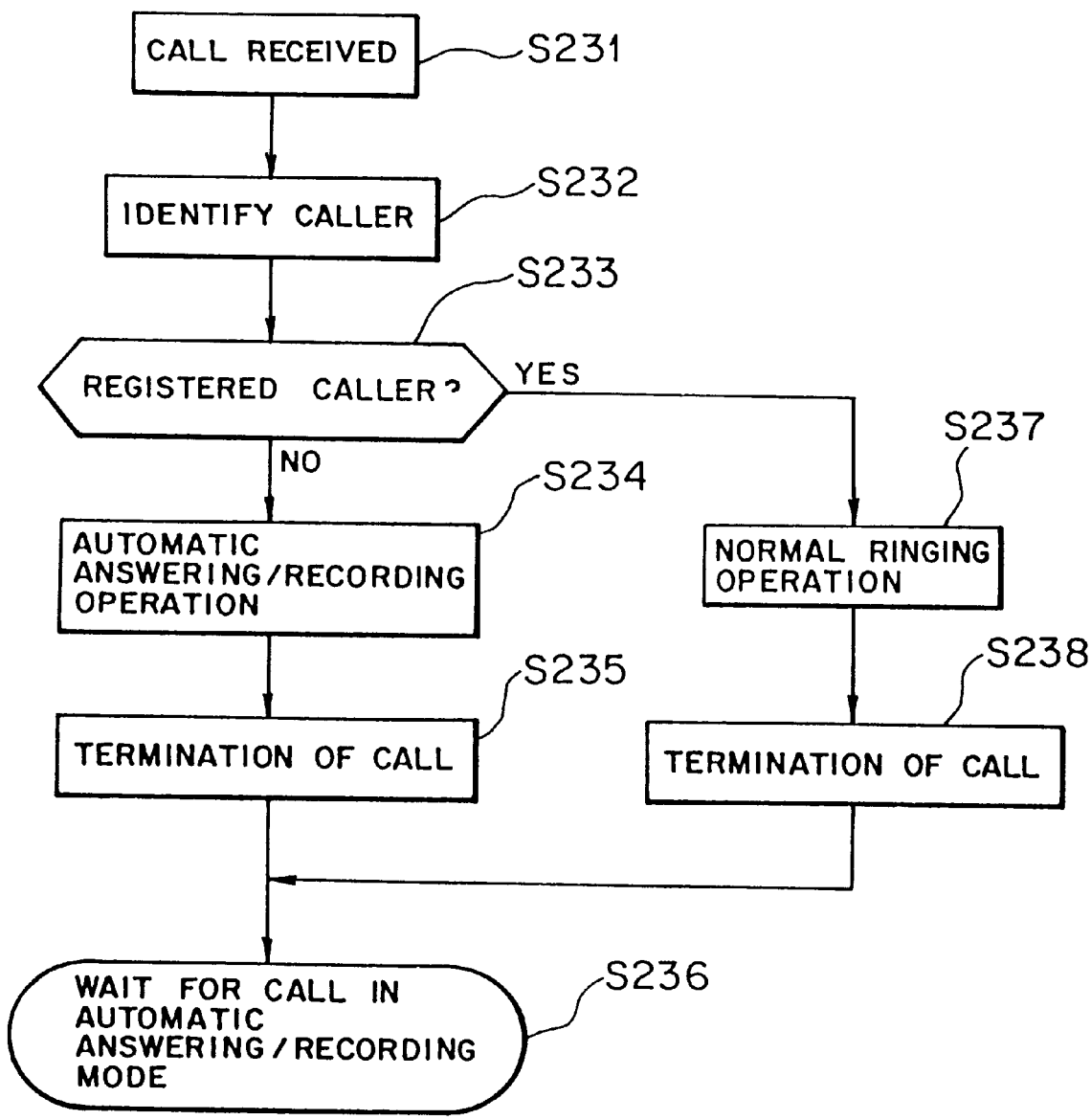
FIG. 40 is a flowchart for explaining an operation to set the automatic answering/recording mode in accordance with caller's identification information in the portable telephone according to the first embodiment.

In detail, as shown in FIG. 40, when an incoming call received by the portable telephone 30 is detected by the CPU 36 (step S231), the CPU 36 extracts and checks caller's identification information like a telephone number or ID code from a received signal (step S232) and compares the extracted identification information with information which is used for switching the operating mode in accordance with callers and preregistered in the RAM 34 (step S233).

If the caller is not registered in the RAM 34 as the one the user wants to answer, then the CPU 36 determines not to answer the incoming call and activates the automatic answering/recording mode control unit 41 to execute the automatic answering/recording operation (from NO route of step S233 to step S234). When the received call terminates and thus the automatic answering/recording operation terminates (step S235), the portable telephone 30 remains in the automatic answering/recording mode and waits for a next incoming call in the mode (step S236).

On the other hand the caller is registered in the RAM 34 or the like as the one the user wants to answer, the CPU 36 produces ringing as usual (from YES route of step S233 to step S237). When the call terminates after the user has conversed with the caller in the normal mode (step S238), the portable telephone 30 reenters the automatic answering/recording mode and waits for a next incoming call in the mode (step S236).

In the portable telephone 30, as described above, when a call is received, for example, the user may converse in the normal mode with a caller the user wants to answer, and the automatic answering/recording mode may be set for a caller the user does not want to answer, whereby voice information such as the content of a talk from a caller the user does not want to answer can be accumulated/recorded. Accordingly, the user can know the business of the caller the user does not want to answer, without directly conversing with the caller.

(c) Second Embodiment

Figure 41:
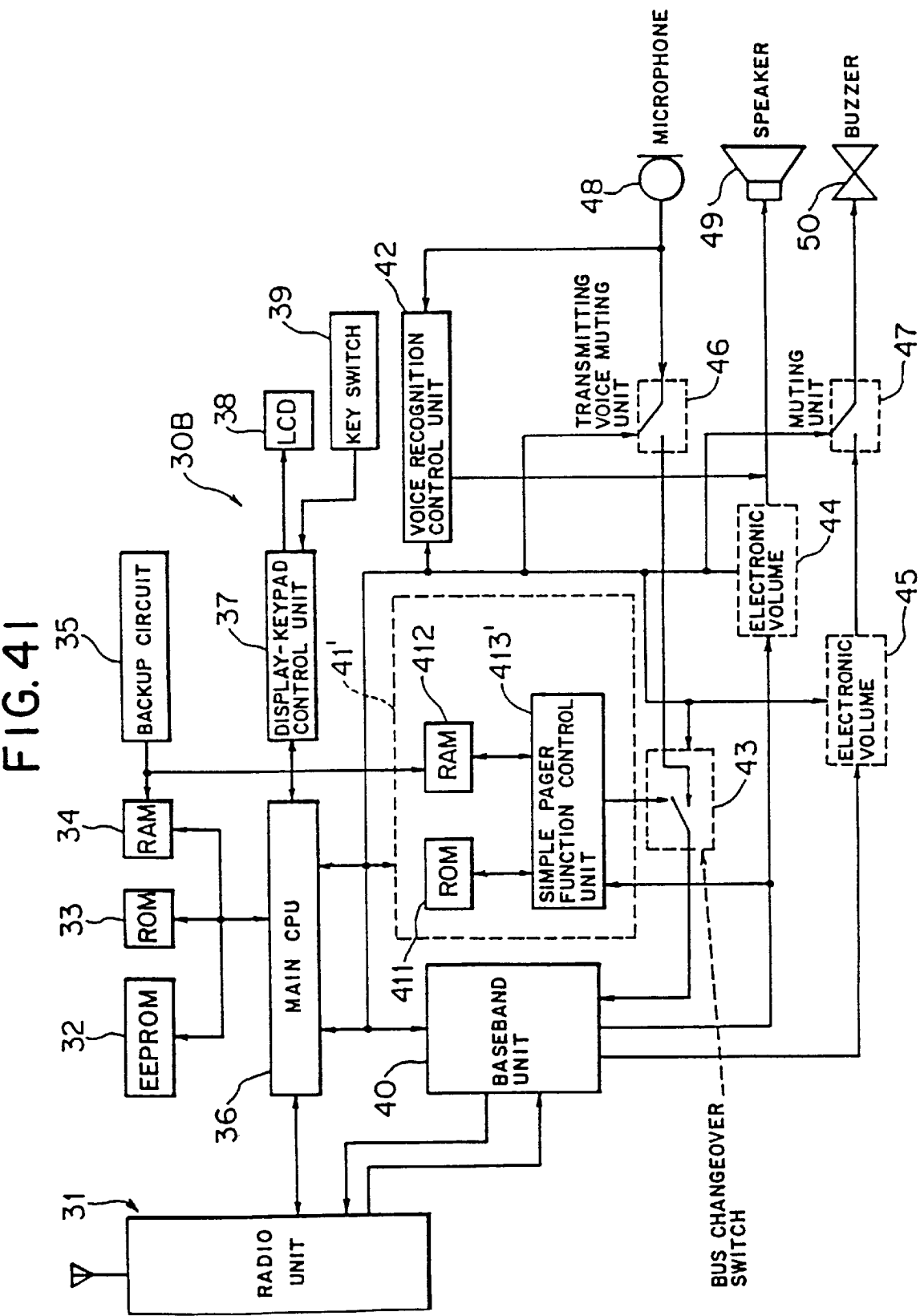
FIG. 41 is a block diagram showing the structure of a portable telephone (mode-switchable telephone) according to a second embodiment of the present invention.

FIG. 41 is a block diagram showing the structure of a portable telephone (mode-switchable telephone) according to a second embodiment of the present invention. As shown in FIG. 41, in a portable telephone 30B according to the present embodiment, an automatic answering/recording mode control unit 41' uses a simple pager function control unit 413' instead of the automatic answering/recording function control unit 413 which is used in the first embodiment as shown in FIG. 7. In FIG. 41, the same portions as those in FIG. 7 are denoted by the same reference numerals.

When the portable telephone 30B receives a call in the automatic answering/recording mode, the simple pager function control unit 413' performs control so as to accumulate the content of a talk (a message, for example) from the caller in the RAM 412 in the form of character information, while the automatic answering/recording function control unit 413 in the first embodiment accumulates the content of a talk from a caller in the RAM 412 in the form of voice information.

In other words, the "automatic answering/recording mode" in the portable telephone 30B according to the present embodiment is a mode for accumulating (recording) information such as a message from the caller of an incoming call in the form of character information, while the "automatic answering/recording mode" in the portable telephone 30 according to the first embodiment is a mode for accumulating (recording) information such as a message from the caller of an incoming call in the form of voice information.

Accordingly, the aforesaid operations for setting/canceling the "automatic answering/recording mode" in the first embodiment can be applied to those for the portable telephone 30B according to the present embodiment.

That is, also in the portable telephone 30B according to the present embodiment, the normal mode can be switched to and from the automatic answering/recording mode in accordance with the ringing tone volume.

Specifically, if the ringing tone volume is equal to or less than the volume value for the automatic answering/recording mode, then the main CPU 36 activates the automatic answering/recording mode control unit 41' and switches the bus changeover switch 43 to the side of the automatic answering/recording mode control unit 41, whereby the automatic answering/recording mode is set. On the contrary, if the ringing tone volume is not equal to or less than the volume value for the automatic answering/recording mode, then the automatic answering/recording mode remains canceled.

On the other hand, when the automatic answering/recording mode has been set and the ringing tone volume is equal to or greater than the volume value for the normal mode, then the CPU 36 switches the bus changeover switch 43 to the side of the microphone 48 so as to cancel the automatic answering/recording mode (set the normal mode), thereby allowing voice entered from the microphone 48 to be transmitted to a remote party via the radio unit 31. If the ringing tone volume is not equal to or greater than the volume value for the normal mode, then the automatic answering/recording mode remains set.

That is, also in the present embodiment, for example, assuming that a volume of "0" to "10" (a volume value of the electronic volume 45) is available for ringing and that the volume value for the automatic answering/recording mode is preset to "3" and also that the volume value for the normal mode is preset to "7" which is greater than the volume value "3" for the automatic answering/recording mode, when the user sets the ringing tone volume to "3" or less, the automatic answering/recording mode is automatically set, and when the user sets the ringing tone volume to "7" or greater, the automatic answering/recording mode is canceled to enter the normal mode.

Accordingly, when the user does not want to answer an incoming call, he or she may reduce the ringing tone volume to or below the volume value for the automatic answering/recording mode. On the contrary, when the user wants to answer an incoming call, he or she may increase the ringing tone volume to or above the volume value for the normal mode. Thus, the automatic answering/recording mode or the normal mode is automatically set. Accordingly, in the portable telephone 30B according to the present embodiment, for example, even when the user does not become aware of an incoming call because of the ringing tone volume being set too low, a caller's message can be automatically accumulated in the form of character information in the automatic answering/recording mode.

The above-mentioned volume values for the automatic answering/recording mode and the normal mode are variable. By having the preset value for the normal mode greater than the preset value for the automatic answering/recording mode, the state for entering the normal mode can clearly be discriminated from the state for entering the automatic answering/recording mode, whereby the normal mode can be securely switched to and from the automatic answering/recording mode.

Also, the preset value for the normal mode and the preset value for the automatic answering/recording mode, both stored in the RAM 34, can be changed by the user as above. The user, therefore, can freely change the set values of the ringing tone volume for setting the normal mode or the automatic answering/recording mode.

Also, in the portable telephone 30B according to the present embodiment, if the volume value for the automatic answering/recording mode is preset to "0" in the RAM 34, the user may set the ringing tone volume to "0" to mute ringing when he or she does not want to answer an incoming call, whereby the automatic answering/recording mode is automatically set. In this case, if the user sets the ringing tone volume to other than "0", the normal mode is set.

Accordingly, by presetting the volume value for the automatic answering/recording mode so as to be equivalent to the ringing tone volume of zero, even when the user sets the ringing tone volume to zero, because he or she does not want to answer an incoming call, the automatic answering/recording mode is automatically set on receipt of a call, whereby a caller's message or the like can be accumulated in the form of character information without fail. Also, even when the user forgets setting the ringing tone volume to zero and does not become aware of an incoming call, the content of a talk of a caller, etc., can be accumulated in the form of character information without fail.

When the portable telephone 30B receives a call, ringing is usually produced a plurality of times before the automatic answering/recording mode is executed. In the present embodiment, the repeat number of ringing, which is to be produced before a message or the like received from a caller is accumulated in the form of character information in the RAM 412 of the automatic answering/recording mode control unit 41' in the automatic answering/recording mode, can be set in accordance with a volume designated by the electronic volume 45 used for adjusting the ringing tone volume. Accordingly, it is not necessary for the user to preset for individual cases the repeat number of ringing to be produced before the automatic answering/recording operation is executed, whereby the portable telephone 30B becomes more easy and simple to operate.

Also, in the portable telephone 30B according to the present embodiment, when the automatic answering/recording mode has already been set, the automatic answering/recording mode remains set regardless of the ringing tone volume. When the automatic answering/recording mode has not been set in advance, the ringing tone volume is compared with the volume value for the automatic answering/recording mode which is stored in the RAM 34. If the ringing tone volume is equal to or less than the volume value for the automatic answering/recording mode, then the automatic answering/recording mode is set. If not, the normal mode is set.

On the other hand, when the normal mode has already been set, for example, by depressing a key assigned to set the normal mode, the normal mode remains set regardless of the ringing tone volume unless the automatic answering/recording mode is set, for example, by depressing a key assigned to set the automatic answering/recording mode. When the normal mode has not been set in advance, the ringing tone volume is compared with the volume value for the normal mode and the volume value for the automatic answering/recording mode. If the ringing tone volume is equal to or less than the volume value for the automatic answering/recording mode, then the automatic answering/recording mode is set. If the ringing tone volume is equal to or greater than the preset volume value for the normal mode, then the normal mode is set.

Accordingly, when the user turns down ringing because he or she does not want to answer an incoming call or when the user forgets that he or she turned down ringing and does not become aware of an incoming call, an incoming call is automatically answered to accumulate received information without fail.

Also, when the automatic answering/recording mode is set as above in the present embodiment, the CPU 36 automatically controls the muting unit 46 so as to mute a transmitting voice entered from the microphone 48 (to bring a transmission level to zero). On the contrary, when the normal mode is set, the CPU 36 automatically controls the muting unit 46 to release the mute state.

Accordingly, the power consumption of the microphone 48 or the like which is not used in the automatic answering/recording mode can be cut down, whereby the power consumption of the portable telephone 30B can also be cut down to a great extent.

Also, in the portable telephone 30B, when the CPU 36 detects an incoming call and a predetermined key operation for setting the automatic answering/recording mode, the automatic answering/recording mode is automatically set. Accordingly, the automatic answering/recording mode can be set by quite simple procedure. The predetermined key operation in the portable telephone 30B is, for example, to depress a key assigned to switch the operating mode.

Also, in the portable telephone 30B, when a predetermined key operation for switching the operating mode is performed, the simple pager function control unit 413' accumulates a voice message received from a caller-side potable telephone in the RAM 412. Accordingly, when the user cannot answer an abrupt incoming call for some reason or when the user intentionally does not answer an incoming call, a message or the like received from a caller can be accumulated by quite simple procedure.

Also, in the portable telephone 30B, when the predetermined key operation for switching the operating mode is performed, the ringing tone volume is immediately set to "0". Subsequently, ringing is produced as many times as preset in accordance with a volume value of the electronic volume 45, and the content of a talk or the like from a caller is recorded. Accordingly, the period of time before starting the operation for accumulating the received information the form of character information in the automatic answering/recording mode can be set by quite simple procedure.

Also, in the portable telephone 30B, if the automatic answering/recording mode has already been set when the predetermined key operation for switching to the automatic answering/recording mode is performed, the simple pager function control unit 413' is immediately activated to accumulate voice information such as the content of a talk received from a caller. Accordingly, the content of a talk of a caller can be recorded even when the call is an abrupt call.

The operation can be modified such that if the automatic answering/recording mode is already set when the predetermined key operation for switching to the automatic answering/recording mode is performed, the ringing tone volume is set to "0", received voice information is immediately accumulated in the RAM 412.

Also in the portable telephone 30B, the automatic answering/recording mode set by the predetermined key operation for switching the operating mode is effective only for an incoming call concerned, and subsequently the normal mode is set. Accordingly, the user can set the automatic answering/recording mode only for an incoming call which he or she does not want to answer, whereby voice information such as a message from a caller can be accumulated in the form of character information in the RAM 412 of the automatic answering/recording mode control unit 41'.

Also, in the portable telephone 30B, as described above, not only is the automatic answering/recording mode effective only for an incoming call concerned, but after the automatic answering/recording operation is executed, the automatic answering/recording mode can remain set. Accordingly, it is not necessary for the user to re-set the automatic answering/recording mode each time voice information received from a caller is accumulated in the form of character information in the RAM 412 of the automatic answering/recording mode control unit 41'.

The above-described single time execution of the automatic answering/recording operation can be started by successively depressing the key assigned to switch to the automatic answering/recording mode, and an arbitrary key. Accordingly, the operation for the automatic answering/recording mode can be performed for an incoming call by depressing the key assigned to switch to the automatic answering/recording mode, and any other key which can easily be operated by the user.

Also, in the portable telephone 30B according to the present embodiment, after performing the predetermined key operation for switching the operating mode, the user may perform key operation for setting the number of automatic answering/recording operations to be executed. For example, when it is known that the user cannot answer an incoming call for a certain period of time, the user may preset the number of automatic answering/recording operations to be executed, as above, whereby voice information provided by an incoming call which might be received during the period of time can be recorded. Also, the number of automatic answering/recording operations to be executed can be set in accordance with the number of depressing operations of a key. This greatly facilitates the setting operation.

The maximum number of automatic answering/recording operations depends, for example, on the capacity of memory (RAM 412 in the present embodiment) where character information is accumulated.

Also, in the portable telephone 30B according to the present embodiment, the user may depress (operate) a volume down key, which is used for turning down the ringing tone volume, whereby the automatic answering/recording mode can be set without activating the "any key answer" function. Accordingly, the automatic answering/recording mode can be set by a very simple operation.

When the volume down key is depressed once, the preset repeat number of ringing (a ringing tone volume linked present value), which is to be produced before voice information such as a message from a caller is accumulated in the form of character information, is not changed, and when the volume down key is depressed twice or more, the repeat number of ringing to be produced is changed. Accordingly, the user can set the period of time before starting the operation for accumulating a massage or the like from a caller in the form of character information, by quite simple procedure.

Also, in the portable telephone 30B according to the present embodiment, when a call is received, the user may depress a termination-of-call key to set the automatic answering/recording mode and execute the automatic answering/recording operation without activating the "any key answer" function. Accordingly, the automatic answering/recording mode can be set, and the operation therefor can be performed by a very simple operation. Therefore, when the user does not want to answer an abrupt incoming call, he or she can immediately set the automatic answering/recording mode, whereby voice information such as a message from a caller can be accumulated in the form of character information in the RAM 412 of the automatic answering/recording mode control unit 41'.

Furthermore, in the portable telephone 30B according to the present embodiment, when a call is received, the user may depress the key dedicated to setting the automatic answering/recording mode (function key), if provided, to set the automatic answering/recording mode without activating the "any key answer" function. Accordingly, the automatic answering/recording mode can be set, and the operation therefor can be performed by a very simple operation. Therefore, when the user does not want to answer an abrupt incoming call, he or she can immediately set the automatic answering/recording mode, whereby voice information such as a message from a caller can be accumulated in the form of character information in the RAM 412 of the automatic answering/recording mode control unit 41'.

Also, in the portable telephone 30B according to the present embodiment, when a call is received, the user may hold an arbitrary key depressed (operated) for a certain period of time (a predetermined time) or longer to set the automatic answering/recording mode without activating the "any key answer" function. Accordingly, the automatic answering/recording mode can be set by a very simple manner. Also, when the user does not want to answer an abrupt incoming call, he or she can immediately set the automatic answering/recording mode, whereby voice information such as a message from a caller can be accumulated in the form of character information.

Also, in the portable telephone 30B according to the present embodiment, when a call is received, the user may depress (operate) an arbitrary key a plurality of times within a certain constant period of time (a predetermined time) to set the automatic answering/recording mode without activating the "any key answer" function. Accordingly, the automatic answering/recording mode can be set, and the operation therefor can be performed by a very simple operation. Therefore, when the user does not want to answer an abrupt incoming call, he or she can immediately set the automatic answering/recording mode, whereby voice information such as a message from a caller can be accumulated in the form of character information.

Also, in the portable telephone 30B according to the present embodiment, when a call is received, the user may depress (operate) two or more keys simultaneously to set the automatic answering/recording mode without activating the "any key answer" function. Specifically, the user may depress an arbitrary key and a volume key used for adjusting the ringing tone volume simultaneously to set the automatic answering/recording mode or the normal mode. Accordingly, even for a telephone like a portable telephone which is limited in the number of keys arranged thereon and thus cannot accommodate a function key assigned to set the automatic answering/recording mode, the user can set the automatic answering/recording mode by quite simple procedure.

Also, in the portable telephone 30B according to the present embodiment, when the automatic answering/recording mode is set, the ringing tone volume can be automatically set to "0" on receipt of an incoming call. Also, the user can cancel the automatic answering/recording mode which has been thus set, by increasing the ringing tone volume. Accordingly, for example, when the user sets the automatic answering/recording mode because he or she does not want to answer an incoming call, the ringing tone volume is automatically set to zero. On the other hand, when the user increases the ringing tone volume to answer an incoming call, the automatic answering/recording mode is automatically canceled. Accordingly, the automatic answering/recording mode can be automatically set/canceled in accordance with the user's intention, thereby making it more easy and simple to set the automatic answering/recording mode.

Also, in the portable telephone 30B according to the present embodiment, the CPU 36 can mute a voice transmission therefrom (bring a transmission level to zero) by controlling the transmitting voice muting unit 46, whereby the power consumption of the portable telephone 30B can be cut down to a great extent.

Also, in the portable telephone 30B according to the present embodiment, the CPU 36 compares the voltage of the power source (not shown) of the portable telephone 30B with a preset voltage value for the automatic answering/recording mode which is contained in the RAM 34 (a voltage value for setting the automatic answering/recording mode). If the voltage of the power source of the portable telephone 30B becomes equal to or less than a preset voltage value for the automatic answering/recording mode when the portable telephone 30B waits for an incoming call in the normal mode, the normal mode is switched to the automatic answering/recording mode.

Accordingly, when the voltage of the power source of the portable telephone 30B drops to or below a preset value for the automatic answering/recording mode, the CPU 36 automatically sets the automatic answering/recording mode, whereby the power consumption of the portable telephone 30B can be cut down to a great extent.

Also, in the portable telephone 30B according to the present embodiment, when the result of clocking by a timer reaches a preset value for the automatic answering/recording mode, the automatic answering/recording mode is set. Accordingly, even when the portable telephone 30B is left unused for a long period of time because of the user's being out or for some other reason, the automatic answering/recording mode is automatically set. Hence, even when the user forgets to set the automatic answering/recording mode in advance, the portable telephone 30 can accumulate a message or the like received from a caller in the form of character information without fail, and also the power consumption of the portable telephone 30B can be cut down to a great extent.

Also, in the portable telephone 30B according to the present embodiment, a timer which ticks away the time (a timer which operates based on the present time) may be used for the above-mentioned timers, whereby the automatic answering/recording mode can be automatically set/canceled at time which has been set in advance. Particularly, in the case where when the user will be out is known in advance, he or she can effectively set the automatic answering/recording mode. Also, in this case, the power consumption of the portable telephone 30B can be cut down to a great extent.

Also, in the portable telephone 30B according to the present embodiment, a timer in the CPU 36 can be used which is started (triggered) when an outgoing/incoming call at the portable telephone 30B terminates and which clocks for a predetermined period of time, whereby the automatic answering/recording mode can be automatically set/canceled when a predetermined time elapses after an outgoing/incoming call has terminated at the portable telephone 30B. Accordingly, even when the user forgets to set the automatic answering/recording mode in advance, and consequently when the portable telephone 30B has been left unused for a long period of time, voice information such as the content of a talk received from a caller can be accumulated/recorded without fail, and also the power consumption of the portable telephone 30B can be cut down to a great extent.

Furthermore, in the portable telephone 30B according to the present embodiment, the user's voice entered through a microphone can be identified by the voice recognition control unit 42, whereby the automatic answering/recording mode can be set/canceled by the user's voice.

Accordingly, the user can set/cancel the automatic answering/recording mode or the normal mode only by voice without performing complicated key operations, whereby the portable telephone 30B becomes more easy and simple to operate.

Also, in the portable telephone 30B according to the present embodiment, when a call is received, the automatic answering/recording mode can be set or canceled in accordance with caller's identification information such as a telephone number and ID code. Accordingly, the user may converse in the normal mode with a caller the user wants to answer, and the automatic answering/recording mode may be set for a caller the user does not want to answer, whereby voice information such as the content of a talk received from an caller the user does not want to answer can be accumulated. Thus, the user can use the portable telephone 30B in a mode which is convenient for him or her.

(d) Third Embodiment

Figure 42:
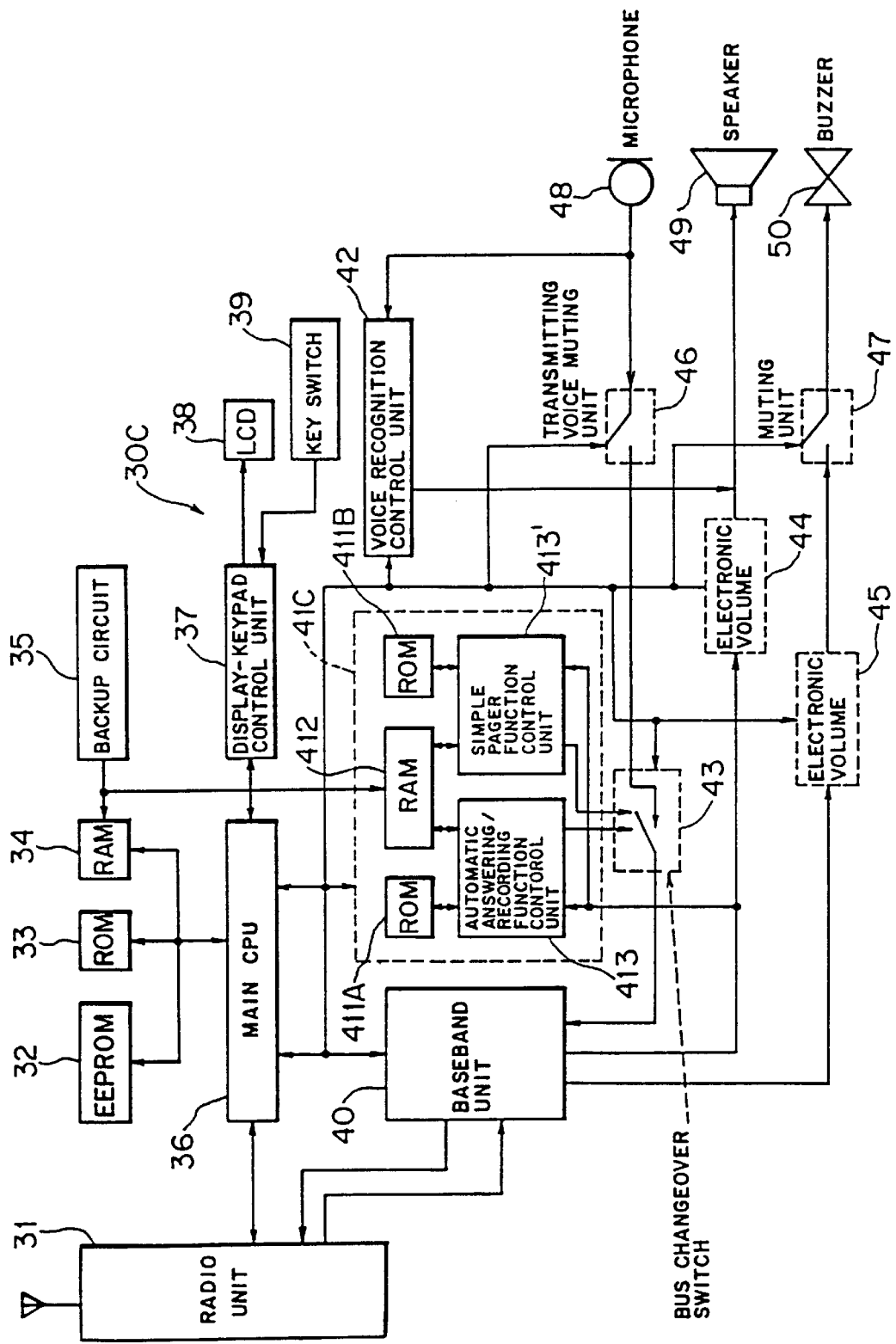
FIG. 42 is a block diagram showing the structure of a portable telephone (mode-switchable telephone) according to a third embodiment of the present invention.

FIG. 42 is a block diagram showing the structure of a portable telephone (mode-switchable telephone) according to a third embodiment of the present invention. A portable telephone 30C shown in FIG. 42 has the following three modes: normal mode (first mode) in which when a call is received, the user converses with a caller; automatic answering/recording mode (second mode) in which when a call is received, a message is transmitted to a caller's telephone (caller-side telephone) and then voice from the caller is recorded (accumulated); and simple pager mode (third mode) in which when a call is received, a message is transmitted to a caller's telephone and then character information (information other than voice) received from the caller's telephone is accumulated. Accordingly, the portable telephone 30C has an automatic answering/recording control unit 41C which comprises the automatic answering/recording function control unit 413 described in the first embodiment and the simple pager function control unit 413' described in the second embodiment.

Reference numerals 411A and 411B denote read-only memories (ROMs), which contain programmed operating procedures for the automatic answering/recording function control unit 413 and the simple pager function control unit 413', respectively. Other portions are the same as those described in the first embodiment.

Under the control of the main CPU 36, the automatic answering/recording mode control unit 41C activates either the automatic answering/recording function control unit 413 or the simple pager function control unit 413', whereby the operating mode is switched between the automatic answering/recording mode for recording a message (voice) received from a caller's telephone and the simple pager mode for accumulating a message received from a caller's telephone in the form of character information. Also, in this embodiment, to switch the operating mode between the normal mode and the two modes, the CPU 36 switches the bus changeover switch 43 to the side of the microphone 48 or the side of the automatic answering/recording mode control unit 41C.

When the automatic answering/recording function control unit 413 is activated by the CPU 36, the automatic answering/recording function control unit 413 accumulates/records a message which is received from a caller's telephone through the radio unit 31, in the RAM (voice memory) 412 in the form of voice information. When the simple pager function control unit 413' is activated, the simple pager function control unit 413' accumulates a message which is received from a caller's telephone through the radio unit 31, in the RAM 412 in the form of character information.

In the portable telephone 30C according to the present embodiment, by virtue of the above-described structure, when the automatic answering/recording mode is set as a result of the CPU 36 activating the automatic answering/recording function control unit 413, i.e. when a message received from a caller's telephone is accumulated in the RAM 412 in the form of voice information, if the CPU 36 determines that an available storage capacity of the RAM 412 has dropped to or below a certain value, then the CPU 36 switches the automatic answering/recording function control unit 413 to the simple pager function control unit 413', whereby a message from a caller's telephone can be accumulated in the RAM 412 in the form of character information which is smaller in volume than voice information.

Figure 43:
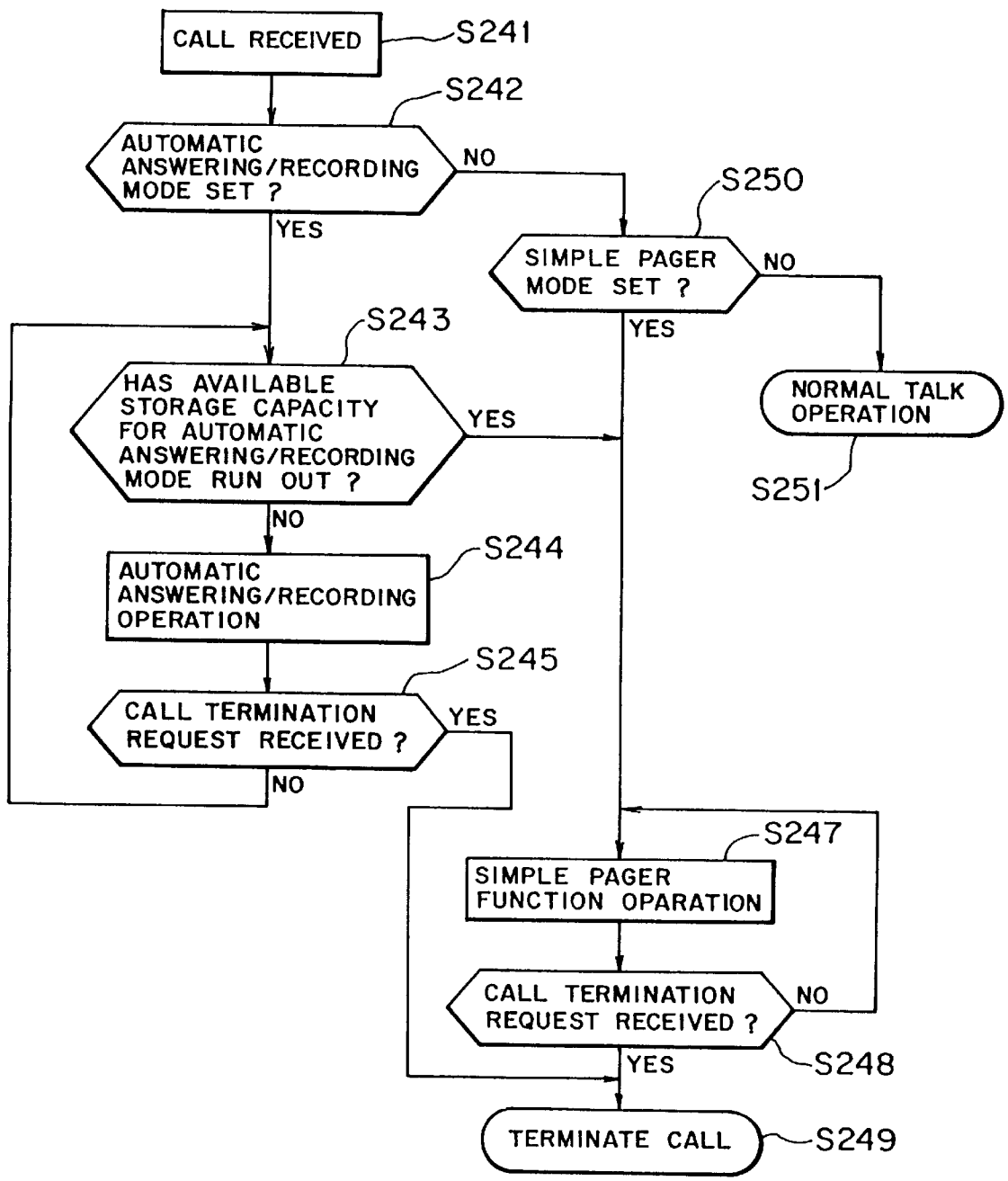
FIG. 43 is a flowchart to set the automatic answering/recording mode or the simple pager mode in accordance with the residual storage capacity of a memory in the portable telephone according to the third embodiment.
Figure 44A:
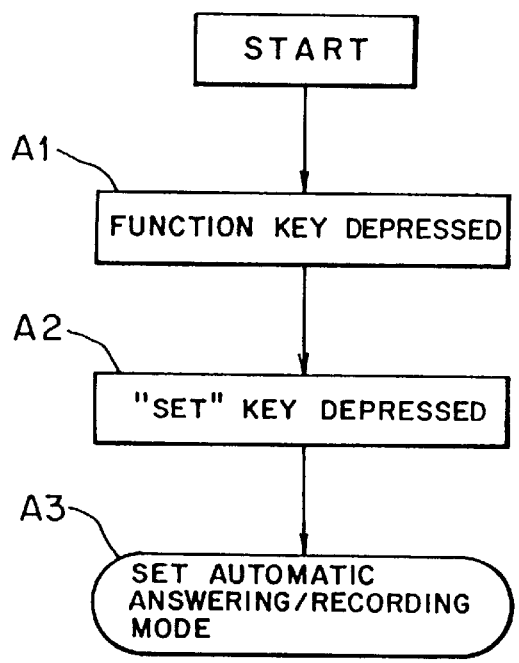
FIGS. 44(a) and 44(b) are flowcharts for explaining the setting and cancellation of the automatic answering/recording mode in a conventional portable telephone.
Figure 44B:
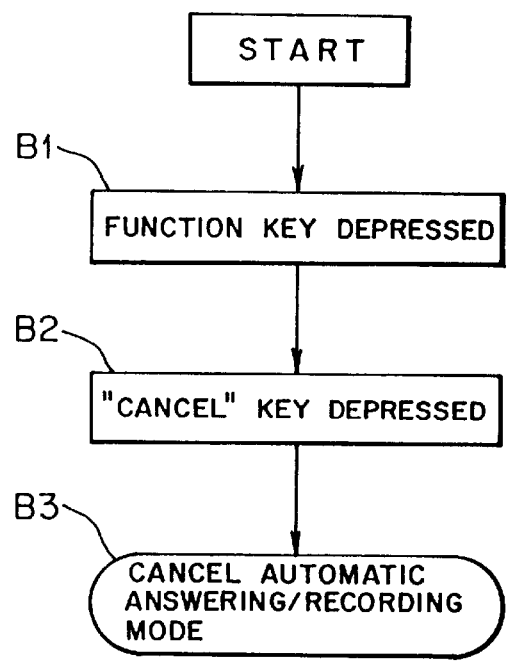

The aforesaid operations will now be described in detail with reference to a flowchart (steps S241 to S251) shown in FIG. 43.

When the CPU 36 detects an incoming call received by the portable telephone 30C (step S241), the CPU 36 determines whether or not the automatic answering/recording mode has been set (step S242). If the automatic answering/ recording mode has been set, then the CPU 36 further determines whether or not there still remains an available storage capacity of the memory for the automatic answering/ recording mode (RAM 412) (from YES route of step S242 to step S243).

If there still remains an available storage capacity of the RAM 412, then the CPU 36 activates the automatic answering/recording function control unit 413 to accumulate/record a message or the like received from a caller's telephone in the RAM 412 in the form of voice information (from NO route of step S243 to step S244).

After that, the CPU 36 determines whether or not a call termination request is received which is transmitted from a caller's telephone upon termination of the call (step S245). If the call termination request is received, then the CPU terminates the call (from YES route of step S245 to step S249). If the call termination request is not received, then the CPU 36 further determines whether or not there still remains an available storage capacity of the RAM 412 (from NO route of step S245 to step S243).

When an available storage capacity of the RAM 412 drops to or below a certain value, the CPU 36 switches the automatic answering/recording function control unit 413 to the simple pager function control unit 413'. The simple pager function control unit 413' begins to accumulate a message or the like which has been received from a caller's telephone and accumulated in the RAM 412 in the form of character information which is smaller in volume than voice information (from YES route of step S243 to step S247).

After that, as in step S245 described above, the CPU 36 determines whether or not the call termination request is received which is transmitted from a caller's telephone upon termination of the call (step S248). The CPU 36 continues executing a simple pager operation until the call termination request is received (NO route of step S248). When the CPU 36 receives the call termination request, it terminates the call (from YES route of step S248 to step S249).

If it is determined in step S242 that the automatic answering/recording mode is not set, then the CPU 36 further determines whether or not the simple pager mode is set (from NO route of step S242 to step S250). If the simple pager mode is set, then processing in and after step S247 is performed (YES route of step S250).

If it is determined in step S250 that the simple pager mode is not set, i.e. if neither the automatic answering/recording mode nor the simple pager mode is set when a call is received, then a normal talk operation is executed in the normal mode (from NO route of step S250 to step S251).

As described above, in the portable telephone 30C according to the present embodiment, when a voice message or the like received from a caller's telephone is accumulated/ recorded in the RAM 412 in the automatic answering/ recording mode, if an available storage capacity of the RAM 412 drops to or below a predetermined value, the automatic answering/recording mode can be switched to the simple pager mode in which voice information such as a message received from a caller's telephone is accumulated in the RAM 412 in the form of character information which represents the received voice information such as a message in a smaller volume. Thus, the storage capacity of a voice memory like the RAM 412 can be used quite effectively.

In an actual application, when the automatic answering/ recording mode is set, first, the automatic answering/ recording mode in which a voice message is accumulated/ recorded may be set. Then, when an available storage capacity of the RAM 412 drops to or below a predetermined value, the automatic answering/recording mode may be switched to the simple pager mode.

Accordingly, also, in this case, received voice information is accumulated in a memory (RAM 412) with priority, and the storage capacity of the memory can be used quite effectively.

(e) Others:

While there has been described and illustrated the setting of modes in the portable telephones 30, 30B, 30C according to the first through third embodiments, respectively, the present invention is not limited thereto, and is applicable to stationary telephones as for household use. In such applications, the present invention will also provide the same operations and effects as those in the embodiments described above.

What is claimed is:

1. A mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said mode-switchable telephone comprising:

comparing means for comparing a value of a ringer adjusting volume of said telephone with the volume value for setting the second mode; and control means for responding to the results of comparison by said comparing means to switch the mode of said telephone from the first mode to the second mode when it is judged that the value of said ringer adjusting volume is set to be equal to or less than the volume value for setting the second mode.

2. A mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said method comprising the steps of:

comparing a value of a ringer adjusting volume of said telephone with a volume value for setting the second mode; and switching the mode of said telephone from the first mode to the second mode when the value of said ringer adjusting volume is equal to or less than the volume value for setting the second mode.

3. A mode setting method for a mode-switchable telephone according to claim 2, wherein said volume value for setting the second mode is a value which makes the volume of ringing zero.

4. A mode setting method for a mode-switchable telephone according to claim 2, wherein the repeat number of ringing before starting the operation for accumulating information in the second mode is set in accordance with the value of said ringer adjusting volume.

5. A mode setting method for a mode-switchable telephone according to claim 2, wherein when the second mode is set in advance, the second mode is continued regardless of the value of said ringer adjusting volume of said telephone, and when the second mode is not set in advance, the volume value of said ringer adjusting volume of said telephone and the volume value for setting the second mode are compared with each other, whereby when the value of said ringer adjusting volume is equal to or less than the volume value for setting the second mode, the second mode is set.

6. A mode setting method for a mode-switchable telephone according to claim 2, wherein when the first mode is set in advance, the first mode is continued regardless of the value of said ringer adjusting volume of said telephone, and when the first mode is not set in advance, the volume value of said ringer adjusting volume of said telephone is compared with a volume value for setting the first mode and the volume value for setting the second mode, whereby when the value of said ringer adjusting volume is equal to or less than the volume value for setting the second mode, the second mode is set, and when the value of said ringer adjusting volume is equal to or greater than the volume value for setting the first mode, the first mode is set.

7. A mode setting method for a mode-switchable telephone according to claim 2, wherein when the second mode is set, transmission is performed in a muted state.

8. A mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said method comprising the step of:

comparing a value of a ringer adjusting volume of said telephone with a volume value for setting the first mode and a volume value for setting the second mode, whereby when the value of said ringer adjusting volume is equal to or less than the volume value for setting the second mode, the second mode is set, and when the value of said ringer adjusting volume is equal to or greater than the volume value for setting the first mode, the first mode is set.

9. A mode setting method for a mode-switchable telephone according to claim 8, wherein said volume value for setting the second mode is a value which makes the volume of ringing zero.

10. A mode setting method for a mode-switchable telephone according to claim 8, wherein the repeat number of ringing before starting the operation for accumulating information in the second mode is set in accordance with the value of the ringer adjusting volume.

11. A mode setting method for a mode-switchable telephone according to claim 8, wherein when the second mode is set in advance, the second mode is continued regardless of the value of said ringer adjusting volume of said telephone, and when the second mode is not set in advance, the volume value of said ringer adjusting volume of said telephone and the volume value for setting the second mode are compared with each other, whereby when the value of said ringer adjusting volume is equal to or less than the volume value for setting the second mode, the second mode is set.

12. A mode setting method for a mode-switchable telephone according to claim 8, wherein when the first mode is set in advance, the first mode is continued regardless of the value of said ringer adjusting volume of said telephone, and when the first mode is not set in advance, the volume value of said ringer adjusting volume of said telephone is compared with the volume value for setting the first mode and the volume value for setting the second mode, whereby when the value of said ringer adjusting volume is equal to or less than the volume value for setting the second mode, the second mode is set, and when the value of said ringer adjusting volume is equal to or greater than the volume value for setting the first mode, the first mode is set.

13. A mode setting method for a mode-switchable telephone according to claim 8, wherein when the second mode is set, transmission is performed in a muted state.

14. A mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said mode-switchable telephone comprising:

comparing means for comparing the voltage value of a power source of said telephone with a voltage value for setting the second mode; and control means for switching the mode of said telephone to the second mode when it is judged by said comparing means that the voltage value of said power source is equal to or less than the voltage value for setting the second mode.

15. A mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said mode-switchable telephone comprising:

clocking means;

setting means for setting a clocking value for setting the second mode;

comparing means for comparing the result of the clocking by said clocking means with the clocking value for setting the second mode set by said setting means; and control means for switching the mode of said telephone to the second mode when it is judged by said comparing means that the result of the clocking by said clocking means reaches the clocking value for setting the second mode.

16. A mode setting method for a mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said method comprising the steps of:

providing said telephone with clocking means;

comparing the result of the clocking by said clocking means with a clocking value for setting the second mode; and switching the mode of said telephone to the second mode when the result of the clocking by said clocking means reaches the clocking value for setting the second mode.

17. A mode setting method for a mode-switchable telephone according to claim 16, wherein said clocking means is formed by a timer which operates based on the present time, and when a designated time comes, the second mode is set.

18. A mode setting method for a mode-switchable telephone according to claim 16, wherein said clocking means is formed by a timer which is triggered when a predetermined period of time elapses after the end of an outgoing call or an incoming call, and the second mode is set when the predetermined period of time elapses after the end of an outgoing call or an incoming call.

19. A mode setting method for a mode-switchable telephone according to claim 16, wherein said clocking means is formed by a timer which is triggered when a predetermined period of time elapses after the end of an outgoing call or an incoming call, and the second mode is set when a predetermined period of time elapses after the end of an outgoing call or an incoming call, and the second mode is canceled when a predetermined period of time elapses after the end of an outgoing call or an incoming call in a state in which the second mode has been set.

20. A mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said mode-switchable telephone comprising:

means for inputting voice;

voice identifying means for identifying the content of voice which is input through said voice inputting means to set and cancel the first mode or the second mode; and control means for setting and canceling the second mode and the first mode based on the result of the voice identification by said voice identifying means.

21. A mode-switchable telephone which has a first mode for performing an ordinary telephone talk in response to an incoming call and a second mode for sending a message to a caller-side telephone in response to an incoming call and then accumulating information from the caller-side telephone, and which is capable of setting these modes, said mode-switchable telephone comprising:

identification information-specific mode setting means for setting identification information for each caller and for setting the first mode or the second mode for the caller;

comparing means for comparing the identification information of the caller of an incoming call and the identification information set by said identification information-specific mode setting means; and control means for setting and canceling the second mode and the first mode based on the result of the comparison by said comparing means.

* * * * *